US012753193B2

(12) United States Patent
Han et al.

(10) Patent No.: US 12,753,193 B2
(45) Date of Patent: Oct. 6, 2026

(54) PREPARATION OF ORGANOSILICON COMPOUNDS WITH CARBINOL FUNCTIONALITY

(71) Applicants: Dow Silicones Corporation, Midland, MI (US); Dow Global Technologies LLC, Midland, MI (US)

(72) Inventors: Shuangbing Han, Midland, MI (US); Joseph Neuman, Midland, MI (US); Jason Fisk, Midland, MI (US); Haoquan Li, Midland, MI (US); David Devore, Midland, MI (US); Erich Molitor, Midland, MI (US); Robert Larsen, Midland, MI (US); Mike Ferritto, Midland, MI (US); John Gohndrone, Surprise, AZ (US)

(73) Assignees: Dow Silicones Corporation, Midland, MI (US); Dow Global Technologies LLC, Midland, MI (US)

( * ) Notice: Subject to any disclaimer, the term of this patent is extended or adjusted under 35 U.S.C. 154(b) by 323 days.

(21) Appl. No.: 18/682,077

(22) PCT Filed: Nov. 9, 2022

(86) PCT No.: PCT/US2022/079512

§ 371 (c)(1),
(2) Date: Feb. 7, 2024

(87) PCT Pub. No.: WO2023/091868

PCT Pub. Date: May 25, 2023

(65) Prior Publication Data

US 2025/0122229 A1 Apr. 17, 2025

Related U.S. Application Data

(60) Provisional application No. 63/281,752, filed on Nov. 22, 2021.

(51) Int. Cl.

| | |
|---|---|
| ***C08G 77/20*** | (2006.01) |
| ***B01J 31/18*** | (2006.01) |
| ***C07F 7/08*** | (2006.01) |
| ***C08G 77/38*** | (2006.01) |

(52) U.S. Cl.

CPC ........... *C07F 7/0878* (2013.01); *B01J 31/185* (2013.01); *C08G 77/20* (2013.01); *C08G 77/38* (2013.01); *B01J 2231/321* (2013.01); *B01J 2531/004* (2013.01); *B01J 2531/822* (2013.01)

(58) Field of Classification Search

CPC .. C07F 7/0878; B01J 31/185; B01J 2231/321; B01J 2531/004; B01J 2531/822; C08G 77/20; C08G 77/38

See application file for complete search history.

(56) References Cited

U.S. PATENT DOCUMENTS

| | | | |
|---|---|---|---|
| 2,462,635 | A | 2/1949 | Haber |
| 2,676,182 | A | 4/1954 | Daudt et al. |
| 3,243,404 | A | 3/1966 | Martellock |
| 3,284,406 | A | 11/1966 | Nelson |
| 3,842,112 | A | 10/1974 | Omietanski et al. |
| 3,879,433 | A | 4/1975 | Omietanski et al. |
| 3,933,695 | A | 1/1976 | Omietanski et al. |
| 4,374,967 | A | 2/1983 | Brown et al. |
| 4,424,392 | A | 1/1984 | Petty |
| 4,584,355 | A | 4/1986 | Blizzard et al. |
| 4,585,836 | A | 4/1986 | Homan et al. |
| 4,591,622 | A | 5/1986 | Blizzard et al. |
| 4,611,042 | A | 9/1986 | Rivers-Farrell et al. |
| 4,737,588 | A | 4/1988 | Billig et al. |
| 4,769,498 | A | 9/1988 | Billig et al. |
| 4,772,515 | A | 9/1988 | Hara et al. |
| 4,774,310 | A | 9/1988 | Butler |
| 4,898,961 | A | 2/1990 | Baile et al. |
| 5,010,159 | A | 4/1991 | Bank et al. |
| 5,021,601 | A | 6/1991 | Frances et al. |
| 5,169,920 | A | 12/1992 | Okawa |
| 5,225,509 | A | 7/1993 | Heinrich et al. |
| 5,290,901 | A | 3/1994 | Burns et al. |
| 5,317,072 | A | 5/1994 | Bokerman et al. |
| 5,387,706 | A | 2/1995 | Rasmussen et al. |
| 5,681,473 | A | 10/1997 | Miller et al. |
| 5,727,893 | A | 3/1998 | Handler |
| 5,739,246 | A | 4/1998 | Graiver et al. |
| 5,756,796 | A | 5/1998 | Davern et al. |
| 5,902,892 | A | 5/1999 | Larson et al. |
| 5,910,600 | A | 6/1999 | Urata et al. |
| 6,001,943 | A | 12/1999 | Enami et al. |
| 6,281,285 | B1 | 8/2001 | Becker et al. |

(Continued)

FOREIGN PATENT DOCUMENTS

| | | |
|---|---|---|
| CA | 544526 | 8/1957 |
| CN | 106431869 | 2/2017 |

(Continued)

OTHER PUBLICATIONS

Airiau, "Short Access to (+)-Lupinine and (+)- Epiquinamide via Double Hydroformylation" 2010, vol. 12, No. 3, p. 528-531.
Cai, "New Tertaphosphorous Ligands for Highly Linear Selective Hydroformylation of Allyl and Vinyl Derivatives", 2012, vol. 18, p. 9992-9998.
Cuny, "Practical, High-Yield, Regioselective, Rhodium-Catalyzed Hydroformylation of Functionalized Alpha-Olefines", Journal of the American Chemical Society, American Chemical Society, 1993, vol. 115, No. 5, p. 2066-2068.
Dorrich, "Sila-[alpha]-galbanone and Analogues: Synthesis and Olfactory Characterization of Silicon-Containing Derivatives of the Galbanum Odorant [alpha]—Galbanone" 2014, p. 4394-4407.
DOWSIL™ 2-5558 datasheet.
DOWSIL™ 5562 Carbinol Fluid datasheet.

(Continued)

*Primary Examiner* — Jiangtian Xu

(57) ABSTRACT

An organosilicon compound with carbinol groups is prepared. A catalyzed hydrogenation process for combining an aldehyde-functional organosilicon compound with hydrogen produces the carbinol-functional organosilicon compound.

18 Claims, No Drawings

(56) References Cited

U.S. PATENT DOCUMENTS

| | | | | |
|---|---|---|---|---|
| 6,297,331 | B1 * | 10/2001 | Feldmann-Krane ... | C09D 11/03 525/475 |
| 6,680,414 | B2 | 1/2004 | Knoop et al. | |
| 6,784,271 | B2 | 8/2004 | Nakanishi | |
| 6,806,339 | B2 | 10/2004 | Cray et al. | |
| 6,956,087 | B2 | 10/2005 | Lai et al. | |
| 7,446,231 | B2 | 11/2008 | Peterson et al. | |
| 7,524,997 | B2 | 4/2009 | Kaizik et al. | |
| 7,531,698 | B2 | 5/2009 | Zhang et al. | |
| 7,696,294 | B2 | 4/2010 | Asirvatham | |
| 7,943,720 | B2 | 5/2011 | Tamura et al. | |
| 7,999,053 | B2 | 8/2011 | Sutton et al. | |
| 8,546,508 | B2 | 10/2013 | Nabeta et al. | |
| 8,580,073 | B2 | 11/2013 | Behl et al. | |
| 8,748,643 | B2 | 6/2014 | Priske et al. | |
| 9,127,030 | B2 | 9/2015 | Kreidler et al. | |
| 9,217,003 | B2 | 12/2015 | Dyballa et al. | |
| 9,499,671 | B2 | 11/2016 | Narayan et al. | |
| 9,567,276 | B2 | 2/2017 | Klasovsky et al. | |
| 9,795,952 | B2 | 10/2017 | Diebolt et al. | |
| 9,926,338 | B2 | 3/2018 | Calimente et al. | |
| 10,023,516 | B2 | 7/2018 | Brammer et al. | |
| 10,155,200 | B2 | 12/2018 | Geilen et al. | |
| 10,155,852 | B2 | 12/2018 | Enami | |
| 10,214,550 | B2 | 2/2019 | Dyballa et al. | |
| 10,227,365 | B2 | 3/2019 | Miller et al. | |
| 10,526,356 | B2 | 1/2020 | Dyballa et al. | |
| 2007/0289495 | A1 | 12/2007 | Cray et al. | |
| 2016/0376482 | A1 | 12/2016 | Morgeneyer et al. | |
| 2020/0140619 | A1 | 5/2020 | Swier et al. | |
| 2023/0365523 | A1 | 11/2023 | Knopff et al. | |

FOREIGN PATENT DOCUMENTS

| | | |
|---|---|---|
| DE | 102004042815 | 3/2006 |
| EP | 0402274 | 12/1990 |
| FR | 2645867 | 10/1990 |
| FR | 2717480 | 9/1995 |
| JP | 2001069330 | 3/2001 |
| JP | 2001084173 | 3/2001 |
| JP | 2016155065 | 9/2016 |
| WO | 198302948 | 9/1983 |
| WO | 2015089811 | 6/2015 |
| WO | 2018204068 | 11/2018 |
| WO | 2019231610 | 12/2019 |

OTHER PUBLICATIONS

Gao, "Aldehydepropyl-functionalized mesostructured cellular foams: Efficient supports for immobilization of penicillin G acylase" 2014, p. 111-117.

Gelest, "Reactive Silicones: Forging New Polymer Links" p. 2-75.

Grande, "Testing the Functional Tolerance of the PiersORubinsztajn Reaction: A New Strategy for Functional Silicones" Supplementary Material (ESI) for Chemical Communications, The Royal Society of Chemistry, 2010.

Keck, "Synthetic Studies on the Bryostatins: Preparation of a Truncated BC-Ring Intermediate by Pyran Annulation" 2005, vol. 7, No. 11, p. 2149-2152.

Kunze, "Calix[4]arene-based Bis-phosphonites, Bis-phosphites, and Bis-O-acyl-phosphites as Ligands in the Rhodium(I)-catalyzed Hydroformylation of 1-Octene" 2002, vol. 628, p. 779-787.

Mieczynska, "Hydroformylation and related reactions of vinylsilanes catalyzed by siloxide complexes of rhodium(I) and iridium(I)" 2005, p. 246-253.

Noll, "Chemistry and Technology of Silicone" Academic Press, 1968, chapter 5, p. 190-245.

Puckette, "Halophosphite Ligands for the Rhodium Catalyzed Low-Pressure Hydroformylation Reaction", 2007, p. 31-38.

Semeril, "Highly Regioselective Hydroformylation with Hemispherical Chelators" 2008, vol. 14, p. 7144-7155.

Spangenberg, "Hydroformylation of Homoallylic Azides: A Rapid Approach toward Alkaloids", Organic Letters, vol. 11, No. 2, 2009, p. 261-264.

Steyer, "Bis-phosphites and bis-phosphinites based on distally-functionalised calix[4]arenes: coordination chemistry and use in rhodium-catalysed, low-pressure olefin hydroformylation" 2005, p. 1301-1309.

Takeuchi "Hydroformylation of alkenes having organosilicon substituents" 1990, p. 1-10.

Tang, "Thermal Catalytic Conversion of Alkanes to Linear Aldehydes and Linear Amines" 2018, vol. 140, No. 11, p. 4157-4163.

Van Rooy, "Bulky Diphosphate-Modified Rhodium Catalysts: Hydroformylation and Characterization," 1996, vol. 15, p. 835-847.

Xiaofei, "Pyrrolyl-Based Phosphoramidite/Rh Catalyzed Asymmetric Hydroformylation of 1, 1-Disubstituted Olefins" 2019, vol. 39, p. 207-214.

Xu, "Easily Accessible and Highly Tunable Bisphosphine Ligands for Asymmetric Hydroformylation of Terminal and Internal Alkenes" 2014, vol. 20, p. 4357-4362.

Zhang, "Rhodium-Catalyzed Asymmetric Hydroformylation of N-Allylamides: Highly Enantioselective Approach to [beta] 2-Amino Aldehydes" 2010, vol. 49, p. 4047-4050.

* cited by examiner

PREPARATION OF ORGANOSILICON COMPOUNDS WITH CARBINOL FUNCTIONALITY

CROSS REFERENCE TO RELATED APPLICATIONS

This application is a U.S. national stage filing under 35 U.S.C. § 371 of PCT Application No. PCT/US2022/079512 filed on 9 Nov. 2022, currently pending. which claims the benefit of U.S. Provisional Patent Application No. 63/281,752 filed 22 Nov. 2021 under 35 U.S.C. § 119 (e). PCT Application No. PCT/US2022/079512 and U.S. Provisional Patent Application No. 63/281,752 are each hereby incorporated by reference.

FIELD

A process for preparing a carbinol-functional organosilicon compound is disclosed. More particularly, the process for preparing the carbinol-functional organosilicon compound may employ hydroformylation of an alkenyl-functional organosilicon compound with carbon monoxide and hydrogen and subsequent hydrogenation.

INTRODUCTION

Carbinol-functional organosilicon compounds (such as silanes and siloxanes) have been used in personal care markets, such as emollients, moisturizers, wrinkle masks, carriers, antiperspirants, and deodorants. Carbinol-functional organosilicon compounds are also used as intermediates for synthesizing other materials, such as silicone polyethers (SPE), and other silicone-organic hybrid copolymers, for applications such as coatings, paints, foams, and elastomers. However, the commercial availability of carbinol-functional organosilicon compounds has been limited due to challenging synthesis and high cost.

One approach to synthesizing carbinol-functional organosilicon compounds has been hydrosilylation of an unsaturated (e.g. olefinic, alkynyl) alcohol with a silicon hydride (SiH) material. However, this reaction suffers from the drawback of producing by-products due to side reactions including i) reaction of the silicon bonded hydrogen atoms of the silicon hydride and the hydroxyl group of the alcohol and ii) isomerization of the unsaturated functionality of the alcohol. For example, the synthesis of a carbinol-terminated polydimethylsiloxane fluid by this approach is shown below in Scheme 1. Using protected alcohols (e.g., the ketal protected alcohol) before hydrosilylation followed by de-protection step can provide relatively pure carbinol-functional siloxane materials, but the protection and de-protection steps introduce an appreciable level of cost into the process.

Another synthetic approach has been proposed based on the reaction of a cyclic silyl ether with a silanol terminated polydimethylsiloxane as exemplified below in Scheme 2 showing the reaction of 2,2,4-trimethyl-1-oxa-2-silacyclopentane and silanol terminated polydimethylsiloxane (PDMS). However, this approach suffers from the disadvantages of requiring an extra step to synthesize the cyclic silyl ether, and the pre-synthesized cyclic silyl ether has to be freshly distilled to remove by-product polymers, which form because the cyclic silyl ether tends to self-polymerize with storage time at RT. Pre-synthesis and re-distillation of the cyclic silyl ether greatly increase the cost of this approach. Furthermore, this synthetic approach is limited to silanol terminated polydimethylsiloxanes because siloxanes with pendant silanol groups are difficult to react using this approach.

Scheme 2. reaction of a cyclic silyl ether with silanol capped polydimethylsiloxane used to make a carbinol-terminated polydimethylsiloxane.

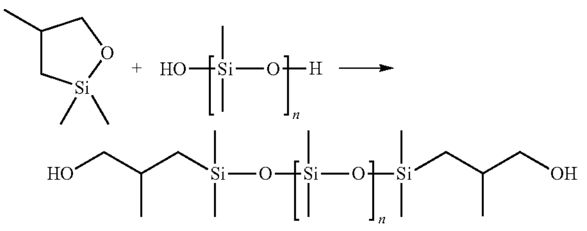

U.S. Pat. No. 9,499,671 discloses preparation and use of organopolysiloxanes having carbinol groups that are bonded to the silicon atom through carbamate containing groups. However, the use of carbamate containing groups suffers from the drawbacks that a longer organic spacer is required, and aminosiloxanes, which are expensive and require hydrosilylation to synthesize, are necessary to make the carbinol via the carbamate process. In addition, pendant aminosiloxanes can also generate waste byproducts.

Therefore, there is an unmet need in the organosilicon industry need for a synthetic method to prepare carbinol-functional organosilicon compounds with relatively high purity, high selectivity, and low cost.

SUMMARY

A process for preparing a carbinol-functional organosilicon compound comprises combining, under conditions to catalyze hydrogenation reaction, starting materials comprising an aldehyde-functional organosilicon compound, hydrogen, and a hydrogenation catalyst, thereby forming a hydro- Scheme 1. Synthesis of a carbinol-terminated polydimethylsiloxane fluid via a hydrosilylation reaction

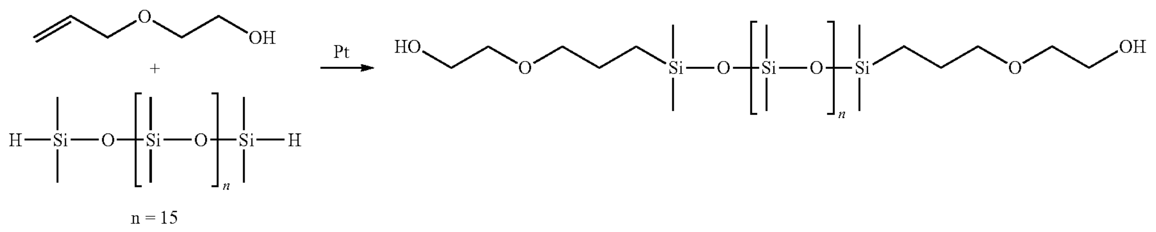

genation reaction product comprising the carbinol-functional organosilicon compound.

DETAILED DESCRIPTION

Aldehyde-Functional Organosilicon Compound

Aldehyde-functional organosilicon compounds suitable for use in the process for preparing the carbinol-functional organosilicon compound are known and may be made by known methods, such as those described in U.S. Pat. No. 4,424,392 to Petty; U.S. Pat. No. 5,021,601 to Frances et al.; U.S. Pat. No. 5,739,246 to Graiver et al.; U.S. Pat. No. 7,696,294 to Asirvatham; and U.S. Pat. No. 7,999,053 to Sutton et al.; European Patent Application Publication EP 0 392 948 A1 to Frances, and PCT Patent Application Publication WO2006027074 to Kuhnle et al.

Alternatively, the aldehyde-functional organosilicon compound may be prepared by a hydroformylation process. This hydroformylation process comprises 1) combining, under conditions to catalyze hydroformylation reaction, starting materials comprising (A) a gas comprising hydrogen and carbon monoxide, (B) an alkenyl-functional organosilicon compound, and (C) hydroformylation reaction catalyst such as a rhodium/bisphosphite ligand complex catalyst, thereby forming a hydroformylation reaction product comprising the aldehyde-functional organosilicon compound.

The hydroformylation process described herein employs starting materials comprising: (A) a gas comprising hydrogen and carbon monoxide, (B) an alkenyl-functional organosilicon compound, and (C) a rhodium/bisphosphite ligand catalyst. The starting materials may optionally further comprise: (D) a solvent.

Starting material (A), the gas used in the hydroformylation process, comprises carbon monoxide (CO) and hydrogen gas ($H_2$). For example, the gas may be syngas. As used herein, "syngas" (from synthesis gas) refers to a gas mixture that contains varying amounts of CO and $H_2$. Production methods are well known and include, for example: (1) steam reforming and partial oxidation of natural gas or liquid hydrocarbons, and (2) the gasification of coal and/or biomass. CO and $H_2$ typically are the main components of syngas, but syngas may contain carbon dioxide and inert gases such as $CH_4$, $N_2$ and Ar. The molar ratio of $H_2$ to CO ($H_2$:CO molar ratio) varies greatly but may range from 1:100 to 100:1, alternatively 1:10 and 10:1. Syngas is commercially available and is often used as a fuel source or as an intermediate for the production of other chemicals. Alternatively, CO and $H_2$ from other sources (i.e., other than syngas) may be used as starting material (A) herein. Alternatively, the $H_2$:CO molar ratio in starting material (A) for use herein may be 3:1 to 1:3, alternatively 2:1 to 1:2, and alternatively 1:1.

The alkenyl-functional organosilicon compound has, per molecule, at least one alkenyl group covalently bonded to silicon. Alternatively, the alkenyl-functional organosilicon compound may have, per molecule, more than one alkenyl group covalently bonded to silicon. Starting material (B) may be one alkenyl-functional organosilicon compound. Alternatively, starting material (B) may comprise two or more alkenyl-functional organosilicon compounds that differ from one another. For example, the alkenyl-functional organosilicon compound may comprise one or both of (B1) a silane and (B2) a polyorganosiloxane.

Starting material (B1), the alkenyl-functional silane, may have formula (B1-1): $R^A_xSiR^4_{(4-x)}$, where each $R^A$ is an independently selected alkenyl group of 2 to 8 carbon atoms; each $R^4$ is independently selected from the group consisting of an alkyl group of 1 to 18 carbon atoms, an aryl group of 6 to 18 carbon atoms, an acyloxy group of 2 to 18 carbon atoms, and a hydrocarbonoxy-functional group of 1 to 18 carbon atoms; and subscript x is 1 to 4. Alternatively, subscript x may be 1 or 2, alternatively 2, and alternatively 1. Alternatively, each $R^4$ may be independently selected from the group consisting of an alkyl group of 1 to 18 carbon atoms, an aryl group of 6 to 18 carbon atoms, an acyloxy group of 1 to 18 carbon atoms, and a hydrocarbonoxy-functional group of 1 to 18 carbon atoms. Alternatively, each $R^4$ may be independently selected from the group consisting of an alkyl group of 1 to 18 carbon atoms, an aryl group of 6 to 18 carbon atoms, and an alkoxy-functional group of 1 to 18 carbon atoms. Alternatively, each $R^4$ in formula (B1-1) may be independently selected from the group consisting of an alkyl group of 1 to 18 carbon atoms, an aryl group of 6 to 18 carbon atoms, and a hydrocarbonoxy-functional group of 1 to 18 carbon atoms.

The alkenyl group for $R^A$ may have terminal alkenyl functionality, e.g., $R^A$ may have formula

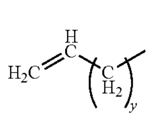

where subscript y is 0 to 6. Alternatively, each $R^A$ may be independently selected from the group consisting of vinyl, allyl, and hexenyl. Alternatively, each $R^A$ may be independently selected from the group consisting of vinyl and allyl. Alternatively, each $R^A$ may be vinyl. Alternatively, each $R^A$ may be allyl.

Suitable alkyl groups for $R^4$ may be linear, branched, cyclic, or combinations of two or more thereof. The alkyl groups are exemplified by methyl, ethyl, propyl (including n-propyl and/or isopropyl), butyl (including n-butyl, tert-butyl, sec-butyl, and/or isobutyl); pentyl, hexyl, heptyl, octyl, decyl, dodecyl, undecyl, and octadecyl (and branched isomers having 5 to 18 carbon atoms), and the alkyl groups are further exemplified by cycloalkyl groups such as cyclopropyl, cyclobutyl, cyclopentyl, and cyclohexyl. Alternatively, the alkyl group for $R^4$ may be selected from the group consisting of methyl, ethyl, propyl and butyl; alternatively methyl, ethyl, and propyl; alternatively methyl and ethyl. Alternatively, the alkyl group for $R^4$ may be methyl.

Suitable aryl groups for $R^4$ may be monocyclic or polycyclic and may have pendant hydrocarbyl groups. For example, the aryl groups for $R^4$ include phenyl, tolyl, xylyl, and naphthyl and further include aralkyl groups such as benzyl, 1-phenylethyl and 2-phenylethyl. Alternatively, the aryl group for $R^4$ may be monocyclic, such as phenyl, tolyl, or benzyl; alternatively the aryl group for $R^4$ may be phenyl.

Suitable hydrocarbonoxy-functional groups for $R^4$ may have the formula $—OR^5$ or the formula $—OR^3—OR^5$, where each $R^3$ is an independently selected divalent hydrocarbyl group of 1 to 18 carbon atoms, and each $R^5$ is independently selected from the group consisting of the alkyl groups of 1-18 carbon atoms and the aryl groups of 6-18 carbon atoms, which are as described and exemplified above for $R^4$. Examples of divalent hydrocarbyl groups for $R^3$ include alkylene group such as ethylene, propylene, butylene, or hexylene; an arylene group such as phenylene, or an alkylarylene group such as:

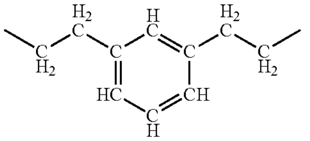

or

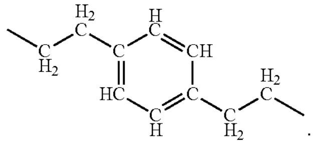

.

Alternatively, $R^3$ may be an alkylene group such as ethylene. Alternatively, the hydrocarbonoxy-functional group may be an alkoxy-functional group such as methoxy, ethoxy, propoxy, or butoxy; alternatively methoxy or ethoxy, and alternatively methoxy.

Suitable acyloxy groups for $R^4$ may have the formula

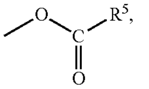

where $R^5$ is as described above. Examples of suitable acyloxy groups include acetoxy. Alkenyl-functional acyloxysilanes and methods for their preparation are known in the art, for example, in U.S. Pat. No. 5,387,706 to Rasmussen, et al., and U.S. Pat. No. 5,902,892 to Larson, et al.

Suitable alkenyl-functional silanes are exemplified by alkenyl-functional trialkylsilanes such as vinyltrimethylsilane, vinyltriethylsilane, and allyltrimethylsilane; alkenyl-functional trialkoxysilanes such as allyltrimethoxysilane, vinyltrimethoxysilane, vinyltriethoxysilane, vinyltriisopropoxysilane, and vinyltris(methoxyethoxy)silane; alkenyl-functional dialkoxysilanes such as vinylphenyldiethoxysilane, vinylmethyldimethoxysilane, and vinylmethyldiethoxysilane; alkenyl-functional monoalkoxysilanes such as trivinylmethoxysilane; alkenyl-functional triacyloxysilanes such as vinyltriacetoxysilane, and alkenyl-functional diacyloxysilanes such as vinylmethyldiacetoxysilane. All of these alkenyl-functional silanes are commercially available from Gelest Inc. of Morrisville, Pennsylvania, USA. Furthermore, alkenyl-functional silanes may be prepared by known methods, such as those disclosed in U.S. Pat. No. 4,898,961 to Baile, et al. and U.S. Pat. No. 5,756,796 to Davern, et al.

Alternatively, (B) the alkenyl-functional organosilicon compound may comprise (B2) an alkenyl-functional polyorganosiloxane. Said polyorganosiloxane may be cyclic, linear, branched, resinous, or a combination of two or more thereof. Said polyorganosiloxane may comprise unit formula (B2-1): $(R^4_3SiO_{1/2})_a(R^4_2R^ASiO_{1/2})_b(R^4_2SiO_{2/2})_c(R^4R^ASiO_{2/2})_d(R^4SiO_{3/2})_e(R^ASiO_{3/2})_f(SiO_{4/2})_g(ZO_{1/2})_h$; where $R^A$ and $R^4$ are as described above; each Z is independently selected from the group consisting of a hydrogen atom and $R^5$ (where $R^5$ is as described above), subscripts a, b, c, d, e, f, and g represent numbers of each unit in formula (B2-1) and have values such that subscript $a \geq 0$, subscript $b \geq 0$, subscript $c \geq 0$, subscript $d \geq 0$, subscript $e \geq 0$, subscript $f \geq 0$, and subscript $g \geq 0$; a quantity $(a+b+c+d+e+f+g) \geq 2$, and a quantity $(b+d+f) \geq 1$, and subscript h has a value such that $0 \leq h/(e+f+g) \leq 1.5$. At the same time, the quantity $(a+b+c+d+e+f+g)$ may be $\leq 10{,}000$. Alternatively, in formula (B-2-1), each $R^4$ may be independently selected from the group consisting of a hydrogen atom, an alkyl group of 1 to 18 carbon atoms, an aryl group of 6 to 18 carbon atoms, and a hydrocarbonoxy-functional group of 1 to 18 carbon atoms. Alternatively, each $R^4$ may be independently selected from the group consisting of an alkyl group of 1 to 18 carbon atoms, an aryl group of 6 to 18 carbon atoms, and an alkoxy-functional group of 1 to 18 carbon atoms. Alternatively, each $R^4$ may be independently selected from the group consisting of an alkyl group of 1 to 18 carbon atoms and an aryl group of 6 to 18 carbon atoms. Alternatively, each Z may be hydrogen or an alkyl group of 1 to 6 carbon atoms. Alternatively, each Z may be hydrogen.

Alternatively, (B2) the alkenyl-functional polyorganosiloxane may comprise (B2-2) a linear polydiorganosiloxane having, per molecule, at least one alkenyl group; alternatively at least two alkenyl groups (e.g., when in formula (B2-1) above, subscripts e=f=g=0). For example, said polydiorganosiloxane may comprise unit formula (B2-3): $(R^4_3SiO_{1/2})_a(R^AR^4_2SiO_{1/2})_b(R^4_2SiO_{2/2})_c(R^AR^4SiO_{2/2})_d$, where $R^A$ and $R^4$ are as described above, subscript a is 0, 1, or 2; subscript b is 0, 1, or 2, subscript $c \geq 0$, subscript $d \geq 0$, with the provisos that a quantity $(b+d) \geq 1$, a quantity $(a+b)=2$, and a quantity $(a+b+c+d) \geq 2$. Alternatively, in unit formula (B2-3) the quantity (a+b+c+d) may be at least 3, alternatively at least 4, and alternatively >50. At the same time in unit formula (B2-3), the quantity (a+b+c+d) may be less than or equal to 10,000; alternatively less than or equal to 4,000; alternatively less than or equal to 2,000; alternatively less than or equal to 1,000; alternatively less than or equal to 500; alternatively less than or equal to 250. Alternatively, in unit formula (B2-3) each $R^4$ may be independently selected from the group consisting of alkyl and aryl; alternatively methyl and phenyl. Alternatively, each $R^4$ in unit formula (B2-3) may be an alkyl group; alternatively each $R^4$ may be methyl.

Alternatively, the polydiorganosiloxane of unit formula (B2-3) may be selected from the group consisting of: unit formula (B2-4): $(R^4_2R^ASiO_{2/2})_2(R^4_2SiO_{2/2})_m(R^4R^ASiO_{2/2})_n$, unit formula (B2-5): $(R^4_3SiO_{1/2})_2(R^4_2SiO_{2/2})_o(R^4R^ASiO_{2/2})_p$, or a combination of both (B2-4) and (B2-5).

In formulae (B2-4) and (B2-5), each $R^4$ and $R^A$ are as described above. Subscript m may be 0 or a positive number. Alternatively, subscript m may be at least 2. Alternatively subscript m be 2 to 2,000. Subscript n may be 0 or a positive number. Alternatively, subscript n may be 0 to 2000. Subscript o may be 0 or a positive number. Alternatively, subscript o may be 0 to 2000. Subscript p is at least 2. Alternatively subscript p may be 2 to 2000.

Starting material (B2) may comprise an alkenyl-functional polydiorganosiloxane such as i) bis-dimethylvinylsiloxy-terminated polydimethylsiloxane, ii) bis-dimethylvinylsiloxy-terminated poly(dimethylsiloxane/methylvinylsiloxane), iii) bis-dimethylvinylsiloxy-terminated polymethylvinylsiloxane, iv) bis-trimethylsiloxy-terminated poly(dimethylsiloxane/methylvinylsiloxane), v) bis-trimethylsiloxy-terminated polymethylvinylsiloxane, vi) bis-dimethylvinylsiloxy-terminated poly(dimethylsiloxane/methylphenylsiloxane/methylvinylsiloxane), vii) bis-dimethylvinylsiloxy-terminated poly(dimethylsiloxane/methylphenylsiloxane), viii) bis-dimethylvinylsiloxy-terminated poly(dimethylsiloxane/diphenylsiloxane), ix) bis-phenyl,methyl,vinyl-siloxy-terminated polydimethylsiloxane, x) bis-dimethylhexenylsiloxy-terminated polydimethylsiloxane, xi) bis-dimethylhexenylsiloxy-terminated poly(dimethylsiloxane/methylhexenylsiloxane), xii) bis-dimethylhexenylsiloxy-terminated polymethylhexenylsiloxane, xiii) bis-trimethylsiloxy-terminated poly(dimethylsiloxane/methylhexenylsiloxane), xiv) bis-trimethylsiloxy-terminated polymethylhexenylsiloxane, xv) bis-dimethylhexenyl-siloxy terminated poly(dimethylsiloxane/methylphenylsiloxane/methylhexenylsiloxane), xvi) bis-dimethylvinylsiloxy-terminated poly(dimethylsiloxane/methylhexenylsiloxane), xvii) bis-dimethylhexenyl-siloxy-terminated poly(dimethylsiloxane/methylphenylsiloxane), xviii) dimethylhexenyl-siloxy-terminated poly(dimethylsiloxane/diphenylsiloxane), and xix) a combination of two or more of i) to xviii).

Methods of preparing linear alkenyl-functional polydiorganosiloxanes described above for starting material (B2), such as hydrolysis and condensation of the corresponding organohalosilanes and oligomers or equilibration of cyclic polydiorganosiloxanes, are known in the art, see for example U.S. Pat. Nos. 3,284,406; 4,772,515; 5,169,920; 5,317,072; and 6,956,087, which disclose preparing linear polydiorganosiloxanes with alkenyl groups. Examples of linear polydiorganosiloxanes having alkenyl groups are commercially available from, e.g., Gelest Inc. of Morrisville, Pennsylvania, USA under the tradenames DMS-V00, DMS-V03, DMS-V05, DMS-V21, DMS-V22, DMS-V25, DMS-V-31, DMS-V33, DMS-V34, DMS-V35, DMS-V41, DMS-V42, DMS-V43, DMS-V46, DMS-V51, DMS-V52.

Alternatively, (B2) the alkenyl-functional polyorganosiloxane may be cyclic, e.g., when in unit formula (B2-1), subscripts a=b=c=e=f=g=h=0. The cyclic alkenyl-functional polydiorganosiloxane may have unit formula (B2-7): $(R^4R^ASiO_{2/2})_d$, where $R^A$ and $R^4$ are as described above, and subscript d may be 3 to 12, alternatively 3 to 6, and alternatively 4 to 5. Examples of cyclic alkenyl-functional polydiorganosiloxanes include 2,4,6-trimethyl-2,4,6-trivinyl-cyclotrisiloxane, 2,4,6,8-tetramethyl-2,4,6,8-tetravinyl-cyclotetrasiloxane, 2,4,6,8,10-pentamethyl-2,4,6,8,10-pentavinyl-cyclopentasiloxane, and 2,4,6,8,10,12-hexamethyl-2,4,6,8,10,12-hexavinyl-cyclohexasiloxane. These cyclic alkenyl-functional polydiorganosiloxanes are known in the art and are commercially available from, e.g., Sigma-Aldrich of St. Louis, Missouri, USA; Milliken of Spartanburg, South Carolina, USA; and other vendors.

Alternatively, the cyclic alkenyl-functional polydiorganosiloxane may have unit formula (B2-8): $(R^4_2SiO_{2/2})_c(R^4R^ASiO_{2/2})_d$, where $R^4$ and $R^A$ are as described above, subscript c is >0 to 6 and subscript d is 3 to 12. Alternatively, in formula (B2-8), c may be 3 to 6, and d may be 3 to 6.

Alternatively, (B2) the alkenyl-functional polyorganosiloxane may be oligomeric, e.g., when in unit formula (B2-1) above the quantity $(a+b+c+d+e+f+g)\leq 50$, alternatively $\leq 40$, alternatively $\leq 30$, alternatively $\leq 25$, alternatively $\leq 20$, alternatively $\leq 10$, alternatively $\leq 5$, alternatively $\leq 4$, alternatively $\leq 3$. The oligomer may be cyclic, linear, branched, or a combination thereof. The cyclic oligomers are as described above as starting material (B2-6).

Examples of linear alkenyl-functional polyorganosiloxane oligomers may have formula (B2-10):

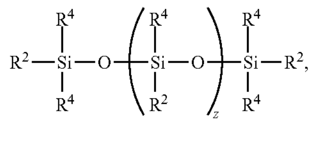

where $R^4$ is as described above, each $R^2$ is independently selected from the group consisting of $R^4$ and $R^A$, with the proviso that at least one $R^2$, per molecule, is $R^A$, and subscript z is 0 to 48. Examples of linear alkenyl-functional polyorganosiloxane oligomers may have include 1,3-divinyl-1,1,3,3-tetramethyldisiloxane; 1,1,1,3,3-pentamethyl-3-vinyl-disiloxane; 1,1,1,3,5,5,5-heptamethyl-3-vinyl-trisiloxane, all of which are commercially available, e.g., from Gelest, Inc. of Morrisville, Pennsylvania, USA or Sigma-Aldrich of St. Louis, Missouri, USA.

Alternatively, the alkenyl-functional polyorganosiloxane oligomer may be branched. The branched oligomer may have general formula (B2-11): $R^ASiR^{12}_3$, where $R^A$ is as described above and each $R^{12}$ is selected from $R^{13}$ and $—OSi(R^{14})_3$; where each $R^{13}$ is a monovalent hydrocarbon group; where each $R^{14}$ is selected from $R^{13}$, $—OSi(R^{15})_3$, and $—[OSiR^{13}_2]_{ii}OSiR^{13}_3$; where each $R^{15}$ is selected from $R^{13}$, $—OSi(R^{16})_3$, and $—[OSiR^{13}_2]_{ii}OSiR^{13}_3$; where each $R^{16}$ is selected from $R^{13}$ and $—[OSiR^{13}_2]_{ii}OSiR^{13}_3$; and where subscript ii has a value such that $0\leq ii\leq 100$. At least two of $R^{12}$ may be $—OSi(R^{14})_3$. Alternatively, all three of $R^{12}$ may be $—OSi(R^{14})_3$.

Alternatively, in formula (B2-11) when each $R^{12}$ is $—OSi(R^{14})_3$, each $R^{14}$ may be $—OSi(R^{15})_3$ moieties such that the branched polyorganosiloxane oligomer has the following structure:

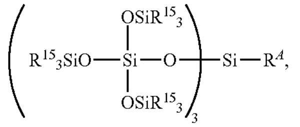

where $R^A$ and $R^{15}$ are as described above. Alternatively, each $R^{15}$ may be an $R^{13}$, as described above, and each $R^{13}$ may be methyl.

Alternatively, in formula (B2-11), when each $R^{12}$ is $—OSi(R^{14})_3$, one $R^{14}$ may be $R^{13}$ in each $—OSi(R^{14})_3$ such that each $R^{12}$ is $—OSiR^{13}(R^{14})_2$. Alternatively, two $R^{14}$ in $—OSiR^{13}(R^{14})_2$ may each be $—OSi(R^{15})_3$ moieties such that the branched polyorganosiloxane oligomer has the following structure:

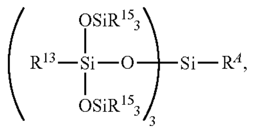

where $R^A$, $R^{13}$, and $R^{15}$ are as described above. Alternatively, each $R^{15}$ may be an $R^{13}$, and each $R^{13}$ may be methyl.

Alternatively, in formula (B2-11), one R may be $R^{13}$, and two of $R^{12}$ may be $—OSi(R^{14})_3$. When two of $R^{12}$ are $—OSi(R^{14})_3$, and one $R^{14}$ is $R^{13}$ in each $—OSi(R^{14})_3$ then two of are $—OSiR^{13}(R^{14})_2$. Alternatively, each $R^{14}$ in $—OSiR^{13}(R^{14})_2$ may be $—OSi(R^5)_3$ such that the branched polyorganosiloxane oligomer has the following structure:

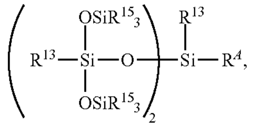

where $R^A$, $R^{13}$, and $R^{15}$ are as described above. Alternatively, each $R^{15}$ may be an $R^{13}$, and each $R^{13}$ may be methyl.

Alternatively, the alkenyl-functional branched polyorganosiloxane may have 3 to 16 silicon atoms per molecule, alternatively 4 to 16 silicon atoms per molecule, and alternatively 4 to 10 silicon atoms per molecule. Examples of alkenyl-functional branched polyorganosiloxane oligomers include vinyl-tris(trimethyl)siloxy)silane, which has formula:

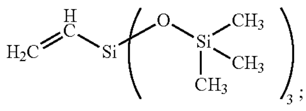

methyl-vinyl-di((1,1,1,3,5,5,5-heptamethyltrisiloxan-3-yl) oxy)-silane, which has formula

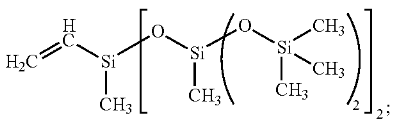

vinyl-tris((1,1,1,3,5,5,5-heptamethyltrisiloxan-3-yl)oxy)-silane, which has formula

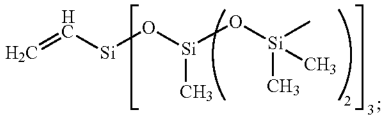

and (hex-5-en-1-yl)-tris((1,1,1,3,5,5,5-heptamethyltrisiloxan-3-yl)oxy)-silane, which has formula

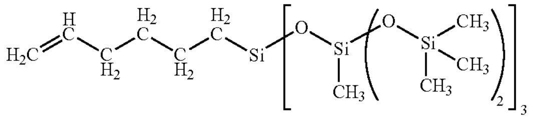

(Si10Hex). Branched alkenyl-functional polyorganosiloxane oligomers described above may be prepared by known methods, such as those disclosed in "Testing the Functional Tolerance of the Piers-Rubinsztajn Reaction: A new Strategy for Functional Silicones" by Grande, et al. Supplementary Material (ESI) for Chemical Communications, © The Royal Society of Chemistry 2010.

Alternatively, (B2) the alkenyl-functional polyorganosiloxane may be branched, such as the branched oligomer described above and/or a branched alkenyl-functional polyorganosiloxane that may have, e.g., more alkenyl groups per molecule and/or more polymer units than the branched oligomer described above (e.g., in formula (B2-1) when the quantity (a+b+c+d+e+f+g)>50). The branched alkenyl-functional polyorganosiloxane may have (in formula (B2-1)) a quantity (e+f+g) sufficient to provide >0 to 5 mol % of trifunctional and/or quadrifunctional units to the branched alkenyl-functional polyorganosiloxane.

For example, the branched alkenyl-functional polyorganosiloxane may comprise a Q branched polyorganosiloxane of unit formula (B2-13): $(R^4_3SiO_{1/2})_q(R^4_2R^A SiO_{1/2})_r(R^4_2SiO_{2/2})_s(SiO_{4/2})_t$, where $R^4$ and $R^A$ are as described above, and subscripts q, r, s, and t have average values such that 2≥q≥0, 4≥r≥0, 995≥s≥4, t=1, (q+r)=4, and (q+r+s+t) has a value sufficient to impart a viscosity>170 mPa·s measured by rotational viscometry (as described below with the test methods) to the branched polyorganosiloxane. Alternatively, viscosity may be≥170 mPa·s to 1000 mPa·s, alternatively >170 to 500 mPa·s, alternatively 180 mPa·s to 450 mPa·s, and alternatively 190 mPa·s to 420 mPa·s. Suitable Q branched polyorganosiloxanes for starting material (B2-12) are known in the art and can be made by known methods, exemplified by those disclosed in U.S. Pat. No. 6,806,339 to Cray, et al. and U.S. Patent Publication 2007/0289495 to Cray, et al.

Alternatively, the branched alkenyl-functional polyorganosiloxane may comprise formula (B2-14): $[R^AR^4_2Si—(O—SiR^4_2)_x—O]_{(4-w)}—Si—[O—(R^4_2SiO)_vSiR^4_3]_w$, where $R^A$ and $R^4$ are as described above; and subscripts v, w, and x have values such that 200≥v≥1, 2≥w≥0, and 200≥x≥1. Alternatively, in this formula (B2-14), each $R^4$ is independently selected from the group consisting of methyl and phenyl, and each $R^A$ is independently selected from the group consisting of vinyl, allyl, and hexenyl. Branched polyorganosiloxane suitable for starting material (B2-14) may be prepared by known methods such as heating a mixture comprising a polyorganosilicate resin, and a cyclic polydiorganosiloxane or a linear polydiorganosiloxane, in the presence of a catalyst, such as an acid or phosphazene base, and thereafter neutralizing the catalyst.

Alternatively, the branched alkenyl-functional polyorganosiloxane for starting material (B2-11) may comprise a T branched polyorganosiloxane (silsesquioxane) of unit formula (B2-15): $(R^4_3SiO_{1/2})_{aa}(R^AR^4_2SiO_{1/2})_{bb}(R^4_2SiO_{2/2})_{cc}(R^AR^4SiO_{2/2})_{ee}(R^4SiO_{3/2})_{dd}$, where $R^4$ and $R^A$ are as described above, subscript aa≥0, subscript bb≥0, subscript cc is 15 to 995, subscript dd≥0, and subscript ee≥0. Subscript aa may be 0 to 10. Alternatively, subscript aa may have a value such that: 12≥aa≥0; alternatively 10≥aa≥0; alternatively 7≥aa≥0; alternatively 5≥aa≥0; and alternatively 3≥aa≥0. Alternatively, subscript bb≥1. Alternatively, subscript bb≥3. Alternatively, subscript bb may have a value such that: 12≥bb≥0; alternatively 12≥bb≥3; alternatively 10≥bb≥0; alternatively 7≥bb≥1; alternatively 5≥bb≥2; and alternatively 7≥bb≥3. Alternatively, subscript cc may have a value such that: 800≥cc≥15; and alternatively 400≥cc≥15. Alternatively, subscript ee may have a value such that: 800≥ee≥0; 800≥ee≥15; and alternatively 400≥ee≥15. Alternatively, subscript ee may b 0. Alternatively, a quantity (cc+ee) may have a value such that 995≥(cc+ee)≥15. Alternatively, subscript dd≥1. Alternatively, subscript dd may be 1 to 10. Alternatively, subscript dd may have a value such that: 10≥dd≥0; alternatively 5≥dd≥0; and alternatively dd=1. Alternatively, subscript dd may be 1 to 10, alternatively subscript dd may be 1 or 2. Alternatively, when subscript dd=1, then subscript bb may be 3 and subscript cc may be 0. The values for subscript bb may be sufficient to provide the silsesquioxane of unit formula (B2-15) with an alkenyl content of 0.1% to 1%, alternatively 0.2% to 0.6%, based on the weight of the silsesquioxane. Suitable T branched polyorganosiloxanes (silsesquioxanes) for starting material (B2-15) are exemplified by those disclosed in U.S. Pat. No. 4,374,967 to Brown, et al; U.S. Pat. No. 6,001,943 to Enami, et al.; U.S. Pat. No. 8,546,508 to Nabeta, et al.; and U.S. Pat. No. 10,155,852 to Enami.

Alternatively, (B2) the alkenyl-functional polyorganosiloxane may comprise an alkenyl-functional polyorganosilicate resin, which comprises monofunctional units ("M" units) of formula $R^M_3SiO_{1/2}$ and tetrafunctional silicate units ("Q" units) of formula $SiO_{4/2}$, where each $R^M$ is an independently selected monovalent hydrocarbon group; each $R^M$ may be independently selected from the group consisting of $R^4$ and $R^A$ as described above. Alternatively, each $R^M$ may be selected from the group consisting of alkyl, alkenyl and aryl. Alternatively, each $R^M$ may be selected from methyl, vinyl and phenyl. Alternatively, at least one-third, alternatively at least two thirds of the $R^M$ groups are methyl groups. Alternatively, the M units may be exemplified by $(Me_3SiO_{1/2})$, $(Me_2PhSiO_{1/2})$, and $(Me_2ViSiO_{2/2})$. The polyorganosilicate resin is soluble in solvents such as those described herein as starting material (D), exemplified by liquid hydrocarbons, such as benzene, ethylbenzene, toluene, xylene, and heptane, or in liquid non-functional organosilicon compounds such as low viscosity linear and cyclic polydiorganosiloxanes.

When prepared, the polyorganosilicate resin comprises the M and Q units described above, and the polyorganosiloxane further comprises units with silicon bonded hydroxyl groups, and/or hydrolyzable groups, described by moiety $(ZO_{1/2})$, above, and may comprise neopentamer of formula $Si(OSiR^M{}_3)_4$, where $R^M$ is as described above, e.g., the neopentamer may be tetrakis(trimethylsiloxy)silane. $^{29}Si$ NMR and $^{13}C$ NMR spectroscopies may be used to measure hydroxyl and alkoxy content and molar ratio of M and Q units, where said ratio is expressed as {M(resin)}/{Q(resin)}, excluding M and Q units from the neopentamer. M/Q ratio represents the molar ratio of the total number of triorganosiloxy groups (M units) of the resinous portion of the polyorganosilicate resin to the total number of silicate groups (Q units) in the resinous portion. M/Q ratio may be 0.5/1 to 1.5/1, alternatively 0.6/1 to 0.9/1.

The Mn of the polyorganosilicate resin depends on various factors including the types of hydrocarbon groups represented by $R^M$ that are present. The Mn of the polyorganosilicate resin refers to the number average molecular weight measured using GPC, when the peak representing the neopentamer is excluded from the measurement. The Mn of the polyorganosilicate resin may be 1,500 Da to 30,000 Da; alternatively 1,500 Da to 15,000 Da; alternatively ≥3,000 Da to 8,000 Da. Alternatively, Mn of the polyorganosilicate resin may be 3,500 Da to 8,000 Da.

U.S. Pat. No. 8,580,073 at col. 3, line 5 to col. 4, line 31, and U.S. Patent Publication 2016/0376482 at paragraphs [0023] to [0026] are hereby incorporated by reference for disclosing MQ resins, which are suitable polyorganosilicate resins for use as starting material (B2). The polyorganosilicate resin can be prepared by any suitable method, such as cohydrolysis of the corresponding silanes or by silica hydrosol capping methods. The polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having M units and Q units. The resulting copolymers generally contain from 2 to 5 percent by weight of hydroxyl groups.

The intermediates used to prepare the polyorganosilicate resin may be triorganosilanes and silanes with four hydrolyzable substituents or alkali metal silicates. The triorganosilanes may have formula $R^M{}_3SiX$, where $R^M$ is as described above and X represents a hydroxyl group or a hydrolyzable substituent, e.g., of formula OZ described above. Silanes with four hydrolyzable substituents may have formula $SiX^2{}_4$, where each $X^2$ is independently selected from the group consisting of halogen, alkoxy, and hydroxyl. Suitable alkali metal silicates include sodium silicate.

The polyorganosilicate resin prepared as described above typically contain silicon bonded hydroxyl groups, e.g., of formula, $HOSiO_{3/2}$. The polyorganosilicate resin may comprise up to 3.5% of silicon bonded hydroxyl groups, as measured by FTIR spectroscopy and/or NMR spectroscopy, as described above. For certain applications, it may desirable for the amount of silicon bonded hydroxyl groups to be below 0.7%, alternatively below 0.3%, alternatively less than 1%, and alternatively 0.3% to 0.8%. Silicon bonded hydroxyl groups formed during preparation of the polyorganosilicate resin can be converted to trihydrocarbon siloxane groups or to a different hydrolyzable group by reacting the silicone resin with a silane, disiloxane, or disilazane containing the appropriate terminal group. Silanes containing hydrolyzable groups may be added in molar excess of the quantity required to react with the silicon bonded hydroxyl groups on the polyorganosilicate resin.

Alternatively, the polyorganosilicate resin may further comprise 2% or less, alternatively 0.7% or less, and alternatively 0.3% or less, and alternatively 0.3% to 0.8% of units containing hydroxyl groups, e.g., those represented by formula $XSiO_{3/2}$ where $R^M$ is as described above, and X represents a hydrolyzable substituent, e.g., OH. The concentration of silanol groups (where X═OH) present in the polyorganosilicate resin may be determined using FTIR spectroscopy and/or NMR as described above.

For use herein, the polyorganosilicate resin further comprises one or more terminal alkenyl groups per molecule. The polyorganosilicate resin having terminal alkenyl groups may be prepared by reacting the product of Daudt, et al. with an alkenyl group-containing endblocking agent and an endblocking agent free of aliphatic unsaturation, in an amount sufficient to provide from 3 to 30 mole percent of alkenyl groups in the final product. Examples of endblocking agents include, but are not limited to, silazanes, siloxanes, and silanes. Suitable endblocking agents are known in the art and exemplified in U.S. Pat. No. 4,584,355 to Blizzard, et al.; U.S. Pat. No. 4,591,622 to Blizzard, et al.; and U.S. Pat. No. 4,585,836 Homan, et al. A single endblocking agent or a mixture of such agents may be used to prepare such resin.

Alternatively, the polyorganosilicate resin may comprise unit formula (B2-17): $(R^4{}_3SiO_{1/2})_{mm}(R^4{}_2R^ASiO_{1/2})_{nn}(SiO_{4/2})_{oo}(ZO_{1/2})_h$, where Z, $R^4$, and $R^A$, and subscript h are as described above and subscripts mm, nn and oo have average values such that mm≥0, nn≥0, oo>0, and 0.5≤(mm+nn)/oo 4. Alternatively, 0.6≤(mm+nn)/oo≤4; alternatively 0.7≤(mm+nn)/oo≤4, and alternatively 0.8≤(mm+nn)/oo≤4.

Alternatively, (B2) the alkenyl-functional polyorganosiloxane may comprise (B2-18) an alkenyl-functional silsesquioxane resin, i.e., a resin containing trifunctional (T) units of unit formula: $(R^4{}_3SiO_{1/2})_a(R^4{}_2R^ASiO_{1/2})_b(R^4{}_2SiO_{2/2})_c(R^4R^ASiO_{2/2})_d(R^4SiO_{3/2})_e(R^ASiO_{3/2})(ZO_{1/2})_h$; where $R^4$ and $R^A$ are as described above, subscript f≥1, 2≤(e+f)≤10,000; 0≤(a+b)/(e+f)≤3; 0≤(c+d)/(e+f)≤3; and 0≤h/(e+f)≤1.5. Alternatively, the alkenyl-functional silsesquioxane resin may comprise unit formula (B2-19): $(R^4SiO_{3/2})_e(R^ASiO_{3/2})_f(ZO_{1/2})_h$, where $R^4$, $R^A$, Z, and subscripts h, e and f are as described above. Alternatively, the alkenyl-functional silsesquioxane resin may further comprise difunctional (D) units of formulae $(R^4{}_2SiO_{2/2})_c(R^4R^ASiO_{2/2})_d$ in addition to the T units described above, i.e., a DT resin, where subscripts c and d are as described above. Alternatively, the alkenyl-functional silsesquioxane resin may further comprise monofunctional (M) units of formulae $(R^4_3SiO_{1/2})_a(R^4_2R^4SiO_{1/2})_b$, i.e., an MDT resin, where subscripts a and b are as described above for unit formula (B2-1).

Alkenyl-functional silsesquioxane resins are commercially available, for example. RMS-310, which comprises unit formula (B2-20): $(Me_2ViSiO_{1/2})_{25}(PhSiO_{3/2})_{75}$ dissolved in toluene, is commercially available from Dow Silicones Corporation of Midland, Michigan, USA. Alkenyl-functional silsesquioxane resins may be produced by the hydrolysis and condensation or a mixture of trialkoxy silanes using the methods as set forth in "Chemistry and Technology of Silicone" by Noll, Academic Press, 1968, chapter 5, p 190-245. Alternatively, alkenyl-functional silsesquioxane resins may be produced by the hydrolysis and condensation of a trichlorosilane using the methods as set forth in U.S. Pat. No. 6,281,285 to Becker, et al. and U.S. Pat. No. 5,010,159 to Bank, et al. Alkenyl-functional silsesquioxane resins comprising D units may be prepared by known methods, such as those disclosed in U.S. Patent Application 2020/0140619 and PCT Publication WO2018/204068 to Swier, et al.

Alternatively, starting material (B) the alkenyl-functional organosilicon compound may comprise (B3) an alkenyl-functional silazane. The alkenyl-functional silazane may have formula (B3-1): $[(R^1_{(3-gg)}>R^4_{gg}Si)_{ff}NH_{(3-ff)}]_{hh}$, where $R^4$ is as described above; each $R^1$ is independently selected from the group consisting of an alkyl group and an aryl group; each subscript ff is independently 1 or 2; and subscript gg is independently 0, 1, or 2; where $1<hh<10$. For $R^1$, the alkyl group and the aryl group may be the alkyl group and the aryl group as described above for $R^4$. Alternatively, subscript hh may have a value such that $1<hh<6$. Examples of alkenyl-functional silazanes include, $MePhViSiNH_2$, $Me_2ViSiNH_2$, $(ViMe_2Si)_2NH$, $(MePhViSi)_2NH$. Alkenyl-functional silazanes may be prepared by known methods, for example, reacting an alkenyl-functional halosilane with ammonia under anhydrous or substantially anhydrous conditions, and thereafter distilling the resulting reaction mixture to separate cyclic alkenyl-functional silazanes and linear alkenyl-functional silazanes, such as those disclosed in U.S. Pat. No. 2,462,635 to Haber; U.S. Pat. No. 3,243,404 to Martellock; and PCT Publication No. WO83/02948 to Dziark. Suitable alkenyl-functional silazanes are commercially available, for example, 2,4,6-trimethyl-2,4,6-trivinyl-cyclotrisilazane $(MeViSiNH)_3$ is available from Sigma-Aldrich of St. Louis, MO, USA; sym-tetramethyldivinyldisilazane $(ViMe_2Si)_2NH$ is available from Alfa Aesar; and 1,3-divinyl-1,3-diphenyl-1,3-dimethyldisilazane $(MePhViSi)_2NH$ is available from Gelest, Inc. of Morrisville, Pennsylvania, USA.

Starting material (B) may be any one of the alkenyl-functional organosilicon compounds described above. Alternatively, starting material (B) may comprise a mixture of two or more of the alkenyl-functional organosilicon compounds.

Starting material (C), the hydroformylation reaction catalyst for use herein comprises an activated complex of rhodium and a close ended bisphosphite ligand. The bisphosphite ligand may be symmetric or asymmetric. Alternatively, the bisphosphite ligand may be symmetric. The bisphosphite ligand may have formula (C1):

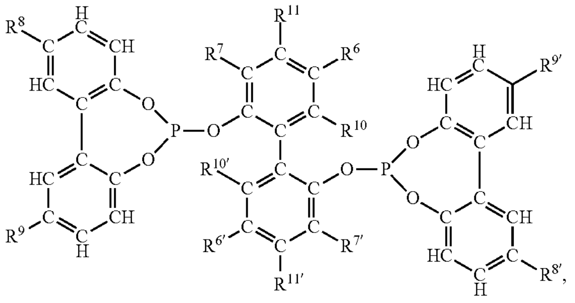

where $R^6$ and $R^{6'}$ are each independently selected from the group consisting of hydrogen, an alkyl group of at least one carbon atom, a cyano group, a halogen group, and an alkoxy group of at least one carbon atom; $R^7$ and $R^{7'}$ are each independently selected from the group consisting of an alkyl group of at least 3 carbon atoms and a group of formula —$SiR^{17}_3$, where each $R^{17}$ is an independently selected monovalent hydrocarbon group of 1 to 20 carbon atoms; $R^8$, $R^{8'}$, $R^9$, and $R^{9'}$ are each independently selected from the group consisting of hydrogen, an alkyl group, a cyano group, a halogen group, and an alkoxy group; and $R^{10}$, $R^{10'}$, $R^{11}$, and $R^{11'}$ are each independently selected from the group consisting of hydrogen and an alkyl group. Alternatively, one of $R^7$ and $R^{7'}$ may be hydrogen.

In formula (C1), $R^6$ and $R^{6'}$ may be alkyl groups of least one carbon atom, alternatively 1 to 20 carbon atoms. Suitable alkyl groups for $R^6$ and $R^{6'}$ may be linear, branched, cyclic, or combinations of two or more thereof. The alkyl groups are exemplified by methyl, ethyl, propyl (including n-propyl and/or isopropyl), butyl (including n-butyl, tert-butyl, sec-butyl, and/or isobutyl); pentyl, hexyl, heptyl, octyl, decyl, dodecyl, undecyl, and octadecyl (and branched isomers having 5 to 20 carbon atoms), and the alkyl groups are further exemplified by cycloalkyl groups such as cyclopropyl, cyclobutyl, cyclopentyl, and cyclohexyl. Alternatively, the alkyl group for $R^6$ and $R^{6'}$ may be selected from the group consisting of ethyl, propyl and butyl; alternatively propyl and butyl. Alternatively, the alkyl group for $R^6$ and $R^{6'}$ may be butyl. Alternatively, $R^6$ and $R^{6'}$ may be alkoxy groups, wherein the alkoxy group may have formula —$OR^{6''}$, where $R^{6''}$ is an alkyl group as described above for $R^6$ and $R^{6'}$.

Alternatively, in formula (C1), $R^6$ and $R^{6'}$ may be independently selected from alkyl groups of 1 to 6 carbon atoms and alkoxy groups of 1 to 6 carbon atoms. Alternatively, $R^6$ and $R^{6'}$ may be alkyl groups of 2 to 4 carbon atoms. Alternatively, $R^6$ and $R^{6'}$ may be alkoxy groups of 1 to 4 carbon atoms. Alternatively, $R^6$ and $R^{6'}$ may be butyl groups, alternatively tert-butyl groups. Alternatively, $R^6$ and $R^{6'}$ may be methoxy groups.

In formula (C1), $R^7$ and $R^{7'}$ may be alkyl groups of least three carbon atoms, alternatively 3 to 20 carbon atoms. Suitable alkyl groups for $R^7$ and $R^{7'}$ may be linear, branched, cyclic, or combinations of two or more thereof. The alkyl groups are exemplified by propyl (including n-propyl and/or isopropyl), butyl (including n-butyl, tert-butyl, sec-butyl, and/or isobutyl); pentyl, hexyl, heptyl, octyl, decyl, dodecyl, undecyl, and octadecyl (and branched isomers having 5 to 20 carbon atoms), and the alkyl groups are further exemplified by cycloalkyl groups such as cyclopropyl, cyclobutyl, cyclopentyl, and cyclohexyl. Alternatively, the alkyl group for $R^7$ and $R^{7'}$ may be selected from the group consisting of propyl and butyl. Alternatively, the alkyl group for $R^7$ and $R^{7'}$ may be butyl.

Alternatively, in formula (C1), $R^7$ and $R^{7'}$ may be a silyl group of formula —$SiR^{17}_3$, where each $R^{17}$ is an independently selected monovalent hydrocarbon group of 1 to 20 carbon atoms. The monovalent hydrocarbon group may be an alkyl group of 1 to 20 carbon atoms, as described above for $R^6$ and $R^{6'}$.

Alternatively, in formula (C1), $R^7$ and $R^{7'}$ may each be independently selected alkyl groups, alternatively alkyl groups of 3 to 6 carbon atoms. Alternatively, $R^7$ and $R^{7'}$ may be alkyl groups of 3 to 4 carbon atoms. Alternatively, $R^7$ and $R^{7'}$ may be butyl groups, alternatively tert-butyl groups.

In formula (C1), $R^8$, $R^{8'}$, $R^9$, $R^{9'}$ may be alkyl groups of at least one carbon atom, as described above for $R^6$ and $R^{6'}$. Alternatively, $R^8$ and $R^{8'}$ may be independently selected from the group consisting of hydrogen and alkyl groups of 1 to 6 carbon atoms. Alternatively, $R^8$ and $R^{8'}$ may be hydrogen. Alternatively, in formula (C1), $R^{9'}$ and $R^{9'}$ may be independently selected from the group consisting of hydrogen and alkyl groups of 1 to 6 carbon atoms. Alternatively, $R^9$ and $R^{9'}$ may be hydrogen.

In formula (C1), $R^{10}$ and $R^{10'}$ may be hydrogen atoms or alkyl groups of least one carbon atom, alternatively 1 to 20 carbon atoms. The alkyl groups for $R^{10}$ and $R^{10'}$ may be as described above for $R^6$ and $R^{6'}$. Alternatively, $R^{10}$ and $R^{10'}$ may be methyl. Alternatively, $R^{10}$ and $R^{10'}$ may be hydrogen.

In formula (C1), $R^{11}$ and $R^{11'}$ may be hydrogen atoms or alkyl groups of least one carbon atom, alternatively 1 to 20 carbon atoms. The alkyl groups for $R^{11}$ and $R^{11'}$ may be as described above for $R^6$ and $R^{6'}$. Alternatively, $R^{11}$ and $R^{11'}$ may be hydrogen.

Alternatively, the ligand of formula (C1) may be selected from the group consisting of (C1-1) 6,6'-[[3,3',5,5'-tetrakis(1,1-dimethylethyl)-1,1'-biphenyl]-2,2'-diyl]bis(oxy)]bis-dibenzo[d,f][1,3,2]dioxaphosphepin; (C1-2) 6,6'-[(3,3'-di-tert-butyl-5,5'-dimethoxy-1,1'-biphenyl-2,2'-diyl)bis(oxy)]bis(dibenzo[df][1,3,2]dioxaphosphepin); and a combination of both (C1-1) and (C1-2).

Alternatively, the ligand may comprise 6,6'-[[3,3',5,5'-tetrakis(1,1-dimethylethyl)-1,1'-biphenyl]-2,2'-diyl]bis(oxy)]bis-dibenzo[d,f][1,3,2]dioxaphosphepin, as disclosed at col. 11 of U.S. Pat. No. 10,023,516 (see also U.S. Pat. No. 7,446,231, which discloses this compound as Ligand D at col. 22 and U.S. Pat. No. 5,727,893 at col. 20, lines 40-60 as ligand F).

Alternatively, the ligand may comprise biphephos, which is commercially available from Sigma Aldrich and may be prepared as described in U.S. Pat. No. 9,127,030. (See also U.S. Pat. No. 7,446,231 ligand B at col. 21 and U.S. Pat. No. 5,727,893 at col. 20, lines 5-18 as ligand D).

Starting material (C), the rhodium/bisphosphite ligand complex catalyst, may be prepared by methods known in the art, such as those disclosed in U.S. Pat. No. 4,769,498 to Billig, et al. at col. 20, line 50-col. 21, line 40 and U.S. Pat. No. 10,023,516 to Brammer et al. col. 11, line 35-col. 12, line 12 by varying appropriate starting materials. For example, the rhodium/bisphosphite ligand complex may be prepared by a process comprising combining a rhodium precursor and the bisphosphite ligand (C1) described above under conditions to form the complex, which complex may then be introduced into a hydroformylation reaction medium comprising one or both of starting materials (A) and/or (B), described above. Alternatively, the rhodium/bisphosphite ligand complex may be formed in situ by introducing the rhodium catalyst precursor into the reaction medium, and introducing (C1) the bisphosphite ligand into the reaction medium (e.g., before, during, and/or after introduction of the rhodium catalyst precursor), for the in situ formation of the rhodium/bisphosphite ligand complex. The rhodium/bisphosphite ligand complex can be activated by heating and/or exposure to starting material (A) to form the (C) rhodium/bisphosphite ligand complex catalyst. Rhodium catalyst precursors are exemplified by rhodium dicarbonyl acetylacetonate, $Rh_2O_3$, $Rh_4(CO)_{12}$, $Rh_6(CO)_{16}$, and $Rh(NO_3)_3$.

For example, a rhodium precursor, such as rhodium dicarbonyl acetylacetonate, optionally starting material (D), a solvent, and (C1) the bisphosphite ligand may be combined, e.g., by any convenient means such as mixing. The resulting rhodium/bisphosphite ligand complex may be introduced into the reactor, optionally with excess bisphosphite ligand. Alternatively, the rhodium precursor, (D) the solvent, and the bisphosphite ligand may be combined in the reactor with starting material (A) and/or (B), the alkenyl-functional organosilicon compound; and the rhodium/bisphosphite ligand complex may form in situ. The relative amounts of bisphosphite ligand and rhodium precursor are sufficient to provide a molar ratio of bisphosphite ligand/Rh of 10/1 to 1/1, alternatively 5/1 to 1/1, alternatively 3/1 to 1/1, alternatively 2.5/1 to 1.5/1. In addition to the rhodium/bisphosphite ligand complex, excess (e.g., not complexed) bisphosphite ligand may be present in the reaction mixture. The excess bisphosphite ligand may be the same as, or different from, the bisphosphite ligand in the complex.

The amount of (C) the rhodium/bisphosphite ligand complex catalyst (catalyst) is sufficient to catalyze hydroformylation of (B) the alkenyl-functional organosilicon compound. The exact amount of catalyst will depend on various factors including the type of alkenyl-functional organosilicon compound selected for starting material (B), its exact alkenyl content, and the reaction conditions such as temperature and pressure of starting material (A). However, the amount of (C) the catalyst may be sufficient to provide a rhodium metal concentration of at least 0.1 ppm, alternatively 0.15 ppm, alternatively 0.2 ppm, alternatively 0.25 ppm, and alternatively 0.5 ppm, based on the weight of (B) the alkenyl-functional organosilicon compound. At the same time, the amount of (C) the catalyst may be sufficient to provide a rhodium metal concentration of up to 300 ppm, alternatively up to 100 ppm, alternatively up to 20 ppm, and alternatively up to 5 ppm, on the same basis. Alternatively, the amount of (C) the catalyst may be sufficient to provide 0.1 ppm to 300 ppm, alternatively 0.2 ppm to 100 ppm, alternatively, 0.25 ppm to 20 ppm, and alternatively 0.5 ppm to 5 ppm, based on the weight of (B) the alkenyl-functional organosilicon compound.

The hydroformylation process reaction may run without additional solvents. Alternatively, the hydroformylation process reaction may be carried out with a solvent, for example to facilitate mixing and/or delivery of one or more of the starting materials described above, such as the (C) catalyst and/or starting material (B), when a solvent such as an alkenyl-functional polyorganosilicate resin is selected for starting material (B). The solvent is exemplified by aliphatic or aromatic hydrocarbons, which can dissolve the starting materials, e.g., toluene, xylene, benzene, hexane, heptane, decane, cyclohexane, or a combination of two or more thereof. Additional solvents include THF, dibutyl ether, diglyme, and Texanol. Without wishing to be bound by theory, it is thought that solvent may be used to reduce the viscosity of the starting materials. The amount of solvent is not critical, however, when present, the amount of solvent may be 5% to 70% based on weight of starting material (B) the alkenyl-functional organosilicon compound.

In the process described herein, step 1) is performed at relatively low temperature. For example, step 1) may be performed at a temperature of at least 30° C., alternatively at least 50° C., and alternatively at least 70° C. At the same time, the temperature in step 1) may be up to 150° C.; alternatively up to 100° C.; alternatively up to 90° C., and alternatively up to 80° C. Without wishing to be bound by theory, it is thought that lower temperatures, e.g., 30° C. to 90° C., alternatively 40° C. to 90° C., alternatively 50° C. to 90° C., alternatively 60° C. to 90° C., alternatively 70° C. to 90° C., alternatively 80° C. to 90° C., alternatively 30° C. to 60° C., alternatively 50° C. to 60° C. may be desired for achieving high selectivity and ligand stability.

In the process described herein, step 1) may be performed at a pressure of at least 101 kPa (ambient), alternatively at least 206 kPa (30 psi), and alternatively at least 344 kPa (50 psi). At the same time, pressure in step 1) may be up to 6,895 kPa (1,000 psi), alternatively up to 1,379 kPa (200 psi), alternatively up to 1000 kPa (145 psi), and alternatively up to 689 kPa (100 psi). Alternatively, step 1) may be performed at 101 kPa to 6,895 kPa; alternatively 344 kPa to 1,379 kPa; alternatively 101 kPa to 1,000 kPa; and alternatively 344 kPa to 689 kPa. Without wishing to be bound by theory, it is thought that using relatively low pressures, e.g., < to 6,895 kPa in the process herein may be beneficial; the ligands described herein allow for low pressure hydroformylation processes, which have the benefits of lower cost and better safety than high pressure hydroformylation processes.

The hydroformylation process may be carried out in a batch, semi-batch, or continuous mode, using one or more suitable reactors, such as a fixed bed reactor, a fluid bed reactor, a continuous stirred tank reactor (CSTR), or a slurry reactor. The selection of (B) the alkenyl-functional organosilicon compound, and (C) the catalyst, and whether (D) the solvent, is used may impact the size and type of reactor used. One reactor, or two or more different reactors, may be used. The hydroformylation process may be conducted in one or more steps, which may be affected by balancing capital costs and achieving high catalyst selectivity, activity, lifetime, and ease of operability, as well as the reactivity of the particular starting materials and reaction conditions selected, and the desired product.

Alternatively, the hydroformylation process may be performed in a continuous manner. For example, the process used may be as described in U.S. Pat. No. 10,023,516 except that the olefin feed stream and catalyst described therein are replaced with (B) the alkenyl-functional organosilicon compound and (C) the rhodium/bisphosphite ligand complex catalyst, each described herein.

Step 1) of the hydroformylation process forms a reaction fluid comprising the aldehyde-functional organosilicon compound. The reaction fluid may further comprise additional materials, such as those which have either been deliberately employed, or formed in situ, during step 1) of the process. Examples of such materials that can also be present include unreacted (B) alkenyl-functional organosilicon compound, unreacted (A) carbon monoxide and hydrogen gases, and/or in situ formed side products, such as ligand degradation products and adducts thereof, and high boiling liquid aldehyde condensation byproducts, as well as (D) a solvent, if employed. The term “ligand degradation product” includes but is not limited to any and all compounds resulting from one or more chemical transformations of at least one of the ligand molecules used in the process.

The hydroformylation process may further comprise one or more additional steps such as: 2) recovering (C) the rhodium/bisphosphite ligand complex catalyst from the reaction fluid comprising the aldehyde-functional organosilicon compound. Recovering (C) the rhodium/bisphosphite ligand complex catalyst may be performed by methods known in the art, including but not limited to adsorption and/or membrane separation (e.g., nanofiltration). Suitable recovery methods are as described, for example, in U.S. Pat. No. 5,681,473 to Miller, et al.; U.S. Pat. No. 8,748,643 to Priske, et al.; and 10,155,200 to Geilen, et al.

However, one benefit of the process described herein is that (C) the catalyst need not be removed and recycled. Due to the low level of Rh needed, it may be more cost effective not to recover and recycle (C) the catalyst; and the aldehyde-functional organosilicon compound produced by the process may be stable even when the catalyst is not removed. Therefore, alternatively, the process described above may be performed without step 2).

Alternatively, the hydroformylation process may further comprise 3) purification of the reaction product. For example, the aldehyde-functional organosilicon compound may be isolated from the additional materials, described above, by any convenient means such as stripping and/or distillation, optionally with reduced pressure.

The aldehyde-functional organosilicon compound is useful as a starting material in the process described above for preparing a carbinol-functional organosilicon compound. Starting material (E) is the aldehyde-functional organosilicon compound, which has, per molecule, at least one aldehyde-functional group covalently bonded to silicon. Alternatively, the aldehyde-functional organosilicon compound may have, per molecule, more than one aldehyde-functional group covalently bonded to silicon. The aldehyde-functional group covalently bonded to silicon may have formula:

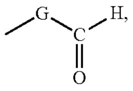

where G is a divalent hydrocarbon group free of aliphatic unsaturation that has 2 to 8 carbon atoms. G may be linear or branched. Examples of divalent hydrocarbyl groups for G include alkane-diyl groups of empirical formula $—C_rH_{2r}—$, where subscript r is 2 to 8. The alkane-diyl group may be a linear alkane-diyl, e.g., $—CH_2—CH_2—$, $—CH_2—CH_2—CH_2—$, $—CH_2—CH_2—CH_2—CH_2—$, or $—CH_2—CH_2—CH_2—CH_2—CH_2—CH_2—$, or a branched alkane-diyl, e.g.,

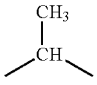, 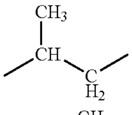, 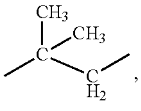, or 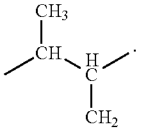.

Alternatively, each G may be an alkane-diyl group of 2 to 6 carbon atoms; alternatively of 2, 3, or 6 carbon atoms. The aldehyde-functional organosilicon compound may be one aldehyde-functional organosilicon compound. Alternatively, two or more aldehyde-functional organosilicon compounds that differ from one another may be used in the process described herein. For example, the aldehyde-functional organosilicon compound may comprise one or both of an aldehyde-functional silane and an aldehyde-functional polyorganosiloxane.

The aldehyde-functional organosilicon compound may comprise an aldehyde-functional silane of formula (E1): $R^{Ald}_xSiR^4_{(4-x)}$, where each $R^{Ald}$ is an independently selected group of the formula

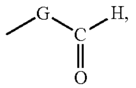

as described above; and $R^4$ and subscript x are as described above, e.g., each $R^4$ is independently selected from the group consisting of an alkyl group of 1 to 18 carbon atoms, an aryl group of 6 to 18 carbon atoms, an acyloxy group of 2 to 18 carbon atoms, and an hydrocarbonoxy-functional group of 1 to 18 carbon atoms; and subscript x is 1 to 4.

Suitable aldehyde-functional silanes are exemplified by aldehyde-functional trialkylsilanes such as (propyl-aldehyde)-trimethylsilane, (propyl-aldehyde)-triethylsilane, and (butyl-aldehyde)trimethylsilane; aldehyde-functional trialkoxysilanes such as (butyl-aldehyde)trimethoxysilane, (propyl-aldehyde)-trimethoxysilane, (propyl-aldehyde)-triethoxysilane, (propyl-aldehyde)-triisopropoxysilane, and (propyl-aldehyde)-tris(methoxyethoxy)silane; aldehyde-functional dialkoxysilanes such as (propyl-aldehyde)-phenyldiethoxysilane, (propyl-aldehyde)-methyldimethoxysilane, and (propyl-aldehyde)-methyldiethoxysilane; aldehyde-functional monoalkoxysilanes such as tri(propyl-aldehyde)-methoxysilane; aldehyde-functional triacyloxysilanes such as (propyl-aldehyde)-triacetoxysilane, and aldehyde-functional diacyloxysilanes such as (propyl-aldehyde)-methyldiacetoxysilane.

Alternatively, the aldehyde-functional organosilicon compound may comprise (E2) an aldehyde-functional polyorganosiloxane. Said aldehyde-functional polyorganosiloxane may be cyclic, linear, branched, resinous, or a combination of two or more thereof. Said aldehyde-functional polyorganosiloxane may comprise unit formula (E2-1): $(R^4_3SiO_{1/2})_a(R^4_2R^{Ald}SiO_{1/2})_b(R^4_2SiO_{2/2})_c(R^4R^{Ald}SiO_{2/2})_d(R^4SiO_{3/2})_e(R^{Ald}SiO_{3/2})_f(SiO_{4/2})_g(ZO_{1/2})_h$; where each $R^{Ald}$ is an independently selected aldehyde group of the formula

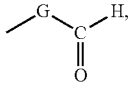

as described above, and $R^4$, Z, and subscripts a, b, c, d, e, f, g, and h are as described above. Each $R^4$ is independently selected from the group consisting of an alkyl group of 1 to 18 carbon atoms, an aryl group of 6 to 18 carbon atoms, and an hydrocarbonoxy group of 1 to 18 carbon atoms. Each Z is independently selected from the group consisting of a hydrogen atom and $R^5$, where each $R^5$ is independently selected from the group consisting of alkyl groups of 1 to 18 carbon atoms and aryl groups of 6 to 18 carbon atoms. Subscripts a, b, c, d, e, f, and g represent average numbers, per molecule, of each unit in the unit formula. Subscripts a, b, c, d, e, f, and g and have values such that subscript a≥0, subscript b≥0, subscript c≥0, subscript d≥0, subscript e≥0, subscript f≥0, subscript g≥0; and subscript h has a value such that 0≤h/(e+f+g)≤1.5, 10,000≥(a+b+c+d+e+f+g)≥2, and a quantity (b+d+f)≥1. At the same time, the quantity (a+b+c+d+e+f+g) may be ≤10,000. Alternatively, in the unit formula (E2-1) for the aldehyde-functional polyorganosiloxane, each $R^4$ may be independently selected from the group consisting of a hydrogen atom, an alkyl group of 1 to 18 carbon atoms, an aryl group of 6 to 18 carbon atoms, and a hydrocarbonoxy-functional group of 1 to 18 carbon atoms. Alternatively, each $R^4$ may be independently selected from the group consisting of an alkyl group of 1 to 18 carbon atoms, an aryl group of 6 to 18 carbon atoms, and an alkoxy-functional group of 1 to 18 carbon atoms. Alternatively, each $R^4$ may be independently selected from the group consisting of an alkyl group of 1 to 18 carbon atoms and an aryl group of 6 to 18 carbon atoms. Alternatively, each Z may be hydrogen or an alkyl group of 1 to 6 carbon atoms. Alternatively, each Z may be hydrogen.

Alternatively, (E2) the aldehyde-functional polyorganosiloxane may comprise (E2-2) a linear polydiorganosiloxane having, per molecule, at least one aldehyde-functional group; alternatively at least two aldehyde-functional groups (e.g., when in the formula (E2-1) for the aldehyde-functional polyorganosiloxane above, subscripts e=f=g=0). For example, said polydiorganosiloxane may comprise unit formula (E2-3): $(R^4_3SiO_{1/2})_a(R^{Ald}R^4_2SiO_{1/2})_b(R^4_2SiO_{2/2})_c(R^{Ald}R^4SiO_{2/2})_d$, where $R^{Ald}$ and $R^4$ are as described above, subscript a is 0, 1, or 2; subscript b is 0, 1, or 2, subscript c≥0, subscript d≥0, with the provisos that a quantity (b+d) ≥1, a quantity (a+b)=2, and a quantity (a+b+c+d)≥2. Alternatively, in the unit formula (E2-3) for the linear aldehyde-functional polyorganosiloxane, above, the quantity (a+b+c+d) may be at least 3, alternatively at least 4, and alternatively >50. At the same time said formula, the quantity (a+b+c+d) may be less than or equal to 10,000; alternatively less than or equal to 4,000; alternatively less than or equal to 2,000; alternatively less than or equal to 1,000; alternatively less than or equal to 500; alternatively less than or equal to 250. Alternatively, in the unit formula for the linear aldehyde-functional polyorganosiloxane, each $R^4$ may be independently selected from the group consisting of alkyl and aryl; alternatively methyl and phenyl. Alternatively, each $R^4$ in said formula may be an alkyl group; alternatively each $R^4$ may be methyl.

Alternatively, the linear aldehyde-functional polydiorganosiloxane of unit formula (E2-3) may be selected from the group consisting of: unit formula (E2-4): $(R^4_2R^{Ald}SiO_{1/2})_2(R^4_2SiO_{2/2})_m(R^4R^{Ald}SiO_{2/2})_n$, unit formula (E2-5): $(R^4_3SiO_{2/2})_2(R^4_2SiO_{2/2})_o(R^4R^{Ald}SiO_{2/2})_p$, or a combination of both (E2-4) and (E2-5).

In formulae (E2-4) and (E2-5), each $R^4$ and $R^{Ald}$ are as described above. Subscript m may be 0 or a positive number. Alternatively, subscript m may be at least 2. Alternatively subscript m be 2 to 2,000. Subscript n may be 0 or a positive number. Alternatively, subscript n may be 0 to 2000. Subscript o may be 0 or a positive number. Alternatively, subscript o may be 0 to 2000. Subscript p is at least 2. Alternatively subscript p may be 2 to 2000.

Starting material (E2) may comprise an aldehyde-functional polydiorganosiloxane such as i) bis-dimethyl(propyl-aldehyde)siloxy-terminated polydimethylsiloxane, ii) bis-dimethyl(propyl-aldehyde)siloxy-terminated poly(dimethylsiloxane/methyl(propyl-aldehyde)siloxane), iii) bis-dimethyl(propyl-aldehyde)siloxy-terminated polymethyl(propyl-aldehyde)siloxane, iv) bis-trimethylsiloxy-terminated poly(dimethylsiloxane/methyl(propyl-aldehyde)siloxane), v) bis-trimethylsiloxy-terminated polymethyl (propyl-aldehyde)siloxane, vi) bis-dimethyl(propyl-aldehyde)siloxy-terminated poly(dimethylsiloxane/methylphenylsiloxane/methyl(propyl-aldehyde)siloxane), vii) bis-dimethyl(propyl-aldehyde)siloxy-terminated poly(dimethylsiloxane/methylphenylsiloxane), viii) bis-dimethyl(propyl-aldehyde)siloxy-terminated poly(dimethylsiloxane/diphenylsiloxane), ix) bis-phenyl,methyl,(propyl-aldehyde)-siloxy-terminated polydimethylsiloxane, x) bis-dimethyl(heptyl-aldehyde)siloxy-terminated polydimethylsiloxane, xi) bis-dimethyl(heptyl-aldehyde)siloxy-terminated poly(dimethylsiloxane/methyl(heptyl-aldehyde)siloxane), xii) bis-dimethyl(heptyl-aldehyde)siloxy-terminated polymethyl(heptyl-aldehyde)siloxane, xiii) bis-trimethylsiloxy-terminated poly(dimethylsiloxane/methyl(heptyl-aldehyde)siloxane), xiv) bis-trimethylsiloxy-terminated polymethyl(heptyl-aldehyde)siloxane, xv) bis-dimethyl(heptyl-aldehyde)-siloxy terminated poly(dimethylsiloxane/methylphenylsiloxane/methyl(heptyl-aldehyde)siloxane), xvi) bis-dimethyl(propyl-aldehyde) siloxy-terminated poly(dimethylsiloxane/methyl(heptyl-aldehyde)siloxane), xvii) bis-dimethyl(heptyl-aldehyde)-siloxy-terminated poly(dimethylsiloxane/methylphenylsiloxane), xviii) dimethyl(heptyl-aldehyde)-siloxy-terminated poly(dimethylsiloxane/diphenylsiloxane), and xix) a combination of two or more of i) to xviii).

Alternatively, (E2) the aldehyde-functional polyorganosiloxane may be cyclic, e.g., when in unit formula (E2-1), subscripts a=b=c=e=f=g=h=0. The (E2-6) cyclic aldehyde-functional polydiorganosiloxane may have unit formula (E2-7): $(R^4R^{Ald}SiO_{2/2})_a$, where $R^{Ald}$ and $R^4$ are as described above, and subscript d may be 3 to 12, alternatively 3 to 6, and alternatively 4 to 5. Examples of cyclic aldehyde-functional polydiorganosiloxanes include 2,4,6-trimethyl-2,4,6-tri(propyl-aldehyde)-cyclotrisiloxane, 2,4,6,8-tetramethyl-2,4,6,8-tetra(propyl-aldehyde)-cyclotetrasiloxane, 2,4,6,8,10-pentamethyl-2,4,6,8,10-penta(propyl-aldehyde)-cyclopentasiloxane, and 2,4,6,8,10,12-hexamethyl-2,4,6,8,10,12-hexa(propyl-aldehyde)-cyclohexasiloxane.

Alternatively, (E2-6) the cyclic aldehyde-functional polydiorganosiloxane may have unit formula (E2-8): $(R^4{}_2SiO_{2/2})_c(R^4R^{Ald}SiO_{2/2})_a$, where $R^4$ and $R^{Ald}$ are as described above, subscript c is >0 to 6 and subscript d is 3 to 12. Alternatively, in formula (E2-8), a quantity (c+d) may be 3 to 12. Alternatively, in formula (E2-8), c may be 3 to 6, and d may be 3 to 6.

Alternatively, (E2) the aldehyde-functional polyorganosiloxane may be (E2-9) oligomeric, e.g., when in unit formula (E2-1) above the quantity $(a+b+c+d+e+f+g)\leq 50$, alternatively ≤40, alternatively ≤30, alternatively ≤25, alternatively ≤20, alternatively ≤10, alternatively ≤5, alternatively ≤4, alternatively ≤3. The oligomer may be cyclic, linear, branched, or a combination thereof. The cyclic oligomers are as described above as starting material (E2-6).

Examples of linear aldehyde-functional polyorganosiloxane oligomers may have formula (E2-10):

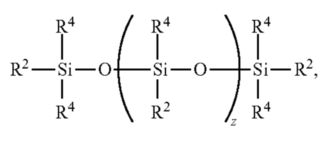

where $R^4$ is as described above, each $R^2$ is independently selected from the group consisting of $R^4$ and $R^{Ald}$, with the proviso that at least one $R^2$, per molecule, is $R^{Ald}$, and subscript z is 0 to 48. Examples of linear aldehyde-functional polyorganosiloxane oligomers include 1,3-di(propyl-aldehyde)-1,1,3,3-tetramethyldisiloxane; 1,1,1,3,3-pentamethyl-3-(propyl-aldehyde)-disiloxane; and 1,1,1,3,5,5,5-heptamethyl-3-(propyl-aldehyde)-trisiloxane.

Alternatively, the aldehyde-functional polyorganosiloxane oligomer may be branched. The branched oligomer may have general formula (E2-11): $R^{Ald}SiR^{12}{}_3$, where $R^{Ald}$ is as described above and each $R^{12}$ is selected from $R^{13}$ and $—OSi(R^{14})_3$; where each $R^{13}$ is a monovalent hydrocarbon group; where each $R^{14}$ is selected from $R^{13}$, $—OSi(R^{15})_3$, and $—[OSiR^{13}{}_2]_{ii}OSiR^{13}{}_3$; where each $R^{15}$ is selected from $R^{13}$, $—OSi(R^{16})_3$, and $—[OSiR^{13}{}_2]_{ii}OSiR^{13}{}_3$; where each $R^{16}$ is selected from $R^{13}$ and $—[OSiR^{13}{}_2]_{ii}OSiR^{13}{}_3$; and where subscript ii has a value such that $0\leq ii\leq 100$. At least two of $R^{12}$ may be $—OSi(R^{14})_3$. Alternatively, all three of $R^{12}$ may be $—OSi(R^{14})_3$.

Alternatively, in formula (E2-11) when each $R^{12}$ is $—OSi(R^{14})_3$, each $R^{14}$ may be $—OSi(R^{15})_3$ moieties such that the branched polyorganosiloxane oligomer has the following structure:

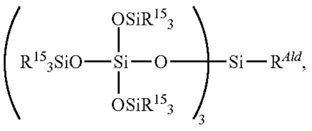

where $R^{Ald}$ and $R^{15}$ are as described above. Alternatively, each $R^{15}$ may be an $R^{13}$, as described above, and each $R^{13}$ may be methyl.

Alternatively, in formula (E2-11), when each $R^{12}$ is $—OSi(R^{14})_3$, one $R^{14}$ may be $R^{13}$ in each $—OSi(R^{14})_3$ such that each $R^{12}$ is $—OSiR^{13}(R^{14})_2$. Alternatively, two $R^{14}$ in $—OSiR^{13}(R^{14})$ may each be $—OSi(R^{15})_3$ moieties such that the branched aldehyde-functional polyorganosiloxane oligomer has the following structure:

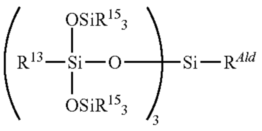

where $R^{Ald}$, $R^{13}$, and $R^{15}$ are as described above. Alternatively, each $R^{15}$ may be an $R^{13}$, and each $R^{13}$ may be methyl.

Alternatively, in formula (B2-11), one $R^{12}$ may be $R^{13}$, and two of $R^{12}$ may be $—OSi(R^{14})_3$. When two of $R^{12}$ are $—OSi(R^{14})_3$, and one $R^{14}$ is $R^{13}$ in each $—OSi(R^{14})_3$ then two of are $—OSiR^{13}(R^{14})_2$. Alternatively, each $R^{14}$ in $—OSiR^{13}(R^{14})_2$ may be $—OSi(R^5)_3$ such that the branched polyorganosiloxane oligomer has the following structure:

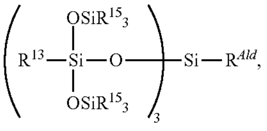

where $R^{Ald}$, $R^{13}$, and $R^{15}$ are as described above. Alternatively, each $R^{15}$ may be an $R^{13}$, and each $R^{13}$ may be methyl. Alternatively, the aldehyde-functional branched polyorganosiloxane may have 3 to 16 silicon atoms per molecule, alternatively 4 to 16 silicon atoms per molecule, and alternatively 4 to 10 silicon atoms per molecule. Examples of aldehyde-functional branched polyorganosiloxane oligomers include 3-(3,3,3-trimethyl-1-$\lambda^2$-disiloxaneyl)propanal (which can also be named propyl-aldehyde-tris(trimethyl) siloxy)silane), which has formula:

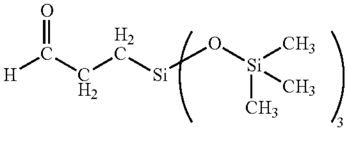
;

3-(1,3,5,5,5-pentamethyl-1$\lambda^3$,3$\lambda^3$-trisiloxaneyl)propanal (which can also be named methyl-(propyl-aldehyde)-di((1,1,1,3,5,5,5-heptamethyltrisiloxan-3-yl)oxy)-silane), which has formula

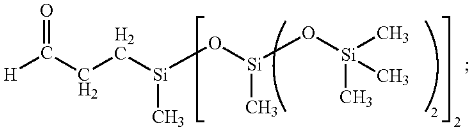
;

3-(3,5,5,5-tetramethyl-1$\lambda^2$,3$\lambda^3$-trisiloxaneyl)propanal (which can also be named (propyl-aldehyde)-tris((1,1,1,3,5,5,5-heptamethyltrisiloxan-3-yl)oxy)-silane), which has formula

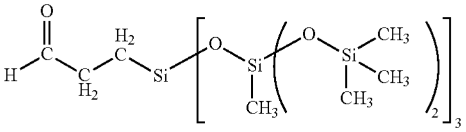
;

and 7-(3,5,5,5-tetramethyl-1$\lambda^2$,3$\lambda^3$-trisiloxaneyl)heptanal (which can also be named (heptyl-aldehyde)-tris((1,1,1,3,5,5,5-heptamethyltrisiloxan-3-yl)oxy)-silane), which has formula

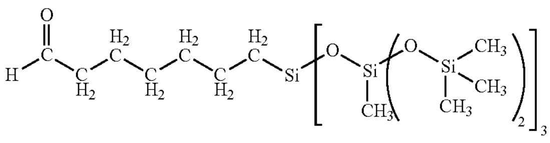
.

Alternatively, (E2) the aldehyde-functional polyorganosiloxane may be branched, such as the branched oligomer described above and/or a branched aldehyde-functional polyorganosiloxane that may have, e.g., more aldehyde groups per molecule and/or more polymer units than the branched oligomer described above (e.g., in formula (E2-1) when the quantity (a+b+c+d+e+f+g)>50). The branched aldehyde-functional polyorganosiloxane may have (in formula (E2-1)) a quantity (e+f+g) sufficient to provide >0 to 5 mol % of trifunctional and/or quadrifunctional units to the branched aldehyde-functional polyorganosiloxane.

For example, the branched aldehyde-functional polyorganosiloxane may comprise a Q branched polyorganosiloxane of unit formula (E2-13): $(R^4_3SiO_{1/2})_q(R^4_2R^{Ald}SiO_{1/2})_r(R^4_2SiO_{2/2})_s(SiO_{4/2})_t$, where $R^4$ and $R^{Ald}$ are as described above, and subscripts q, r, s, and t have average values such that 2≥q≥0, 4≥r≥0, 995≥s≥4, t=1, (q+r)=4, and (q+r+s+t) has a value sufficient to impart a viscosity>170 mPa·s measured by rotational viscometry (as described below with the test methods) to the branched polyorganosiloxane. Alternatively, viscosity may be >170 mPa·s to 1000 mPa·s, alternatively ≥170 to 500 mPa·s, alternatively 180 mPa·s to 450 mPa·s, and alternatively 190 mPa·s to 420 mPa·s.

Alternatively, the branched aldehyde-functional polyorganosiloxane may comprise formula (E2-14): $[R^{Ald}R^4_2Si—(O—SiR^4_2)_x—O]_{(4-w)}—Si—[O—(R^4_2SiO)_vSiR^4_3]_w$, where $R^{Ald}$ and $R^4$ are as described above; and subscripts v, w, and x have values such that 200≥v≥1, 2≥w≥0, and 200≥x≥1. Alternatively, in this formula (E2-14), each $R^4$ is independently selected from the group consisting of methyl and phenyl, and each $R^{Ald}$ has the formula above, wherein G has 2, 3, or 6 carbon atoms.

Alternatively, the branched aldehyde-functional polyorganosiloxane for starting material (E2-11) may comprise a T branched polyorganosiloxane (silsesquioxane) of unit formula (E2-15): $(R^4_3SiO_{1/2})_{aa}(R^{Ald}R^4_2SiO_{1/2})_{bb}(R^4_2SiO_{2/2})_{cc}(R^{Ald}R^4SiO_{2/2})_{ee}(R^4SiO_{3/2})_{dd}$, where $R^4$ and $R^{Ald}$ are as described above, subscript aa≥0, subscript bb≥0, subscript cc is 15 to 995, subscript dd≥0, and subscript ee≥0. Subscript aa may be 0 to 10. Alternatively, subscript aa may have a value such that: 12≥aa≥0; alternatively 10≥aa≥0; alternatively 7≥aa≥0; alternatively 5≥aa≥0; and alternatively 3≥aa≥0. Alternatively, subscript bb≥1. Alternatively, subscript bb≥3. Alternatively, subscript bb may have a value such that: 12≥bb>0; alternatively 12≥bb≥3; alternatively 10≥bb≥0; alternatively 7≥bb≥1; alternatively 5≥bb≥2; and alternatively 7≥bb≥3. Alternatively, subscript cc may have a value such that: 800≥cc≥15; and alternatively 400≥cc≥15. Alternatively, subscript ee may have a value such that: 800≥ee≥0; 800≥ee≥15; and alternatively 400≥ee≥15. Alternatively, subscript ee may b 0. Alternatively, a quantity (cc+ee) may have a value such that 995≥(cc+ee)≥15. Alternatively, subscript dd≥1. Alternatively, subscript dd may be 1 to 10. Alternatively, subscript dd may have a value such that: 10≥dd≥0; alternatively 5≥dd≥0; and alternatively dd=1. Alternatively, subscript dd may be 1 to 10, alternatively subscript dd may be 1 or 2. Alternatively, when subscript dd=1, then subscript bb may be 3 and subscript cc may be 0. The values for subscript bb may be sufficient to provide the silsesquioxane of unit formula (E2-15) with an aldehyde content of 0.1% to 1%, alternatively 0.2% to 0.6%, based on the weight of the silsesquioxane.

Alternatively, (E2) the aldehyde-functional polyorganosiloxane may comprise an aldehyde-functional polyorganosiloxane resin, such as an aldehyde-functional polyorganosilicate resin and/or an aldehyde-functional silsesquioxane resin. Such resins may be prepared, for example, by hydroformylating an alkenyl-functional polyorganosiloxane resin, as described above. The aldehyde-functional polyorganosilicate resin comprises monofunctional units ("M'" units) of formula $R^{M'}_3SiO_{1/2}$ and tetrafunctional silicate units ("Q" units) of formula $SiO_{4/2}$, where each $R^{M'}$ may be independently selected from the group consisting of $R^4$ and $R^{Ald}$ as described above. Alternatively, each $R^{M'}$ may be selected from the group consisting of an alkyl group, an aldehyde-functional group of the formula shown above, and an aryl group. Alternatively, each $R^{M'}$ may be selected from methyl, (propyl-aldehyde) and phenyl. Alternatively, at least one-third, alternatively at least two thirds of the $R^{M'}$ groups are methyl groups. Alternatively, the M' units may be exemplified by $(Me_3SiO_{1/2})$, $(Me_2PhSiO_{1/2})$, and $(Me_2R^{Ald}SiO_{1/2})$. The polyorganosilicate resin is soluble in solvents such as those described herein as starting material (D), exemplified by liquid hydrocarbons, such as benzene, ethylbenzene, toluene, xylene, and heptane, or in liquid non-functional organosilicon compounds such as low viscosity linear and cyclic polydiorganosiloxanes.

When prepared, the polyorganosilicate resin comprises the M' and Q units described above, and the polyorganosiloxane further comprises units with silicon bonded hydroxyl groups, and/or hydrolyzable groups, described by moiety $(ZO_{1/2})$, above, and may comprise neopentamer of formula $Si(OSiR^{M'}_3)_4$, where $R^{M'}$ is as described above, e.g., the neopentamer may be tetrakis(trimethylsiloxy)silane. $^{29}Si$ NMR and $^{13}C$ NMR spectroscopies may be used to measure hydroxyl and alkoxy content and molar ratio of M' and Q units, where said ratio is expressed as {M'(resin)}/{Q(resin)}, excluding M' and Q units from the neopentamer. M'/Q ratio represents the molar ratio of the total number of triorganosiloxy groups (M' units) of the resinous portion of the polyorganosilicate resin to the total number of silicate groups (Q units) in the resinous portion. M'/Q ratio may be 0.5/1 to 1.5/1, alternatively 0.6/1 to 0.9/1.

The Mn of the polyorganosilicate resin depends on various factors including the types of hydrocarbon groups represented by $R^{M'}$ that are present. The Mn of the polyorganosilicate resin refers to the number average molecular weight measured using GPC, when the peak representing the neopentamer is excluded from the measurement. The Mn of the polyorganosilicate resin may be 1,500 Da to 30,000 Da, alternatively 1,500 Da to 15,000 Da; alternatively >3,000 Da to 8,000 Da. Alternatively, Mn of the polyorganosilicate resin may be 3,500 Da to 8,000 Da.

Alternatively, the polyorganosilicate resin may comprise unit formula (E2-17): $(R^4_3SiO_{1/2})_{mm}(R^4_2R^{Ald}SiO_{1/2})_{nn}(SiO_{4/2})_{oo}(ZO_{1/2})_h$, where Z, $R^4$, and $R^{Ald}$, and subscript h are as described above and subscripts mm, nn and oo have average values such that mm≥0, nn>0, oo>0, and 0.5≤(mm+nn)/oo≤4. Alternatively, 0.6≤(mm+nn)/oo≤4; alternatively 0.7≤(mm+nn)/oo≤4, and alternatively 0.8≤(mm+nn)/oo≤4.

Alternatively, (E2) the aldehyde-functional polyorganosiloxane may comprise (E2-18) an aldehyde-functional silsesquioxane resin, i.e., a resin containing trifunctional (T') units of unit formula: $(R^4_3SiO_{1/2})_a(R^4_2R^{Ald}SiO_{1/2})_b(R^4_2SiO_{2/2})_c(R^4R^{Ald}SiO_{2/2})_d(R^4SiO_{3/2})_e(R^{Ald}SiO_{3/2})_f(ZO_{1/2})_h$; where $R^4$ and $R^{Ald}$ are as described above, subscript f>1, 2<(e+f)<10,000; 0<(a+b)/(e+f)<3; 0<(c+d)/(e+f)<3; and 0<h/(e+f)≤1.5. Alternatively, the aldehyde-functional silsesquioxane resin may comprise unit formula (E2-19): $(R^4SiO_{3/2})_e(R^{Ald}SiO_{3/2})_f(ZO_{1/2})_h$, where $R^4$, $R^{Ald}$, Z, and subscripts h, e and f are as described above. Alternatively, the alkenyl-functional silsesquioxane resin may further comprise difunctional (D') units of formulae $(R^4_2SiO_{2/2})_c(R^4R^{Ald}SiO_{2/2})_d$ in addition to the T units described above, i.e., a D'T' resin, where subscripts c and d are as described above. Alternatively, the aldehyde-functional silsesquioxane resin may further comprise monofunctional (M') units of formulae $(R^4_3SiO_{1/2})_a(R^4_2R^{Ald}SiO_{1/2})_b$, i.e., an M'D'T' resin, where subscripts a and b are as described above for unit formula (E2-1).

Alternatively, (E) the aldehyde-functional organosilicon compound may comprise (E3) an aldehyde-functional silazane. The aldehyde-functional silazane may have formula (E3-1): $[(R^1_{(3-gg)}R^{Ald}_{gg}Si)_{ff}NH_{(3-ff)}]_{hh}$, where $R^{Ald}$ is as described above; each $R^1$ is independently selected from the group consisting of an alkyl group and an aryl group; each subscript ff is independently 1 or 2; and subscript gg is independently 0, 1, or 2; where 1<hh<10. For $R^1$, the alkyl group and the aryl group may be the alkyl group and the aryl group as described above for $R^4$. Alternatively, subscript hh may have a value such that 1<hh<6. Examples of aldehyde-functional silazanes include, $MePhR^{Ald}SiNH_2$, $Me_2R^{Ald}SiNH_2$, $(R^{Ald}Me_2Si)_2NH$, $(MePhR^{Ald}Si)_2NH$, and alternatively, in these formulae, each $R^{Ald}$ may have 3, 4 or 7 carbon atoms; alternatively 3 carbon atoms. Aldehyde-functional polysilazanes include 2,4,6-trimethyl-2,4,6-tri(propylaldehdye)cyclotrisilazane $(MePr^{Ald}SiNH)_3$; sym-tetramethyldi(propylaldehyde)disilazane $(Pr^{Ald}Me_2Si)_2NH$; and 1,3-dipropylaldehyde-1,3-diphenyl-1,3-dimethyldisilazane $(MePhPr^{Ald}Si)_2NH$.

Starting material (E) may be any one of the aldehyde-functional organosilicon compounds described above. Alternatively, starting material (E) may comprise a mixture of two or more of the aldehyde-functional organosilicon compounds.

The process for preparing the carbinol-functional organosilicon compound may comprise:

I) combining, under conditions to catalyze hydrogenation reaction, starting materials comprising
   (E) the aldehyde-functional organosilicon compound described above,
   (F) hydrogen, and
   (G) a hydrogenation catalyst, thereby forming a hydrogenation reaction product comprising the carbinol-functional organosilicon compound.

The process may optionally further comprise, before step I), 1) combining, under conditions to catalyze hydroformylation reaction, starting materials comprising (A) the gas comprising hydrogen and carbon monoxide, (B) the alkenyl-functional organosilicon compound, and (C) the rhodium/bisphosphite ligand complex catalyst, thereby forming a hydroformylation reaction product comprising the aldehyde-functional organosilicon compound as described above. The process may optionally further comprise, before step I) and after step 1), step 2) recovering (C) the rhodium/bisphosphite ligand complex catalyst from the reaction product comprising the aldehyde-functional organosilicon compound. The process may optionally further comprise, before step I) and after step 1), 3) purifying the reaction product; thereby isolating the aldehyde-functional organosilicon compound from the additional materials, as described above.

(F) Hydrogen

Hydrogen is known in the art and commercially available from various sources, e.g., Air Products of Allentown, Pennsylvania, USA. Hydrogen may be used in a superstoichiometric amount with respect to the aldehyde-functionality of starting material (E), the aldehyde-functional organosilicon compound described above, to permit complete hydrogenation.

(G) Hydrogenation Catalyst

The hydrogenation catalyst used in the process for preparing the carbinol-functional organosilicon compound may be a heterogeneous hydrogenation catalyst, a homogenous hydrogenation catalyst, or a combination thereof. Alternatively, the hydrogenation catalyst may be a heterogeneous hydrogenation catalyst. Suitable heterogeneous hydrogenation catalysts comprise a metal selected from the group consisting cobalt (Co), copper (Cu), nickel (Ni), palladium (Pd), platinum (Pt), ruthenium (Ru), and a combination of two or more thereof. Alternatively, the hydrogenation catalyst may comprise Co, Cu, Ni, Pd, or a combination of two or more thereof. Alternatively, the hydrogenation catalyst may comprise Co, Cu, Ni, or a combination of two or more thereof. The hydrogenation catalyst may include a support, such as alumina $(Al_2O_3)$, silica $(SiO_2)$, silicon carbide (SiC), or carbon (C). Alternatively, the hydrogenation catalyst may be selected from the group consisting of Raney nickel, Raney copper, Ru/C, Ru/$Al_2O_3$, Pd/C, Pd/$Al_2O_3$, Cu/C, Cu/$Al_2O_3$, Cu/$SiO_2$, Cu/SiC, Cu/C, and a combination of two or more thereof.

Alternatively, heterogeneous hydrogenation catalysts for hydrogenation of aldehydes may include a support material on which copper, chromium, nickel, or two or more thereof are applied as active components. Exemplary catalysts include copper at 0.3 to 15%; nickel at 0.3% to 15%, and chromium at 0.05% to 3.5%. The support material may be, for example, porous silicon dioxide or aluminium oxide. Barium may optionally be added to the support material. Chromium free hydrogenation catalysts may alternatively be used. For example a Ni/$Al_2O_3$ or Co/$Al_2O_3$ may be used, or a copper oxide/zinc oxide containing catalyst, which further comprises potassium, nickel, and/or cobalt; and additionally an alkali metal. Suitable hydrogenation catalysts are disclosed for example, in U.S. Pat. No. 7,524,997 or U.S. Pat. No. 9,567,276 and the references cited therein.

Examples of suitable heterogeneous hydrogenation catalysts for use herein include Raney Nickel such as Raney Nickel 2400, Ni-3288, Raney Copper, Hysat 401 salt (Cu), Ruthenium on carbon (Ru/C), platinum on carbon (Pt/C), copper on silicon carbide (Cu/SiC).

Alternatively, a homogeneous hydrogenation reaction catalyst may be used herein. The homogeneous hydrogenation catalyst may be a metal complex, where the metal may be selected from the group consisting of Co, Fe, Ir, Rh, and Ru. Examples of suitable homogeneous hydrogenation catalysts are exemplified by [$RhCl(PPh_3)_3$](Wilkinson's catalyst); [Rh(NBD)($PR'_3$)$_2$]+ $ClO_4$— (where R' is an alkyl group, e.g. Et); [$RuCl_2$(diphosphine)(1,2-diamine)](Noyori catalysts); $RuCl_2$(TRIPHOS) (where TRIPHOS=PhP [($CH_2CH_2PPh_2$)$_2$]; Ru(II)(dppp)(glycine) complexes (where dppp=1,3-bis(diphenylphosphino)propane); $RuCl_2(PPh_3)_3$; $RuCl_2(CO)_2(PPh_3)_2$; $IrH_3(PPh_3)_3$; [Ir($H_2$)($CH_3COO$)($PPh_3$)$_3$]; cis-[Ru—$Cl_2$(ampy)(PP)][where ampy=2-(aminomethyl)pyridine; and PP=1,4-bis-(diphenylphosphino)butane, 1,1'-ferrocenediyl-bis(diphenylphosphine)]; Pincer RuCl(CNNR)(PP) complexes [where PP=1,3-bis(diphenylphosphino)propane, 1,4-bis(diphenylphosphino)butane, 1,1'-ferrocenediyl-bis(diphenylphosphine); and HCNNR=4-substituted-aminomethyl-benzo[h]quinoline; R=Me, Ph]; [$RuCl_2$(dppb)(ampy)](where dppb=1,4-Bis(diphenylphosphino)butane, ampy=2-aminomethyl pyridine); [Fe(PNP-MeiPr)(CO)(H)(Br)]; [Fe(PNPMe-iPr)(H)2(CO)]; and a combination thereof.

The amount of hydrogenation catalyst used in the process depends on various factors including whether the process will be run in a batch or continuous mode, the selection of aldehyde-functional organosilicon compound, whether a heterogeneous or homogeneous hydrogenation catalyst is selected, and reaction conditions such as temperature and pressure. However, when the process is run in a batch mode the amount of catalyst may be 1 weight % to 20 weight %, alternatively 5 weight % to 10 weight %, based on weight of the aldehyde-functional organosilicon compound. Alternatively, the amount of catalyst may be at least 1, alternatively at least 4, alternatively at least 6.5, and alternatively at least 8, weight %; while at the same time the amount of catalyst may be up to 20, alternatively up to 14, alternatively up to 13, alternatively up to 10, and alternatively up to 9, weight %, on the same basis. Alternatively, when the process will be run in a continuous mode, e.g., by packing a reactor with a heterogeneous hydrogenation catalyst, the amount of the hydrogenation catalyst may be sufficient to provide a reactor volume (filled with hydrogenation catalyst) to achieve a space time of 10 $hr^{-1}$, or catalyst surface area sufficient to achieve 10 kg/hr substrate per $m^2$ of catalyst.

Solvent

A solvent that may optionally be used in the process for hydrogenation reaction may be selected from those solvents that are neutral to the reaction. The following are specific examples of such solvents: monohydric alcohols such as ethanol and isopropyl alcohol; dioxane, ethers such as THF; aliphatic hydrocarbons, such as hexane, heptane, and paraffinic solvents; and aromatic hydrocarbons such as benzene, toluene, and xylene; chlorinated hydrocarbons, and water. These solvents can be used individually or in combinations of two or more.

The hydrogenation reaction can be performed using pressurized hydrogen. Hydrogen (gauge) pressure may be 10 psig (68.9 kPa) to 3000 psig (20684 kPa), alternatively 10 psig to 2000 psig (13790 kPa), alternatively 10 psig to 800 psig (5516 kPa), alternatively 50 psig (345 kPa) to 200 psig (1379 kPa). The reaction may be carried out at a temperature of 0 to 200° C. Alternatively, a temperature of 50 to 150° C. may be suitable for shortening the reaction time. Alternatively, the hydrogen (gauge) pressure used may be at least 25, alternatively at least 50, alternatively at least 100, alternatively at least 150, and alternatively at least 164, psig; while at the same time the hydrogen gauge pressure may be up to 800, alternatively up to 400, alternatively up to 300, alternatively up to 200, and alternatively up to 194, psig. The temperature for hydrogenation reaction may be at least 50, alternatively at least 65, alternatively at least 80, ° C., while at the same time the temperature may be up to 200, alternatively up to 150, alternatively up to 120, ° C.

The hydrogenation reaction can be carried out as a batch process or as a continuous process. In a batch process, the reaction time depends on various factors including the amount of the catalyst and reaction temperatures, however, step 2) of the process described herein may be performed for 1 minute to 24 hours. Alternatively, the hydrogenation reaction may be performed for at least 1 minute, alternatively at least 2 minutes, alternatively at least 1 hour, alternatively at least 2.5 hours, alternatively at least 3 hours, alternatively at least 3.3 hours, alternatively at least 3.7 hours, alternatively at least 4 hours, alternatively at least 4.4 hours, and alternatively at least 5.5 hours; while at the same time, the hydrogenation reaction may be performed for up to 24 hours, alternatively up to 22.5 hours, alternatively up to 22 hours, alternatively up to 12 hours, alternatively up to 7 hours, and alternatively up to 6 hours.

Alternatively, in a batch process, the terminal point of a hydrogenation reaction can be considered to be the time during which the decrease in pressure of hydrogen is no longer observed after the reaction is continued for an additional 1 to 2 hours. If hydrogen pressure decreases in the course of the reaction, it may be desirable to repeat the introduction of hydrogen and to maintain it under increased pressure to shorten the reaction time. Alternatively, the reactor can be re-pressurized with hydrogen 1 or more times to achieve sufficient supply of hydrogen for reaction of the aldehyde while maintaining reasonable reactor pressures.

After completion of the hydrogenation reaction, the hydrogenation catalyst may be separated in a pressurized inert (e.g., nitrogenous) atmosphere by any convenient means, such as filtration or adsorption, e.g., with diatomaceous earth or activated carbon, settling, centrifugation, by maintaining the catalyst in a structured packing or other fixed structure, or a combination thereof.

The carbinol functional organosilicon compound prepared as described above has, per molecule, at least one carbinol-functional group covalently bonded to silicon. Alternatively, the carbinol-functional organosilicon compound may have, per molecule, more than one carbinol-functional group covalently bonded to silicon. The carbinol-functional group covalently bonded to silicon, $R^{Car}$, may have formula:

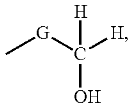

where G is a divalent hydrocarbon group free of aliphatic unsaturation that has 2 to 8 carbon atoms, as described and exemplified above.

EXAMPLES

These examples are provided to illustrate the invention to one of ordinary skill in the art and should not be construed to limit the scope of the invention set forth in the claims. Starting Materials used in the examples are described below in Table 1.

TABLE 1

| Starting Materials | | | |
|---|---|---|---|
| Type | Name | Chemical Description | Source |
| Solvent | Toluene, PHR1317 | $C_7H_8$ | Sigma-Aldrich |
| Solvent | Isopropanol | $(CH_3)_2CHOH$ | Sigma-Aldrich |
| Hydrogenation catalyst | Raney Nickel 2400 | AlNi | Sigma-Aldrich |
| Hydrogenation catalyst | Raney Nickel Cartridges | AlNi | H-Cube MicroCatCart ™ cartridges by ThalesNano |
| Hydrogenation catalyst | Raney Copper Cartridges | Cu | H-Cube MicroCatCart ™ cartridges by ThalesNano |
| Hydrogenation catalyst | Hysat 401 salt | Undefined | Clariant |
| Hydrogenation catalyst | Ru/C | Ru/C | Sigma Aldrich |
| Hydrogenation catalyst | Pt/C | Pt/C | Johnson Matthey |
| Hydrogenation catalyst | Cu/SiC | Cu/SiC | Synthesized and provided by Dow Core R&D, Chemical Science |
| Hydroformylation Catalyst Precursor | (Acetylacetonato) dicarbonylrhodium(I) | Rh(acac)(CO)2 | Unknown |
| Ligand 1 | 6,6'-[3,3',5,5'-tetrakis(1,1-dimethylethyl)-1,1'-biphenyl]-2,2'-diyl]bis(oxy)]bis-dibenzo[d,f][1,3,2]dioxaphosphepin | | TDCC |
| Aldehyde-siloxane 1 | 3-(1,1,1,3,5,5,5-heptamethyltrisiloxan-3-yl)propanal | C10H26O3Si3 | Synthesis Example 1, below. |
| Aldehyde-siloxane 2 | 3,3'-(1,1,3,3-tetramethyldisiloxane-1,3-diyl)dipropanal | C10H22O3Si2 | Synthesis Example 2, below. |
| Aldehyde-siloxane 3 | Tetrapropanal-tetramethylcyclotetrasiloxane | C16H32O8Si4 | Synthesis Example 3, below. |
| Aldehyde-siloxane 4 | Propylaldedhyde terminated PDMS (DP = 7) | $M^{Pr-ald}D_7M^{Pr-ald}$ | Synthesis Example 7 |
| Aldehyde-siloxane 5 | Hydroformylation products of $MD_{8.7}D_{3.7}^{vi}M$ | $MD_{8.7}D_{3.7}^{Pr-ald}M$ | Synthesis Example 9 |
| Aldehyde-siloxane 6 | Propyl-aldedhyde terminated PDMS (DP = 180) | | Synthesis Example 8 |
| Vinyl-silane | Vinyltrimethylsilane | | TCI-America |
| Hexenyl-siloxane | Q branched-hexenyl-siloxane | $Q-(D_{36}M^{hex})4$ | Synthesis Example 4, below. |
| Allyl-Siloxane | Allyl terminated PDMS (DP = 102) | | Synthesis Example 5, below. |
| Aldehyde-MQ resin | Hydroformylation products of MQ resin (DOWSIL ™ 6-3444 Int) | | Synthesis Example 6, below. |

In this Synthesis Example 1, the procedure for making 3-(1,1,1,3,5,5,5-heptamethyltrisiloxan-3-yl)propanal (Aldehyde siloxane 1) was performed as follows: In a nitrogen filled glovebox, $Rh(acac)(CO)_2$ (6.7 mg, 0.026 mmol), Ligand 1 (30.2 mg, 0.0360 mmol) and toluene (5.0 g, 0.054 mmol) were added into a 30 mL glass vial with a magnetic stir bar. The mixture was stirred on a stir plate until a homogeneous solution formed. This solution was transferred to an air-tight syringe with a metal valve and subsequently removed from the glove box. In a ventilated fume hood, vinylmethybis(trimethylsiloxy)silane 3c (20.2 g, 81.2 mmol) and the toluene (57.7 g, 627 mmol) were loaded to a 300-mL Parr-reactor. The reactor was sealed and loaded into the holder. The reactor was pressurized with nitrogen up to 100 psi via the dip-tube and was carefully relieved through a valve connected to the headspace for three times. The reactor was then pressure tested by pressurizing to 300 psi with nitrogen. After the pressure was released, the catalyst solution was added to the reactor via the sample loading port. The reactor was pressurized with syngas to 100 psi and then released for three times prior to being pressurized 80 psi via the dip-tube. Reaction temperature was set to 90° C. Agitation rate was set to 500 RPM. The intermediate cylinder containing syngas and the reactor were connected when the desired temperature was reached. The pressure was set to 100 psi. The reaction progress was monitored by a data logger which measured the pressure in the 300 ml intermediate cylinder as it supplied syngas to the reactor via a pressure reducing regulator. N/I ratio was determined by $^1H$ NMR analysis of the final product.

In this Synthesis Example 2, the procedure for making 3,3'-(1,1,3,3-tetramethyldisiloxane-1,3-diyl)dipropanal (Aldehyde siloxane 2) was performed as follows: In a nitrogen filled glovebox, $Rh(acac)(CO)_2$ (18.1 mg, 0.0699 mmol), Ligand 1 (88.0 mg, 0.105 mmol) and toluene (5.0 g, 0.054 mmol) were added into a 30 mL glass vial with a magnetic stir bar. The mixture was stirred on a stir plate until a homogeneous solution formed. This solution was transferred to an air-tight syringe with a metal valve and subsequently removed from the glove box. In a ventilated fume hood, 1,3-divinyltetramethyldisiloxane 3e (44.8 g, 240 mmol) and the toluene (40.0 g, 488 mmol) were loaded to a 300-mL Parr-reactor. The reactor was sealed and loaded into the holder. The reactor was pressurized with nitrogen up to 100 psi via the dip-tube and was carefully relieved through a valve connected to the headspace for three times. The reactor was then pressure tested by pressurizing to 300 psi with nitrogen. After the pressure was released, the catalyst solution was added to the reactor via the sample loading port. The reactor was pressurized with syngas to 100 psi and then released for three times prior to being pressurized 80 psi via the dip-tube. Reaction temperature was set to 90° C. Agitation rate was set to 500 RPM. The intermediate cylinder containing syngas and the reactor were connected when the desired temperature was reached. The pressure was set to 100 psi. The reaction progress was monitored by a data logger which measured the pressure in the 300 ml intermediate cylinder as it supplied syngas to the reactor via a pressure reducing regulator. N/I ratio was determined by $^1H$ NMR analysis of the final product.

In this Synthesis Example 3, the procedure for making Tetrapropanal-tetramethylcyclotetrasiloxane (Aldehyde siloxane 3) was performed as follows: In a nitrogen filled glovebox, $Rh(acac)(CO)_2$ (5.9 mg, 0.019 mmol), Ligand 1 (28.6 mg, 0.0341 mmol) and toluene (5.0 g, 0.054 mmol) were added into a 30 mL glass vial with a magnetic stir bar. The mixture was stirred on a stir plate until a homogeneous solution formed. This solution was transferred to an air-tight syringe with a metal valve and subsequently removed from the glove box. In a ventilated fume hood, 2,4,6,8-Tetramethyl-2,4,6,8-tetravinylcyclotetrasiloxane (45.0 g, 130 mmol) and the toluene (40.0 g, 488 mmol) were loaded to a 300-mL Parr-reactor. The reactor was sealed and loaded into the holder. The reactor was pressurized with nitrogen up to 100 psi via the dip-tube and was carefully relieved through a valve connected to the headspace for three times. The reactor was then pressure tested by pressurizing to 300 psi with nitrogen. After the pressure was released, the catalyst solution was added to the reactor via the sample loading port. The reactor was pressurized with syngas to 100 psi and then released for three times prior to being pressurized 80 psi via the dip-tube. Reaction temperature was set to 90° C. Agitation rate was set to 500 RPM. The intermediate cylinder containing syngas and the reactor were connected when the desired temperature was reached. The pressure was set to 100 psi. The reaction progress was monitored by a data logger which measured the pressure in the 300 ml intermediate cylinder as it supplied syngas to the reactor via a pressure reducing regulator. N/I ratio was determined by $^1H$ NMR analysis of the final product.

In this Synthesis Example 4, the syntheses of Q branched hexenyl polyorganosiloxane polymers were performed as follows:

A. Synthesis of Hexenyl Neopentamer

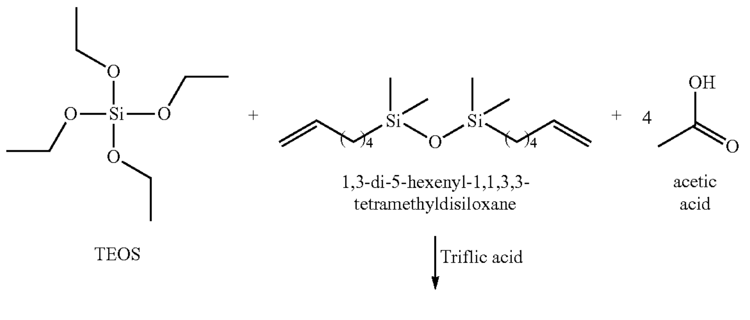

-continued

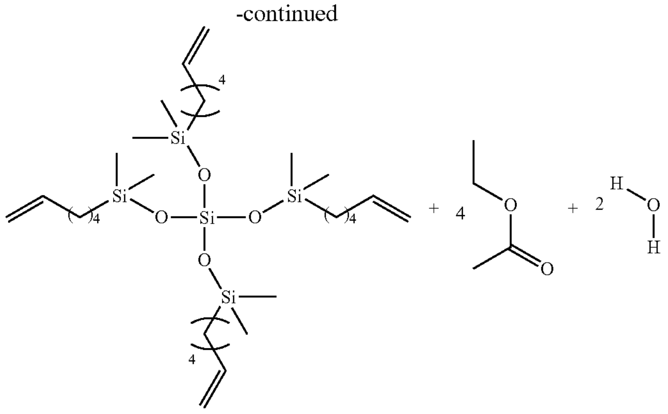

In a typical procedure, a 500 ml multi-neck reactor was equipped with a thermocouple, overhead stirrer, nitrogen-sweep and a dean-stark trap with condenser. The reactor was charged with 1,3-di-5-hexenyl-1,1,3,3-tetramethyldisiloxane (78.84 g, 0.26 mol, 0.55 equivalent) and acetic acid (129.7 g, 2.16 mol, 4.5 equivalent) were charged into and purged with overhead nitrogen. Triflic acid (0.3089 g, 2.1 mmol, 0.1 wt %) was added dropwise into the reactor using a syringe. Then the mixture in the reactor was stirred and heated to 45° C. under $N_2$. Tetraethoxysilane (TEOS, 100 g, 0.48 mol, 1 equivalent) was added dropwise into the reaction mixture via an addition funnel and the reaction mixture temperature maintained at 45-50° C. during TEOS addition. After TEOS addition was done, the reaction proceeded at 80° C. until the reaction was complete. The reaction was monitored by GC-MS. The reaction mixture was cooled down to room temperature after reaction was complete, followed by washing with DI water twice, saturated $NaHCO_3$ solution three times and DI water twice again. The raw product was dried over anhydrous $Na_2SO_4$ and then stripped at 180° C. to remove the residual volatiles. A pale yellow oil was obtained (yield=88%).

B. Synthesis of Q-Branched Hexenyl Polyorganosiloxane Q-($D_{36}M^{hex}$)$_4$

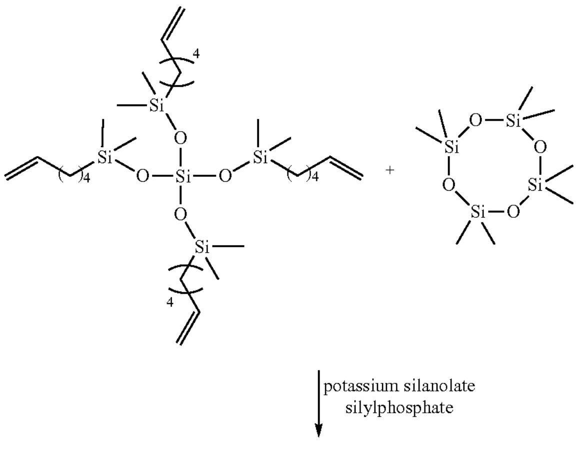

-continued

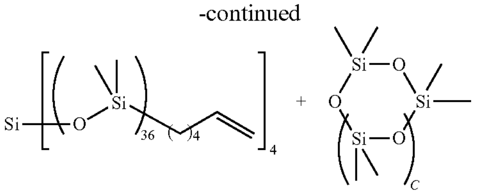

C = 3, 4, 5, or more

In a nitrogen filled glovebox, Rh(acac)$(CO)_2$ (75.5 mg, 0.292 mmol), Ligand 1 (489.1 mg, 0.58 mmol) and toluene (10.0 g, 0.108 mmol) were added into a 30 mL glass vial with a magnetic stir bar. The mixture was stirred on a stir plate until a homogeneous solution formed. This solution was transferred to an air-tight syringe with a metal valve and subsequently removed from the glove box. In a ventilated fume hood, Q-branched hexenyl siloxane (150 g, 13.59 mmol) was loaded to a 300-mL Parr-reactor. The reactor was sealed and loaded into the holder. The reactor was pressurized with nitrogen up to 100 psi via the dip-tube and was carefully relieved through a valve connected to the head-space for three times. The reactor was then pressure tested by pressurizing to 300 psi with nitrogen. After the pressure was released, the catalyst solution was added to the reactor via the sample loading port. The reactor was pressurized with syngas to 100 psi and then released for three times prior to being pressurized 80 psi via the dip-tube. Reaction temperature was set to 70° C. Agitation rate was set to 600 RPM. The intermediate cylinder containing syngas and the reactor were connected when the desired temperature was reached. The pressure was set to 100 psi. The reaction progress was monitored by a data logger which measured the pressure in the 300 ml intermediate cylinder as it supplied syngas to the reactor via a pressure reducing regulator. N/I ratio was determined by $^1H$ NMR analysis of the final product.

In this Synthesis Example 5, Allyl-Siloxane described in Table 1 was prepared as follows: In a typical procedure, a 500 ml multi-neck reactor was equipped with a thermocouple, overhead stirrer, nitrogen-sweep and a dean-stark trap with condenser. The reactor was charged with 1,3-diallytetramethyldisiloxane (13.81 g, 64.38 mmol, 1 equivalent) and octamethylcyclotetrasiloxane (D4, 487 g, 1.64 mol, 25.5 equivalent) and purged with overhead nitrogen. The mixture in the reactor was stirred and heated to 140° C. under nitrogen atmosphere and dilute potassium silanolate (10 wt % in D4, 1.2809 g) was then added into the reactor.

The reaction proceeded at 140° C. for 4 hours and was monitored by offline NMR. When the reaction was complete, octylsilyl phosphonate (2.5 wt % in D4, 2.967 g) was added into the reactor to neutralize the reaction. Then the heat was turned off to allow the reactor to cool to ambient temperature. The final Allyl-Siloxane was obtained by stripping off the volatile cyclics under vacuum.

In this Synthesis Example 6, Aldehyde-MQ resin described in Table 1 was prepared as follows: In a nitrogen filled glovebox, $Rh(acac)(CO)_2$ (3.8 mg, 0.0147 mmol), Ligand-1 (27.28 mg, 0.0325 mmol) and toluene (5.0 g, 57.9 mmol) were added into a 30 mL glass vial with a magnetic stir bar. The mixture was stirred on a stir plate until a homogeneous solution formed. This solution was transferred to an air-tight syringe with a metal valve and subsequently removed from the glove box. In a ventilated fume hood, vinyl-MQ resin (DOWSIL™ 6-3444 Int) (37.5 g) and the toluene (112.5 g, 1.22 mol) were loaded to a 300-mL Parr-reactor. The reactor was sealed and loaded into the holder. The reactor was pressurized with nitrogen up to 100 psi via the dip-tube and was carefully relieved through a valve connected to the headspace for three times. The reactor was then pressure tested by pressurizing to 300 psi with nitrogen. After the pressure was released, the catalyst solution was added to the reactor via the sample loading port. The reactor was pressurized with syngas to 100 psi and then released for three times prior to being pressurized 80 psi via the dip-tube. Reaction temperature was set to 70° C. Agitation rate was set to 500 RPM. The intermediate cylinder containing syngas and the reactor were connected when the desired temperature was reached. The pressure was set to 100 psi. The reaction progress was monitored by a data logger which measured the pressure in the 300 ml intermediate cylinder as it supplied syngas to the reactor via a pressure reducing regulator. N/I ratio was determined by $^1H$ NMR analysis of the final product.

In this Synthesis Example 7, 3,3'-(1,1,3,3,5,5,7,7,9,9,11,11,13,13,15,15,17,17-octadecamethylnonasiloxane-1,17-diyl)dipropanal ($M^{Pr\text{-}ald}D_7M^{Pr\text{-}ald}$) was prepared as follows. In a nitrogen filled glovebox, $Rh(acac)(CO)_2$ (9.3 mg, 0.0359 mmol), Ligand 1 (58.1 mg, 0.069 mmol) and heptane (10.0 g, 99.8 mmol) were added into a 30 mL glass vial with a magnetic stir bar. The mixture was stirred on a stir plate until a homogeneous solution formed. This solution was transferred to an air-tight syringe with a metal valve and subsequently removed from the glove box. In a ventilated fume hood, 3,3'-(1,1,3,3,5,5,7,7,9,9,11,11,13,13,15,15,17,17-octadecamethylnonasiloxane-1,17-diyl)divinyl ($M^{Vi}D_7M^{Vi}$) from DSC (700 g, 1.027 mol) was loaded to a 2-L Autoclave-reactor. The reactor was sealed and loaded into the holder. The reactor was pressurized with nitrogen up to 100 psi via the dip-tube and was carefully relieved through a valve connected to the headspace for three times. The reactor was then pressure tested by pressurizing to 300 psi with nitrogen. After the pressure was released, the catalyst solution was added to the reactor via the sample loading port. The reactor was pressurized with syngas to 100 psi and then released for three times prior to being pressurized 80 psi via the dip-tube. Reaction temperature was set to 70° C. Agitation rate was set to 800 RPM The intermediate cylinder containing syngas and the reactor were connected when the desired temperature was reached. The pressure was set to 100 psi. The reaction progress was monitored by a data logger which measured the pressure in the intermediate cylinder as it supplied syngas to the reactor via a pressure reducing regulator. The resulting product contained 3,3'-(1,1,3,3,5,5,7,7,9,9,11,11,13,13,15,15,17,17-octadecamethylnonasiloxane-1,17-diyl)dipropanal ($M^{Pr\text{-}ald}D7M^{Pr\text{-}ald}$), Aldehyde-siloxane 4 in Table 1.

In this Synthesis Example 8, $M^{Vi}{}_2D_{180}$, was hydroformylated to form $M^{Pr\text{-}Ald}D_{180}M^{Pr\text{-}Ald}$, as follows. In a nitrogen filled glovebox, $Rh(acac)(CO)_2$ (0.0050 g), Ligand 1 (0.0326 g) and toluene (5.0 g) were added into a 60 mL vial with a magnetic stir bar. The mixture was stirred at RT on a stir plate until a homogeneous solution was formed. The solution was transferred to an air-tight syringe with a metal valve and subsequently removed from the glove box. In a ventilated fume hood, $M^{Vi}{}_2D_{180}$ (200 g) from DSC was loaded to the Parr-reactor. The reactor was sealed and pressurized with nitrogen up to 100 psig (689 kPa) via the dip-tube and was carefully relieved through a valve connected to the headspace. The pressure/vent cycle with nitrogen was repeated three times. Pressure testing was subsequently performed by pressurizing the reactor with nitrogen to up to 300 psig (2086 kPa). After the pressure was released, the catalyst solution was added to the reactor via the sample loading port. The reactor was pressurized with syngas to 100 psig (689 kPa) and then vented for three times prior to being pressurized to 20 psig (138 kPa) below the desired pressure via the dip-tube. Reaction temperature was set to 70° C. Heater and agitation were turned on. The 300 mL intermediate cylinder containing the syngas for the reaction and the reactor were connected when the desired temperature was reached. Pressure drop from a 300 mL intermediate cylinder was used to monitor the reaction progress and was recorded by a data logger. Full conversion of vinyl groups was observed after 3.5 hours reaction time as monitored by $^1H$ NMR.

In this Synthesis Example 9, $MD_{8.7}\ D^{Pr\text{-}Ald}{}_{3.7}M$ was synthesized as follows: In a nitrogen filled glovebox, $Rh(acac)(CO)_2$ (0.0191 g), Ligand 1 (0.1324 g) and toluene (76.74 g) were added into a 125 mL bottle with a magnetic stir bar. The mixture was stirred at room temperature on a stir plate until a homogeneous solution was formed. 3.65 g of the solution was transferred to an air-tight syringe with a metal valve and subsequently removed from the glove box. In a ventilated fume hood, $MD_{8.7}\ D^{vi}{}_{3.7}M$ (180 g) from DSC was loaded to the Parr-reactor. The reactor was sealed and pressurized with nitrogen up to 100 psig (689 kPa) via the dip-tube and was carefully relieved through a valve connected to the headspace. The pressure/vent cycle with nitrogen was repeated three times. Pressure testing was subsequently performed by pressurizing the reactor with nitrogen to up to 300 psig (2086 kPa). After the pressure was released, the catalyst solution was added to the reactor via the sample loading port. The reactor was pressurized with syngas to 100 psig (689 kPa) and then vented for three times prior to being pressurized to 20 psig (138 kPa) below the desired pressure via the dip-tube. Reaction temperature was set to 70° C. Heater and agitation were turned on. The 300 mL intermediate cylinder containing the syngas for the reaction and the reactor were connected when the desired temperature was reached. Pressure drop from a 300 mL intermediate cylinder was used to monitor the reaction progress and was recorded by a data logger. Full conversion of vinyl groups was observed after 24 hours reaction time as monitored by $^1H$ NMR.

In this Reference Example A, hydrogenation catalyst preparation was performed as follows: For Raney nickel catalyst, a catalyst wash step was performed before use. A portion of Raney Nickel catalyst (100 g) which was immersed in water was transferred wet to a 250 ml disposable filter, making sure to keep the catalyst continuously wet with a squirt bottle of water. The catalyst was washed thoroughly with about 400 ml DI water in 3 portions. The catalyst was then washed thoroughly with about 400 ml isopropanol in 3 portions, mixing with a spatula after each portion was added. The washed catalyst was transferred to a glass jar and stored under IPA. For other heterogenous catalysts, the catalysts were purged with $N_2$ first before loading into a Parr reactor.

In this Reference Example B, aldehyde-functional organosilicon compounds were hydrogenated batchwise in a Parr reactor according to the following procedure. A 300 ml Parr reactor was charged with 40 g of 50% IPA wet Raney Nickel catalyst prepared according to Reference Example A, 150 g aldehyde-functional organosilicon compound, and 50 g $N_2$ sparged isopropanol. The reactor was sealed, purged with $N_2$ three times to 100 psig, and pressure was checked at 300 psig. The nitrogen was vented, and the reactor system was purged with hydrogen 3 times to 100 psig. Hydrogen was supplied to the reactor at 200 psig, agitation was started at 600 rpm, and heating was applied with a set point of 80° C. The reaction progress was monitored by recording the gas uptake from the intermediate supply cylinder. After 16 hours, the gas pressure was vented and a sample was taken via syringe to monitor the reaction progress by $^1$H NMR. When reaction progress stalled, the reactor was purged with nitrogen, and an additional 20 g wet catalyst was added. After $N_2$ Purge, hydrogen pressure was re-established and the reaction was allowed to proceed for an additional 4 hours. The reactor was cooled and purged with nitrogen. Reactor contents were vacuum filtered through a crude disposable filter then through a 0.2 micron Nylon membrane filter. The filtrate was stripped by a rotary evaporator to remove solvent at 60° C. and 5 mmHg for several hours.

In this Reference Example C, aldehyde-functional organosilicon compounds were hydrogenated continuously in a ThalesNano H-Cube Pro Continuous-Flow Hydrogenation Reactor. In a typical procedure, 50 mL isopropanol and 50 mL of a 0.05 M solution of aldehyde-functional organosilicon compound solution in isopropanol were prepared in two separate 150 mL flasks. The IPA solvent and reactant lines were placed in solvent and reactant flasks, respectively. The appropriate catalyst cartridge was inserted into the H-cube reactor and the reaction line was pre-washed with isopropanol for 5 minutes (flow rate is 2 mL/min). Then the solution was passed through the reaction line with a flow rate of 1 mL/min under the designed $H_2$ pressure and temperature. The hydrogenation products were then collected and analyzed by $^1$H NMR and GC/MS. The starting materials used, and yield of Carbinol-Functional Organosilicon Compounds produced are shown below in Table C.

TABLE C

| Carbinol-Functional Organosilicon Compounds Prepared According to Reference Example C | | | | | |
|---|---|---|---|---|---|
| Aldehyde | Cat. | Temp (° C.) | $H_2$(psig) | Rxn Time | Yield of Carbinol-Product (%) |
| $MD^{Pr\text{-}Ald}M$ | Raney Nickel in (cartridge) | 65 | 435 | 5 min | 99 |
| $MD^{Pr\text{-}Ald}M$ | Raney Copper in (cartridge) | 65 | 725 | 5 min | 98 |

In this Working Example 1, hydrogenation of $MD^{Pr\text{-}Ald}M$ (the hydroformylation product of $MD^{vi}M$) was performed according to the method of Reference Example B.

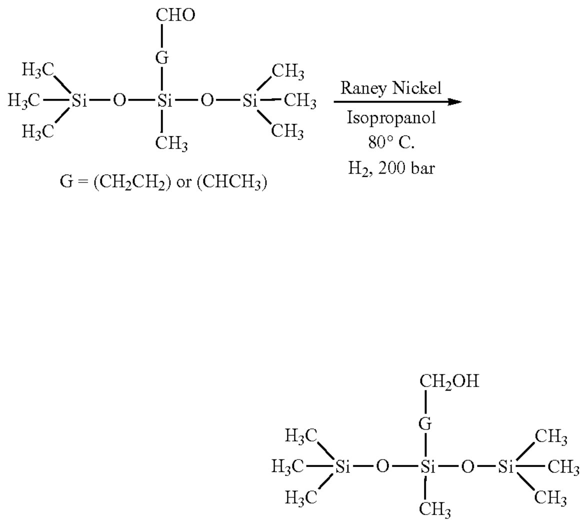

TABLE 2

| The results of hydrogenation of $MD^{Pr\text{-}Ald}M$ at different reaction conditions. The carbinol yields of all the reactions listed the table were primarily greater that 98% based on $^1$H NMR and $^{29}$Si NMR. | | | | | | | |
|---|---|---|---|---|---|---|---|
| Sample No. | Catalyst | Cat loading (wt %) | Solvent | Tem. (° C.) | H2 (psig) | Rxn Time (hr) | Yield of Carbinol-Product (%) |
| 1 | Raney Ni 2400 | 20 | 67% IPA | 80 | 164 | 4 | 98 |
| 2 | Raney Ni 2400 | 20 | 43% IPA | 80 | 194 | 4 | 98 |
| 3 | Raney Ni 2400 | 10 | 33% IPA | 80 | 200 | 3 | 98 |

In this Working Example 2, hydrogenation of $MD_{8.7}D^{Pr\text{-}Ald}_{3.7}M$ (the hydroformylation products of aldehyde-functional siloxane of unit formula $MD_{8.7}D^{vi}_{3.7}M$) was performed according to the method of Reference Example B.

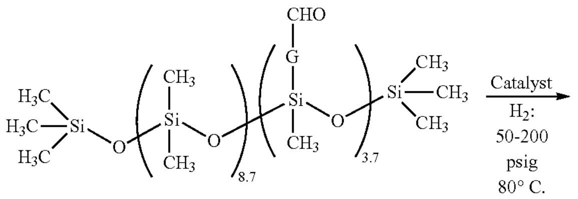

G = ($CH_2CH_2$) or ($CHCH_3$)

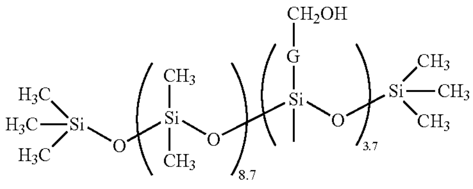

TABLE 3

The results of the hydrogenation of $MD_{8.7}\ D_{3.7}^{Pr\text{-}Ald}M$ under different reaction conditions. The carbinol yields of all the reactions listed the table were primarily greater that 95%.

| Sample No. | Catalyst | Cat loading (wt %) | Solvent | Temp (° C.) | H2 (psig) | Rxn Time (hr) | Yield of Carbinol-Product (%) |
|---|---|---|---|---|---|---|---|
| 4 | Raney Ni 2400 | 13 | 50% IPA | 80 | 25 | 4 | 99 |
| 5 | Raney Ni 2400 | 13 | None | 80 | 200 | 5.5 | 99 |
| 6 | Raney Ni 2400 | 10 | None | 80 | 200 | 7 | 99 |
| 7 | Raney Ni 2400 | 10 | 50% IPA | 80 | 200 | 3 | 99 |
| 8 | Raney Ni 2400 | 13 | 50% IPA | 80 | 200 | 2.5 | 99 |
| 9 | Raney Ni 2400 | 8 | 50% Heptane | 80 | 200 | 22.5 | 95 |
| 10 | Ni-3288 | 10 | None | 120 | 200 | 22 | 99 |
| 11 | Ru/C | 10 | None | 80 | 200 | 17 | 99 |

In this Working Example 3, hydrogenation of $M^{Pr\text{-}Ald}M^{Pr\text{-}Ald}$ (hydroformylation product of $M^{vi}M^{vi}$) was performed according to the procedure of Reference Example B.

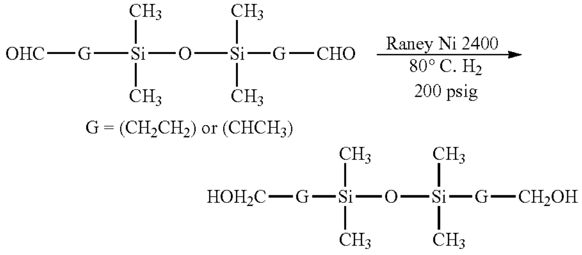

G = ($CH_2CH_2$) or ($CHCH_3$)

TABLE 4

The results of the hydrogenation of $M^{Pr\text{-}Ald}M^{Pr\text{-}Ald}$ under different reaction conditions.

| Sample No. | Catalyst | Cat loading (wt %) | Solvent | Temp (° C.) | H2 (psig) | Rxn Time (hr) | Yield of Carbinol-Product (%) |
|---|---|---|---|---|---|---|---|
| 12 | Raney Ni 2400 | 10 | 50% IPA | 80 | 200 | 1 | 99 |
| 13 | Raney Ni 2400 | 9 | 50% heptane | 80 | 200 | 6 | 99 |

In this Working Example 4, hydrogenation of $M^{Pr\text{-}Ald}D_7M^{Pr\text{-}Ald}$ (hydroformylation product of $M^{vi}D_7M^{vi}$) was performed according to the procedure in Reference Example B.

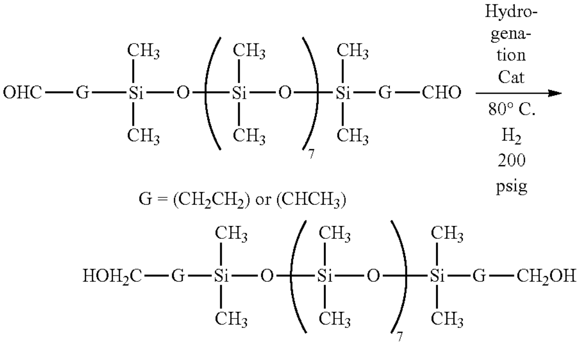

G = ($CH_2CH_2$) or ($CHCH_3$)

TABLE 5

The results of hydrogenation of $M^{Pr\text{-}Ald}D_7M^{Pr\text{-}Ald}$ under different reaction conditions.

| Sample No. | Catalyst | Cat loading (wt %) | Solvent | Temp (° C.) | $H_2$ (psig) | Rxn Time (hr) | Yield of Carbinol-Product (%) |
|---|---|---|---|---|---|---|---|
| 14 | Raney Ni 2400 | 1 | 50% IPA | 80 | 200 | 2.5 | 99 |
| 15 | Hysat 401 (Cu) | 10 | neat | 150 | 200 | 3 | 98 |
| 16 | Pt/C | 10 | neat | 50 | 100 | 6 | 65 |

The data in Table 5 show that carbinol-functional organosilicon compounds could be prepared using the hydrogenation catalysts under the conditions tested.

In this Working Example 5, hydrogenation of $D^{Pr\text{-}Ald}_4$ (hydroformylation product of $D^{vi}_4$) was performed according to the procedure in Reference Example B, above.

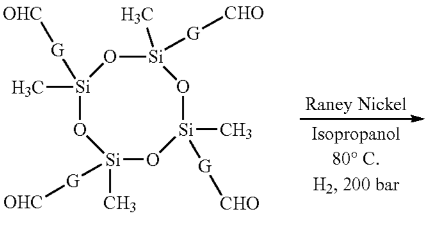

G = ($CH_2CH_2$) or ($CHCH_3$)

-continued

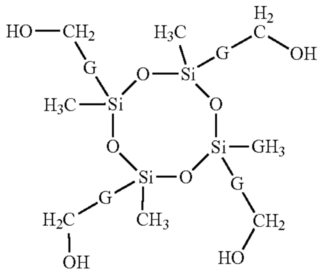

TABLE 6

The results of hydrogenation of cyclic $D_4^{Pr\text{-}Ald}$,

| Sample No. | Catalyst | Cat loading (wt %) | Solvent | Temp (° C.) | $H_2$ (psig) | Rxn Time (hr) | Yield of Carbinol-Product (%) |
|---|---|---|---|---|---|---|---|
| 17 | Raney Ni | 10 | 50% IPA | 80 | 200 | 1 | 99 |

In this Working Example 6, hydrogenation of $M^{Pr\text{-}Ald}D_{180}M^{Pr\text{-}Ald}$ (hydroformylation product of SFD119) was performed according to the procedure of Reference Example B, above.

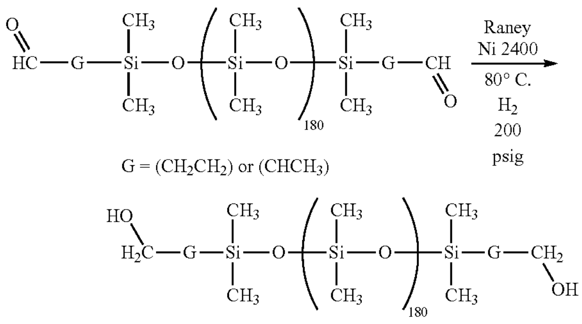

TABLE 7

The results of hydrogenation of $M^{Pr\text{-}Ald}D_{180}M^{Pr\text{-}Ald}$, The carbinol yields of all the reactions listed the table were primarily greater that 98%.

| Sample No. | Catalyst | Cat loading (wt %) | Solvent | Temp (° C.) | $H_2$ (psig) | Rxn Time (hr) | Yield of Carbinol-Product (%) |
|---|---|---|---|---|---|---|---|
| 18 | Raney Ni 2400 | 13 | 70% IPA | 80 | 200 | 3.3 | 99 |
| 19 | Raney Ni 2400 | 13 | 70% IPA | 80 | 400 | 2 | 99 |
| 20 | Raney Ni 2400 | 6.5 | 70% IPA | 80 | 200 | 4.4 | 99 |

TABLE 7-continued

The results of hydrogenation of $M^{Pr\text{-}Ald}D_{180}M^{Pr\text{-}Ald}$, The carbinol yields of all the reactions listed the table were primarily greater that 98%.

| Sample No. | Catalyst | Cat loading (wt %) | Solvent | Temp (° C.) | $H_2$ (psig) | Rxn Time (hr) | Yield of Carbinol-Product (%) |
|---|---|---|---|---|---|---|---|
| 21 | Raney Ni 2400 | 13 | 50% IPA | 80 | 200 | 3.7 | 99 |
| 22 | Raney Ni 2400 | 13 | None | 80 | 200 | >12 | 98 |

In this Working Example 7, hydrogenation of MQ Resins (hydroformylation (HF) product of MQ 6-3444) was performed according to the procedure of Reference Example B, above.

TABLE 8

The results of hydrogenation of MQ Resins (hydroformylation product of MQ63444)

| Sample No. | Catalyst | Cat loading (wt %) | Solvent | Temp (° C.) | $H_2$ (psig) | Rxn Time (hr) | Yield of Carbinol-Product (%) |
|---|---|---|---|---|---|---|---|
| 23 | Raney Ni 2400 | 20 | 50% heptane | 80 | 200 | 2.5 | 99 |

In this Working Example 8, hydrogenation of aldehyde-functional trimethylsilane was performed according to the procedure of Reference Example B, above.

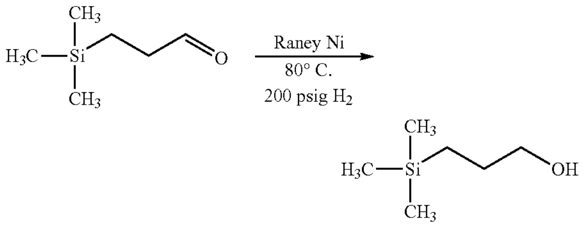

TABLE 9

The results of hydrogenation of Aldehydetrimethylsilane (hydroformylation product of vinyltrimethylsilane)

| Sample No. | Catalyst | Cat loading (wt %) | Solvent | Temp (° C.) | $H_2$ (psig) | Rxn Time (hr) | Yield of Carbinol-Product (%) |
|---|---|---|---|---|---|---|---|
| 24 | Raney Ni 2400 | 4 | 50% IPA | 80 | 200 | 4 | 99 |

In this Example 9, hydrogenation of the hydroformylation products of allyl-siloxane($M^{ally}{}_2D_{102}$) was performed as follows.

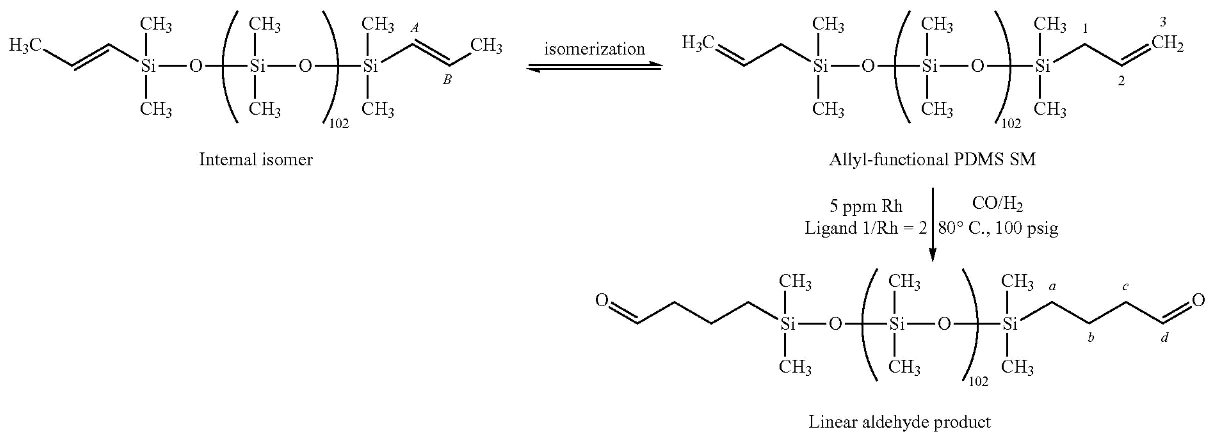

Internal isomer

Allyl-functional PDMS SM

Linear aldehyde product

Under the reaction conditions shown below in Table 10, two reactions (hydroformylation and hydrogenation) were attempted simultaneously: 1) Hydroformylation of allyl-functional polydimethylsiloxane to form mainly linear aldehyde product and no branched isomer was observed by $^1H$ NMR; 2) Isomerization of allyl to form internal olefin, so there are two olefin isomers existing during the hydroformylation reaction. However, without wishing to be bound by theory, it is thought that the hydroformylation of allyl groups was easier than that of the corresponding internal olefin isomer, so with the progress of the reaction, the internal olefin isomer changed back to the allyl group which converted to the final desired aldehyde product before hydrogenation to form the carbinol-functional polyorganosiloxane.

TABLE 10

The results of hydroformylation of allyl-siloxane ($M_2^{ally}D_{102}$)

| Sample. No. | Catalyst | Ligand | L/Rh | Cat loading (ppm) | Solvent | Temp (° C.) | $H_2$ (psig) | Rxn Time (hr) | Yield of propenyl (allyl isomer) (%) | Yield of aldehyde (%) |
|---|---|---|---|---|---|---|---|---|---|---|
| 25 | $Rh(acac)(CO)_2$ | Ligand 1 | 2 | 5 | None | 80 | 100 | 5 | 25 | 57 |
| 26 | $Rh(acac)(CO)_2$ | Ligand 1 | 2 | 5 | None | 80 | 100 | 53 | 3 | 97 |

The data in Table 10 show that hydrogenation was possible under the conditions tested above with sufficient reaction time.

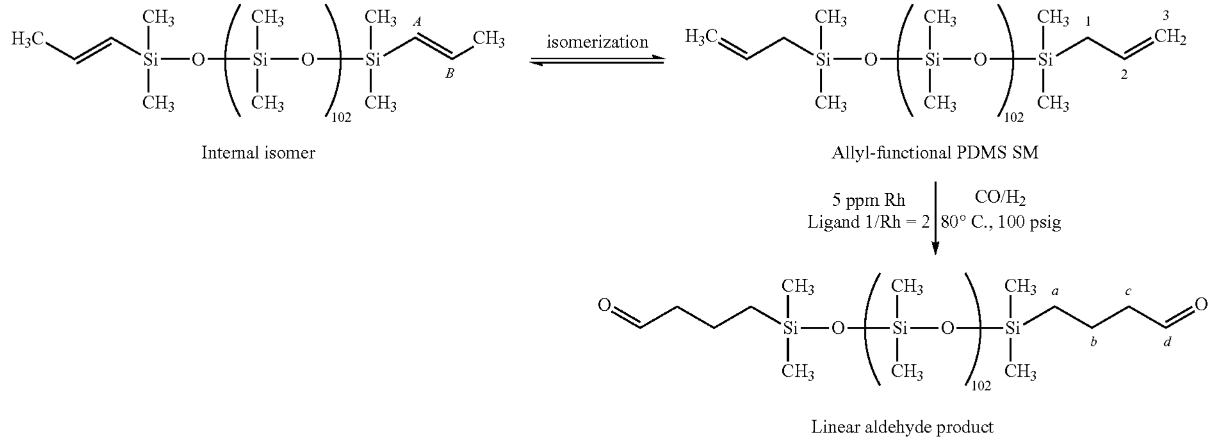

Internal isomer

Allyl-functional PDMS SM

Linear aldehyde product

TABLE 11

The results of hydrogenation of the hydroformylation product of allyl-siloxane ($M_2^{ally}D_{102}$)

| Sample No. | Catalyst | Cat loading (wt %) | Solvent | Temp (° C.) | $H_2$ (psig) | Rxn Time (hr) | Yield of Carbinol-Product (%) |
|---|---|---|---|---|---|---|---|
| 27 | Raney Ni 2400 | 10 | 50% IPA | 80 | 200 | 2.5 | 99 |

In this Working Example 10, hydrogenation of the hydroformylation products of hexenyl-siloxane(($M^{hexenyl}D_{35})_4Q$) was performed as follows.

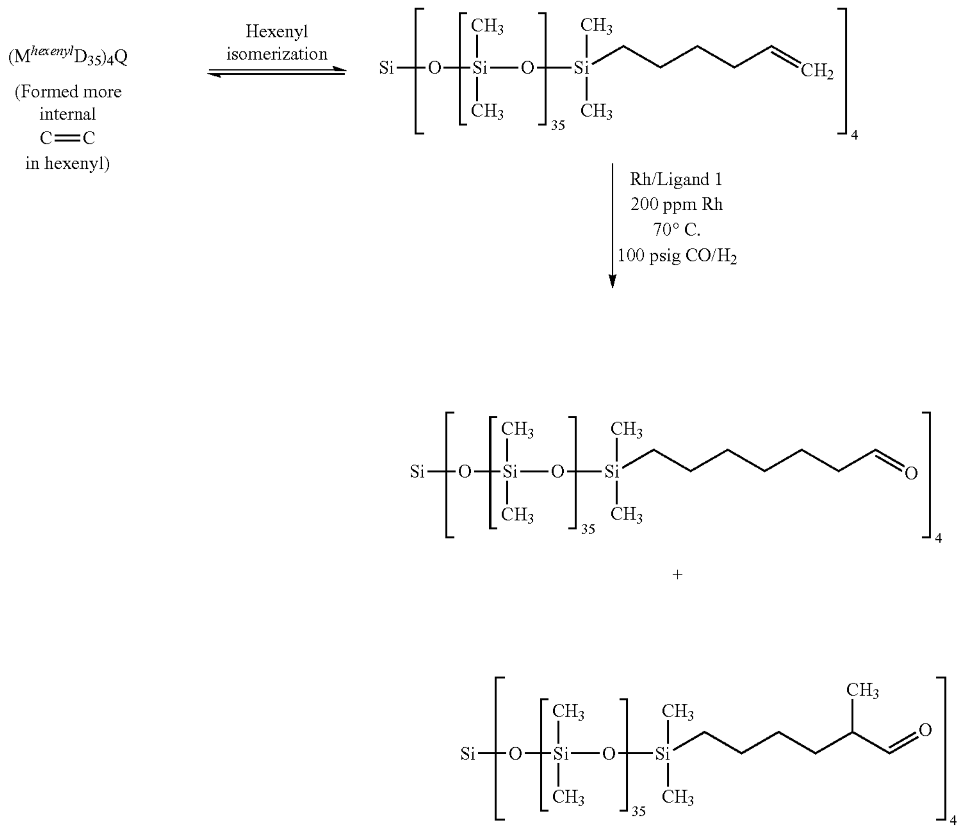

Under the reaction conditions, is thought that two reactions occurred simultaneously: 1) Hydroformylation of hexenyl-functional Q branched siloxane to form mainly linear aldehyde product; 2) Isomerization of hexenyl to form internal olefin isomers, so there are two or more olefin isomers existing during the hydroformylation reaction. However, it is further thought that the hydroformylation of terminal hexenyl was much easier than hydroformylation of its internal olefin isomers, so the internal olefin isomers cannot easily convert to aldehyde and remained as by-products in the final product.

TABLE 12

| The results of hydroformylation of hexenyl-siloxane $((M^{hexenyl}D)_{35})_4Q)$ | | | | | | | | | | |
|---|---|---|---|---|---|---|---|---|---|---|
| Sample No. | Catalyst | Ligand | L/Rh | Cat loading (ppm) | Solvent | Temp (° C.) | CO/$H_2$ (psig) | Rxn Time (hr) | Yield of internal C═C isomer) (%) | Yield of aldehyde (%) |
| 28 | $Rh(acac)(CO)_2$ | Ligand 1 | 2 | 200 | 6% toluene | 70 | 100 | 0 | 9 | 0 |
| 29 | $Rh(acac)(CO)_2$ | Ligand 1 | 2 | 200 | 6% toluene | 70 | 100 | 24 (overnight) | 23 | 77 |
| 30 | $Rh(acac)(CO)_2$ | Ligand 1 | 2 | 200 | 6% toluene | 70 | 100 | 72 (over weekend) | 17 | 83 |

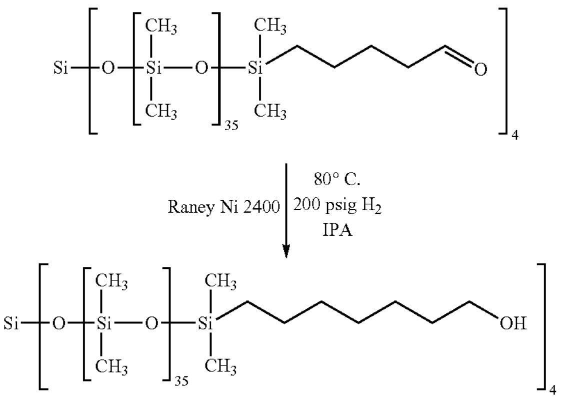

TABLE 13

| The results of hydrogenation of the hydroformylation product of allyl-siloxane $(M_2^{allyl}D_{102})$ | | | | | | | | | |
|---|---|---|---|---|---|---|---|---|---|
| Sample No. | Catalyst | Cat loading (wt %) | Solvent | Temp (° C.) | $H_2$ (psig) | Rxn Time (hr) | Hydrogenation internal C═C (conversion %) | Conversion of Aldehyde (%) | Yield of Carbinol-Product (%) |
| 31 | Raney Ni 2400 | 14 | 50% IPA | 80 | 200 | 24 | 65 | 100 | 99 |

In this Working Example 11, stability study of siloxane backbones during hydrogenation reaction was studied, as follows: The siloxane backbones remained intact (with little to no decomposition or re-arrangement) during the hydrogenation reaction, which is very important for wide application of this technology. Two examples are listed here to demonstrate the stability of siloxane backbones during hydrogenation reaction.

(a) Hydrogenation of $M_2D_{9.1}$ $D^{Pr\text{-}Ald}{}_{3.7}$ Using Ni-3288 and Raney Ni 2400 as Catalysts The $^{29}$SiNMR spectra of vinyl, aldehyde and final carbinol products indicated that no siloxane bond decomposition occurred and the ratio of M:(D+$D^{fun}$) was maintained constant (2:13) during the hydrogenation reaction.

(b) Hydrogenation of the Hydroformylation Products of Hexenyl-Siloxane($(M^{hex}D_{35})_4Q$) Shown in Example 10.

The $^{29}$SiNMR spectra of vinyl, aldehyde and final carbinol products indicated that no siloxane bond decomposition occurred, and the ratio of M:$M^{fun}$:D:Q maintained almost constant during the hydrogenation reaction.

INDUSTRIAL APPLICABILITY

The working examples above show that a variety of aldehyde-functional organosilicon compounds can be successfully hydrogenated to form carbinol-functional organosilicon compounds using the process of this invention. The process described herein is flexible in that a wide variety of polymeric polyorganosiloxanes and organosilicon small molecules, with both pendant and/or terminal functionality) can be prepared. In addition, the process may have one or more of the following benefits: low cost, simple process, can be performed at low hydrogenation pressure <200 psig (low capital cost, safety), low temperature of 150° C. or less (less likely to degrade sensitive molecules, lower capital cost, and safer), minimal side products, and nearly complete recovery of heterogeneous catalyst. In addition, the process described herein may provide one or more of the additional benefits of generating high purity carbinol-functional organosilicon compounds with very little or no side reactions taking place, and the hydrogenation reaction can run neat (solventless), as a one-pot reaction, with easy work up (simple filtration) to recover the product.

Definitions and Usage of Terms

All amounts, ratios, and percentages herein are by weight, unless otherwise indicated. The amounts of all starting materials in a composition total 100% by weight. The SUMMARY and ABSTRACT are hereby incorporated by reference. The articles ‘a’, ‘an’, and ‘the’ each refer to one or more, unless otherwise indicated by the context of specification. The singular includes the plural unless otherwise indicated. The transitional phrases “comprising”, “consisting essentially of”, and “consisting of” are used as described in the Manual of Patent Examining Procedure Ninth Edition, Revision 08.2017, Last Revised January 2018 at section § 2111.03 I., II., and III. The abbreviations used herein have the definitions in Table Z.

TABLE Z

| Abbreviations | |
|---|---|
| Abbreviation | Definitions |
| acac | acetyl acetonate |
| ° C. | degrees Celsius |
| D | Difunctional siloxy unit, trimethylsiloxy unit of formula $Me_2SiO_{2/2}$ |
| $D^{al}$ | Difunctional siloxy unit, allylmethylsiloxy unit of formula $(Allyl)(Me)SiO_{2/2}$ |
| $D^{hex}$ | Difunctional siloxy unit, hexenylmethylsiloxy unit of formula $(Hex)(Me)SiO_{2/2}$ |
| $D^{Pr\text{-}ald}$ | Difunctional siloxy unit, propylaldehyde, methylsiloxy unit of formula $(Pr\text{-}ald)(Me)SiO_{2/2}$ |
| $D^{vi}$ | Difunctional siloxy unit, vinylmethylsiloxy unit of formula $(Vi)(Me)SiO_{2/2}$ |
| Et | ethyl |
| FTIR | Fourier transform infra-red |
| g | gram |
| GPC | gel permeation chromatography |
| h | hour |
| Hex | hexenyl |
| iPr | isopropyl |
| kPa | kiloPascals |
| m | meter |
| M | Monofunctional siloxy unit, trimethylsiloxy unit of formula $R_3SiO_{1/2}$ or $Me_3SiO_{1/2}$ |
| $M^{al}$ | Monofunctional siloxy unit, allyldimethylsiloxy unit of formula $(Allyl)(Me_2)SiO_{1/2}$ |
| $M^{hex}$ | Monofunctional siloxy unit, hexenyldimethylsiloxy unit of formula $(Hex)(Me_2)SiO_{1/2}$ |
| $M^{Pr\text{-}ald}$ | Monofunctional siloxy unit, propyladehyde, dimethylsiloxy unit of formula $(Pr\text{-}ald)(Me_2)SiO_{1/2}$ |
| $M^{vi}$ | Monofunctional siloxy unit, vinyldimethylsiloxy unit of formula $(Vi)(Me_2)SiO_{1/2}$ |
| Me | methyl |
| mg | milligram |
| min | minute |
| mL | milliliter |
| mm | millimeter |
| Mmol | millimole |
| Mn | number average molecular weight measured by GPC |
| Mw | weight average molecular weight measured by GPC |
| mPa · s | milliPascal seconds |
| NBD | norbornadiene |
| NMR | nuclear magnetic resonance |
| PDI | Polydispersity index (calculated as Mw/Mn) |
| Ph | phenyl |
| ppm | parts per million by weight |
| Pr | propyl |
| Pr-ald | propyl-aldehyde |
| psi | pounds per square inch |
| Q | tetrafunctional siloxy unit of formula $SiO_{4/2}$ |
| RPM | revolutions per minute |
| RT | room temperature of 25 ± 5° C. |
| TDCC | The Dow Chemical Company of Midland, Michigan, USA |
| THF | tetrahydrofuran |
| μm | micrometer |
| Vi | vinyl |

The following test methods were used herein. FTIR: The concentration of silanol groups present in the polyorganosiloxane resins (e.g., polyorganosilicate resins and/or silsesquioxane resins) was determined using FTIR spectroscopy according to ASTM Standard E-168-16. GPC: The molecular weight distribution of the polyorganosiloxanes was determined by GPC using an Agilent Technologies 1260 Infinity chromatograph and toluene as a solvent. The instrument was equipped with three columns, a PL gel 5 μm 7.5×50 mm guard column and two PLgel 5 μm Mixed-C 7.5×300 mm columns. Calibration was made using polystyrene standards. Samples were made by dissolving polyorganosiloxanes in toluene (~1 mg/mL) and then immediately analyzing the solution by GPC (1 m/min flow, 35° C. column temperature, 25-minute run time). $^{29}Si$ NMR: Alkenyl content of starting material (B) can be measured by the technique described in "The Analytical Chemistry of Silicones" ed. A. Lee Smith, Vol. 112 in Chemical Analysis, John Wiley & Sons, Inc. (1991). Viscosity: Viscosity may be measured at 25° C. at 0.1 to 50 RPM on a Brookfield DV-III cone & plate viscometer with #CP-52 spindle, e.g., for polymers (such as certain (B2) alkenyl-functional polyorganosiloxanes) with viscosity of 120 mPa·s to 250,000 mPa·s. One skilled in the art would recognize that as viscosity increases, rotation rate decreases and would be able to select appropriate spindle and rotation rate.

The aldehyde-functional organosilicon compounds, and hydrogenation reaction product mixtures, in the examples above, were analyzed by $^{1}H$, $^{13}C$ NMR and $^{29}Si$ NMR, GC/MS, GPC and viscosity. The conversion and yield in the examples above were mainly based on $^{1}H$ NMR data.

EMBODIMENTS OF THE INVENTION

In a first embodiment, a process for preparing a carbinol-functional organosilicon compound comprises:

1) combining, under conditions to catalyze hydroformylation reaction, starting materials comprising
   (A) a gas comprising hydrogen and carbon monoxide,
   (B) an alkenyl-functional organosilicon compound, and
   (C) a rhodium/bisphosphite ligand complex catalyst, where the bisphosphite ligand has formula

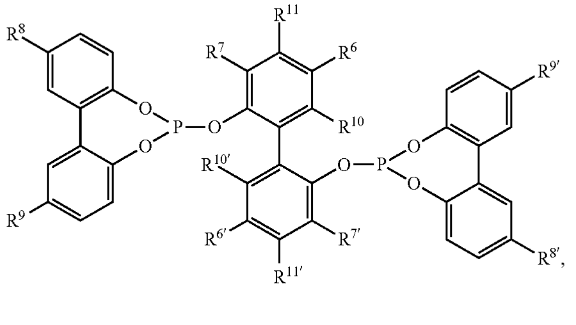

where $R^6$ and $R^{6'}$ are each independently selected from the group consisting of hydrogen, an alkyl group of 1 to 20 carbon atoms, a cyano group, a halogen group, and an alkoxy group of 1 to 20 carbon atoms;

$R^7$ and $R^{7'}$ are each independently selected from the group consisting of an alkyl group of 3 to 20 carbon atoms, and a group of formula —$SiR^{17}_3$, where each $R^{17}$ is an independently selected monovalent hydrocarbon group of 1 to 20 carbon atoms;

$R^8$, $R^{8'}$, $R^{9'}$ and $R^{9'}$ are each independently selected from the group consisting of hydrogen, an alkyl group, a cyano group, a halogen group, and an alkoxy group, and $R^{10}$ $R^{10'}$, $R^{11}$, and $R^{11'}$ are each independently selected from the group consisting of hydrogen or and alkyl group; thereby forming a hydroformylation reaction product comprising an aldehyde-functional organosilicon compound; and 2) combining, under conditions to catalyze hydrogenation reaction, starting materials comprising (E) the aldehyde-functional organosilicon compound, (F) hydrogen, and (G) a hydrogenation catalyst, thereby forming a hydrogenation reaction product comprising (I) the carbinol-functional organosilicon compound.

In a second embodiment, in the process of the first embodiment, starting material (B) comprises an alkenyl-functional silane of formula (B1): $R^A_xSiR^4_{(4-x)}$, where each $R^A$ is an independently selected alkenyl group of 2 to 8 carbon atoms; each $R^4$ is independently selected from the group consisting of an alkyl group of 1 to 18 carbon atoms, an aryl group of 6 to 18 carbon atoms, an acyloxy group of 2 to 18 carbon atoms, and an hydrocarbonoxy-functional group of 1 to 18 carbon atoms; and subscript x is 1 to 4.

In a third embodiment, in the process of the first embodiment or the second embodiment, the alkenyl-functional organosilicon compound comprises an alkenyl-functional polyorganosiloxane of unit formula: $(R^4_3SiO_{1/2})_a(R^4_2R^ASiO_{1/2})_b(R^4_2SiO_{2/2})_c(R^4R^ASiO_{2/2})_d(R^4SiO_{3/2})_e(R^ASiO_{3/2})_f(SiO_{4/2})_g(ZO_{1/2})_h$; where each $R^A$ is an independently selected alkenyl group of 2 to 8 carbon atoms, and each $R^4$ is independently selected from the group consisting of an alkyl group of 1 to 18 carbon atoms, an aryl group of 6 to 18 carbon atoms, and an hydrocarbonoxy group of 1 to 18 carbon atoms; each Z is independently selected from the group consisting of a hydrogen atom and $R^5$, where each $R^5$ is independently selected from the group consisting of alkyl groups of 1 to 18 carbon atoms and aryl groups of 6 to 18 carbon atoms; subscripts a, b, c, d, e, f, and g represent numbers of each unit in formula (B2-1) and have values such that subscript a≥0, subscript b≥0, subscript c≥0, subscript d≥0, subscript e≥0, subscript f≥0, subscript g≥0; and subscript h has a value such that 0≥h/(e+f+g)≥1.5, 10,000≥(a+b+c+d+e+f+g)≥2, and a quantity (b+d+f)≥1.

In a fourth embodiment, in the process of the third embodiment, the alkenyl-functional polyorganosiloxane is cyclic and has a unit formula selected from the group consisting of: $(R^4R^ASiO_{2/2})_d$, where subscript d is 3 to 12; $(R^4_2SiO_{2/2})_c(R^4R^ASiO_{2/2})_d$, where c is 0 to 6 and d is 3 to 12; and a combination thereof.

In a fifth embodiment, in the process of the third embodiment, the alkenyl-functional polyorganosiloxane is linear and comprises unit formula (B3): $(R^4_3SiO_{1/2})_a(R^4_2R^ASiO_{1/2})_b(R^4_2SiO_{2/2})_c(R^4R^ASiO_{2/2})_d$, where a quantity (a+b)=2, a quantity (b+d)≥1, and a quantity (a+b+c+d)≥2.

In a sixth embodiment, in the process of the third embodiment, the alkenyl-functional polyorganosiloxane is an alkenyl-functional polyorganosilicate resin comprising unit formula: $(R^4_3SiO_{1/2})_{mm}(R^4_2R^ASiO_{1/2})_{nn}(SiO_{4/2})_{oo}(ZO_{1/2})_h$, where subscripts mm, nn, and oo represent mole percentages of each unit in the polyorganosilicate resin; and subscripts mm, nn and oo have average values such that mm≥0, nn≥0, oo>0, and 0.5≤(mm+nn)/oo≤4.

In a seventh embodiment, in the process of the third embodiment, the alkenyl-functional polyorganosiloxane is an alkenyl-functional silsesquioxane resin comprising unit formula: $(R^4_3SiO_{1/2})_a(R^4_2R^ASiO_{1/2})_b(R^4_2SiO_{2/2})_c(R^4R^ASiO_{2/2})_d(R^4SiO_{3/2})_e(R^ASiO_{3/2})_f(ZO_{1/2})_h$; where f>1, 2<(e+f)<10,000; 0<(a+b)/(e+f)<3; 0<(c+d)/(e+f)<3; and 0<h/(e+f)<1.5.

In an eighth embodiment, in the process of any one of the third to seventh embodiments, each $R^A$ is independently selected from the group consisting of vinyl, allyl, and hexenyl.

In a ninth embodiment, in the process of any one of the third to eighth embodiments, each $R^4$ is independently selected from the group consisting of methyl and phenyl.

In a tenth embodiment, in the process of the first embodiment, the alkenyl-functional organosilicon compound comprises an alkenyl-functional silazane.

In an eleventh embodiment, in the process of any one of the first to tenth embodiments, in the bisphosphite ligand, $R^6$ and $R^{6'}$ are each selected from the group consisting of a methoxy group and a t-butyl group, $R^7$ and $R^{7'}$ are each a t-butyl group, and $R^8$, $R^{8'}$, $R^9$, $R^{9'}$, $R^{10}$ $R^{10'}$, $R^{11}$, and $R^{11'}$ are each hydrogen.

In a twelfth embodiment, in the process of any one of the first to eleventh embodiments, starting material (C) is present in an amount sufficient to provide 0.1 ppm to 300 ppm Rh based on combined weights of starting materials (A), (B), and (C).

In a thirteenth embodiment, in the process of any one of the first to twelfth embodiments, starting material (C) has a molar ratio of bisphosphite ligand/Rh of 1/1 to 10/1.

In a fourteenth embodiment, in the process of any one of the first to thirteenth embodiments, the conditions in step 1) are selected from the group consisting of: i) a temperature of 30° C. to 150° C.; ii) a pressure of 101 kPa to 6,895 kPa; iii)

a molar ratio of $CO/H_2$ in the syngas of 3/1 to 1/3; and iv) a combination of two or more of conditions i), ii) and iii).

In a fifteenth embodiment, in the process of any one of the first to fourteenth embodiments, (C) the rhodium/bisphosphite ligand complex catalyst is formed by combining a rhodium precursor and the bisphosphite ligand to form a rhodium/bisphosphite ligand complex and combining the rhodium/bisphosphite ligand complex and starting material (A) with heating before step 1).

In a sixteenth embodiment, the aldehyde-functional organosilicon compound prepared by the process of the first embodiment or the second embodiment is an aldehyde-functional silane of formula (E1): $R^{Ald}_xSiR^4_{(4-x)}$, where each $R^{Ald}$ is an independently selected aldehyde group of 3 to 9 carbon atoms; each $R^4$ is independently selected from the group consisting of an alkyl group of 1 to 18 carbon atoms, an aryl group of 6 to 18 carbon atoms, an acyloxy group of 2 to 18 carbon atoms, and an hydrocarbonoxy-functional group of 1 to 18 carbon atoms; and subscript x is 1 to 4.

In a seventeenth embodiment, the aldehyde-functional organosilicon compound prepared by the process of the first embodiment or the second embodiment is an aldehyde-functional polyorganosiloxane of unit formula (E2-1): $(R^4_3SiO_{1/2})_a(R^4_2R^{Ald}SiO_{1/2})_b(R^4_2SiO_{2/2})_c(R^4R^{Ald}SiO_{2/2})_d(R^4SiO_{3/2})_e(R^{Ald}SiO_{3/2})_f(SiO_{4/2})_g(ZO_{1/2})_h$; where each $R^{Ald}$ is an independently selected aldehyde group of 3 to 9 carbon atoms, and each $R^4$ is independently selected from the group consisting of an alkyl group of 1 to 18 carbon atoms, an aryl group of 6 to 18 carbon atoms, and an hydrocarbonoxy group of 1 to 18 carbon atoms; each Z is independently selected from the group consisting of a hydrogen atom and $R^5$, where each $R^5$ is independently selected from the group consisting of alkyl groups of 1 to 18 carbon atoms and aryl groups of 6 to 18 carbon atoms; subscripts a, b, c, d, e, f, and g represent numbers of each unit in formula (E2-1) and have values such that subscript a≥0, subscript b≥0, subscript c≥0, subscript d≥0, subscript e≥0, subscript f≥0, subscript g≥0; and subscript h has a value such that $0 \le h/(e+f+g) \le 1.5$, $10{,}000 \ge (a+b+c+d+e+f+g) \ge 2$, and a quantity $(b+d+f) \ge 1$.

In an eighteenth embodiment, in the process of the seventeenth embodiment, the aldehyde-functional polyorganosiloxane is cyclic and has a unit formula selected from the group consisting of: $(R^4R^{Ald}SiO_{2/2})_d$, where subscript d is 3 to 12; $(R^4_2SiO_{2/2})_c(R^4R^{Ald}SiO_{2/2})_d$, where c is >0 to 6 and d is 3 to 12; and a combination thereof.

In a nineteenth embodiment, in the process of the seventeenth embodiment, the aldehyde-functional polyorganosiloxane is linear and comprises unit formula (E3): $(R^4_3SiO_{1/2})_a(R^4_2R^{Ald}SiO_{1/2})_b(R^4_2SiO_{2/2})_c(R^4R^{Ald}SiO_{2/2})_d$, where a quantity $(a+b)=2$, a quantity $(b+d) \ge 1$, and a quantity $(a+b+c+d) \ge 2$.

In a twentieth embodiment, in the process of the seventeenth embodiment, the aldehyde-functional polyorganosiloxane is an aldehyde-functional polyorganosilicate resin comprising unit formula: $(R^4_3SiO_{1/2})_{mm}(R^4_2R^{Ald}SiO_{1/2})_{nn}(SiO_{4/2})_{oo}(ZO_{1/2})_h$, where subscripts mm, nn, and oo represent mole percentages of each unit in the polyorganosilicate resin; and subscripts mm, nn and oo have average values such that mm≥0, nn≥0, oo>0, and $0.5 \le (mm+nn)/oo \le 4$.

In a twenty-first embodiment, in the process of the seventeenth embodiment, the aldehyde-functional polyorganosiloxane is an aldehyde-functional silsesquioxane resin comprising unit formula: $(R^4_3SiO_{1/2})_a(R^4_2R^{Ald}SiO_{1/2})_b(R^4_2SiO_{2/2})_c(R^4R^{Ald}SiO_{2/2})_d(R^4SiO_{3/2})_e(R^{Ald}SiO_{3/2})_f(ZO_{1/2})_h$; where f>1, $2<(e+f)<10{,}000$; $0<(a+b)/(e+f)<3$; $0<(c+d)/(e+f)<3$; and $0<h/(e+f)<1.5$.

In a twenty-second embodiment, in the process of the seventeenth embodiment, the aldehyde-functional polyorganosiloxane is branched and comprises unit formula: $R^{Ald}$-$SiR^{12}_3$, where each $R^{12}$ is selected from $R^{13}$ and $—OSi(R^{14})_3$; where each $R^{13}$ is a monovalent hydrocarbon group; where each $R^{14}$ is selected from $R^{13}$, $—OSi(R^{15})_3$, and $—[OSiR^{13}_2]_{ii}OSiR^{13}_3$; where each $R^{15}$ is selected from $R^{13}$, $—OSi(R^{16})_3$, and $—[OSiR^{13}_2]_{ii}OSiR^{13}_3$; where each $R^{16}$ is selected from $R^{13}$ and $—[OSiR^{13}_2]_{ii}OSiR^{13}_3$; and where subscript ii has a value such that $0 \le ii \le 100$, with the proviso that at least two of $R^{12}$ are $—OSi(R^{14})_3$.

In a twenty-third embodiment, in the process of any one of the seventeenth to twenty-second embodiments, each $R^{Ald}$ is independently selected from the group consisting of propyl aldehyde, butyl aldehyde, and heptyl aldehyde.

In a twenty-fourth embodiment, in the process of any one of the seventeenth to twenty-third embodiments, each $R^4$ is independently selected from the group consisting of methyl and phenyl.

In a twenty-fifth embodiment, in the process of the fifteenth embodiment, the aldehyde-functional organosilicon compound comprises an aldehyde-functional silazane.

In a twenty-sixth embodiment, the process of any one of the first to twenty-fifth embodiments further comprises recovering the aldehyde-functional organosilicon compound before step 2).

In a twenty-seventh embodiment, in step 2) of the process of any one of the first to twenty-sixth embodiments the hydrogenation catalyst is a heterogeneous hydrogenation catalyst comprising a metal selected from the group consisting of Ni, Cu, Co, Ru, Pd, Pt, and a combination of two or more thereof.

In a twenty-eighth embodiment, in the process of the twenty-seventh embodiment the hydrogenation catalyst is selected from the group consisting of Raney nickel, Raney copper, copper catalyst on a porous supporting material, a palladium catalyst on a porous supporting material, a ruthenium catalyst on a porous supporting material, and a combination of two or more thereof; wherein the porous supporting material is selected from the group consisting of $Al_2O_3$, $SiO_2$, SiC, and C.

In a twenty-ninth embodiment, in step 2) of the process of any one of the first to twenty-eighth embodiments, amount of the hydrogenation catalyst is 1 weight % to 20 weight % based on weight of the aldehyde-functional organosilicon compound.

In a thirtieth embodiment, in step 2) of the process of any one of the first to twenty-ninth embodiments, $H_2$ pressure is 10 psig (68.9 kPa) to 800 psig (5516 kPa).

In a thirty-first embodiment, in step 2) of the process of the thirtieth embodiment, the $H_2$ pressure is 50 psig (345 kPa) to 200 psig (1379 kPa).

In a thirty-second embodiment, in step 2) of the process of any one of the first to thirty-first embodiments, temperature is 0° C. to 200° C.

In a thirty-third embodiment, in step 2) of the process of the thirty-second embodiment, the temperature is 50° C. to 150° C.

In a thirty-fourth embodiment, in the process of any one of the first to thirty-third embodiments, the hydrogenation catalyst is pre-treated before step 2).

In a thirty-fifth embodiment, the process of any one of the first to thirty-fourth embodiments, further comprises pre-treating the hydrogenation catalyst before step 2).

In a thirty-sixth embodiment, the process of any one of the first to thirty-fifth embodiments, further comprises 3) recovering the carbinol-functional organosilicon compound from the hydrogenation reaction product after step 2).

In a thirty-seventh embodiment, in the process of the second embodiment, the carbinol-functional organosilicon compound comprises a carbinol-functional silane of formula: $R^{Car}_xSiR^4_{(4-x)}$, where each $R^{Car}$ is an independently selected carbinol group of 3 to 9 carbon atoms of formula

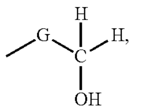

where G is a divalent hydrocarbon group free of aliphatic unsaturation that has 2 to 8 carbon atoms; each $R^4$ is independently selected from the group consisting of an alkyl group of 1 to 18 carbon atoms, an aryl group of 6 to 18 carbon atoms, an acyloxy group of 2 to 18 carbon atoms, and an hydrocarbonoxy-functional group of 1 to 18 carbon atoms; and subscript x is 1 to 4.

In a thirty-eighth embodiment, in the process of the second embodiment, the carbinol-functional organosilicon compound comprises a carbinol-functional polyorganosiloxane of unit formula: $(R^4_3SiO_{1/2})_a(R^4_2R^{Car}SiO_{1/2})_b(R^4_2SiO_{2/2})_c(R^4R^{Car}SiO_{2/2})_d(R^4SiO_{3/2})_e(R^{Car}SiO_{3/2})_f(SiO_{4/2})_g(ZO_{1/2})_h$; where each $R^{Car}$ is an independently selected carbinol group of 3 to 9 carbon atoms, and each $R^4$ is independently selected from the group consisting of an alkyl group of 1 to 18 carbon atoms, an aryl group of 6 to 18 carbon atoms, and an hydrocarbonoxy group of 1 to 18 carbon atoms; each Z is independently selected from the group consisting of a hydrogen atom and $R^5$, where each $R^5$ is independently selected from the group consisting of alkyl groups of 1 to 18 carbon atoms and aryl groups of 6 to 18 carbon atoms; subscripts a, b, c, d, e, f, and g represent numbers of each unit in formula (E2-1) and have values such that subscript a≥0, subscript b≥0, subscript c≥0, subscript d≥0, subscript e≥0, subscript f≥0, subscript g≥0; and subscript h has a value such that 0 h/(e+f+g)≥1.5, 10,000≥(a+b+c+d+e+f+g)≥2, and a quantity (b+d+f)≥1.

In a thirty-ninth embodiment, in the process of the thirty-eighth embodiment, the carbinol-functional polyorganosiloxane is cyclic and has a unit formula selected from the group consisting of $(R^4R^{Car}SiO_{2/2})_d$, where subscript d is 3 to 12; $(R^4_2SiO_{2/2})_c(R^4R^{Car}SiO_{2/2})_d$, where c is >0 to 6 and d is 3 to 12.

In a fortieth embodiment, in the process of the thirty-eighth embodiment, the carbinol-functional polyorganosiloxane is linear and comprises unit formula: $(R^4_3SiO_{1/2})_a(R^4_2R^{Car}SiO_{1/2})_b(R^4_2SiO_{2/2})_c(R^4R^{Car}SiO_{2/2})_d$, where a quantity (a+b)=2, a quantity (b+d)≥1, and a quantity (a+b+c+d)≥2.

In a forty-first embodiment, in the process of the thirty-eighth embodiment, the carbinol-functional polyorganosiloxane is a carbinol-functional polyorganosilicate resin comprising unit formula: $(R^4_3SiO_{1/2})_{mm}(R^4_2R^{Car}SiO_{1/2})_{aa}(SiO_{4/2})_{oo}(ZO_{1/2})_h$, where subscripts mm, nn, and oo represent mole percentages of each unit in the polyorganosilicate resin; and subscripts mm, nn and oo have average values such that mm≥0, nn≥0, oo>0, and 0.5≤(mm+nn)/oo≤4.

In a forty-second embodiment, in the process of the thirty-eighth embodiment, the carbinol-functional polyorganosiloxane is a carbinol-functional silsesquioxane resin comprising unit formula: $(R^4_3SiO_{1/2})_a(R^4_2R^{Car}SiO_{1/2})_b(R^4_2SiO_{2/2})_c(R^4R^{Car}SiO_{2/2})_d(R^4SiO_{3/2})_e(R^{Car}SiO_{3/2})(ZO_{1/2})_h$; where f>1, 2<(e+f)<10,000; 0<(a+b)/(e+f)<3; 0<(c+d)/(e+f)<3; and 0<h/(e+f)<1.5.

In a forty-third embodiment, in the process of the thirty-eighth embodiment, where the carbinol-functional polyorganosiloxane is branched.

In a forty-fourth embodiment, in the process of any one of the thirty-seventh embodiment to the forty-third embodiment, each $R^{Car}$ is independently selected from the group consisting of $-(C_3H_6)OH$, $-(C_4H_8)OH$, and $-(C_7H_{14})OH$.

In a forty-fifth embodiment, in the process of any one of the thirty-seventh embodiment to the forty-fourth embodiment, where each $R^4$ is independently selected from the group consisting of methyl and phenyl.

In a forty-sixth embodiment, in the process of any one of the thirty-seventh embodiment to the forty-fourth embodiment, where the carbinol-functional organosilicon compound comprises a carbinol-functional silazane.

The invention claimed is:

1. A process for preparing a carbinol-functional organosilicon compound, the process comprising:

I) combining, under conditions to catalyze hydrogenation reaction, starting materials comprising an aldehyde-functional organosilicon compound, hydrogen, and a hydrogenation catalyst, thereby forming a hydrogenation reaction product comprising the carbinol-functional organosilicon compound.

2. The process of claim 1, where the aldehyde-functional organosilicon compound comprises an aldehyde-functional silane of formula: $R^{Ald}_xSiR^4_{(4-x)}$, where each $R^{Ald}$ is an independently selected aldehyde group of 3 to 9 carbon atoms

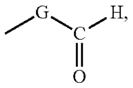

where G is a linear or branched divalent hydrocarbon group of 2 to 8 carbon atoms that is free of aliphatic unsaturation; each $R^4$ is independently selected from the group consisting of an alkyl group of 1 to 18 carbon atoms, an aryl group of 6 to 18 carbon atoms, an acyloxy group of 2 to 18 carbon atoms, and an hydrocarbonoxy-functional group of 1 to 18 carbon atoms; and subscript x is 1 to 4.

3. The process of claim 1, where the aldehyde-functional organosilicon compound comprises an aldehyde-functional polyorganosiloxane of unit formula:

$(R^4_3SiO_{1/2})_a(R^4_2R^{Ald}SiO_{1/2})_b(R^4_2SiO_{2/2})_c(R^4R^{Ald}SiO_{2/2})_d(R^4SiO_{3/2})_c(R^{Ald}SiO_{3/2})(SiO_{4/2})_g(ZO_{1/2})_h$;

where each $R^{Ald}$ is an independently selected aldehyde group of 3 to 9 carbon atoms, and each $R^4$ is independently selected from the group consisting of an alkyl group of 1 to 18 carbon atoms, an aryl group of 6 to 18 carbon atoms, and an hydrocarbonoxy group of 1 to 18 carbon atoms; each Z is independently selected from the group consisting of a hydrogen atom and $R^5$, where each $R^5$ is independently selected from the group consisting of alkyl groups of 1 to 18 carbon atoms and aryl groups of 6 to 18 carbon atoms; subscripts a, b, c, d, e, f, and g represent numbers of each unit in the unit formula and have values such that subscript a≥0, subscript b≥0, subscript c≥0, subscript d≥0, subscript e≥0, subscript f≥0, subscript g≥0; and subscript h has a value such that 0≤h/(e+f+g)≤1.5, 10,000≥(a+b+c+d+e+f+g)≥2, and a quantity (b+d+f)≥1.

4. The process of claim 3, where the aldehyde-functional polyorganosiloxane is selected from the group consisting of:

i) a cyclic aldehyde-functional polyorganosiloxane having a unit formula selected from the group consisting of $(R^4R^{Ald}SiO_{2/2})_d$, where subscript d is 3 to 12; $(R^4_2SiO_{2/2})_c(R^4R^{Ald}SiO_{2/2})_d$, where c is >0 to 6 and d is 3 to 12; and a combination thereof;

ii) a linear aldehyde-functional polyorganosiloxane comprising unit formula: $(R^4_3SiO_{1/2})_a(R^4_2R^{Ald}SiO_{1/2})_b(R^4_2SiO_{2/2})_c(R^4R^{Ald}SiO_{2/2})_d$, where a quantity $(a+b)=2$, a quantity $(b+d)\geq 1$, and a quantity $(a+b+c+d)\geq 2$;

iii) an aldehyde-functional polyorganosilicate resin comprising unit formula: $(R^4_3SiO_{1/2})_{mm}(R^4_2R^{Ald}SiO_{1/2})_{nn}(SiO_{4/2})_{oo}(ZO_{1/2})_h$, where subscripts mm, nn, and oo represent mole percentages of each unit in the polyorganosilicate resin; and subscripts mm, nn and oo have average values such that $mm\geq 0$, $nn\geq 0$, $oo>0$, and $0.5\leq(mm+nn)/oo\leq 4$;

iv) an aldehyde-functional silsesquioxane resin comprising unit formula: $(R^4_3SiO_{1/2})_a(R^4_2R^{Ald}SiO_{1/2})_b(R^4_2SiO_{2/2})_c(R^4R^{Ald}SiO_{2/2})_d(R^4SiO_{3/2})_e(R^{Ald}SiO_{3/2})(ZO_{1/2})_h$; where $f>1$, $2<(e+f)<10{,}000$; $0<(a+b)/(e+f)<3$; $0<(c+d)/(e+f)<3$; and $0<h/(e+f)<1.5$;

v) a branched aldehyde-functional polyorganosiloxane comprising unit formula: $R^{Ald}SiR^{12}_3$, where each $R^{12}$ is selected from $R^{13}$ and $—OSi(R^{14})_3$; where each $R^{13}$ is a monovalent hydrocarbon group; where each $R^{14}$ is selected from $R^{13}$, $—OSi(R^{15})_3$, and $—[OSiR^{13}_2]_{ii}OSiR^{13}_3$; where each $R^{15}$ is selected from $R^{13}$, $—OSi(R^{16})_3$, and $—[OSiR^{13}_2]_{ii}OSiR^{13}_3$; where each $R^{16}$ is selected from $R^{13}$ and $—[OSiR^{13}_2]_{ii}OSiR^{13}_3$; and where subscript ii has a value such that $0\leq ii\leq 100$, with the proviso that at least two of $R^{12}$ are $—OSi(R^{14})_3$.

5. The process of claim 3, where each $R^{Ald}$ is independently selected from the group consisting of propyl aldehyde, butyl aldehyde, and heptyl aldehyde.

6. The process of claim 3, where each $R^4$ is independently selected from the group consisting of methyl and phenyl.

7. The process of claim 1, where the aldehyde-functional organosilicon compound comprises an aldehyde-functional silazane.

8. The process of claim 1, further comprising forming the aldehyde-functional organosilicon compound before step I) by a process comprising: combining, under conditions to catalyze hydroformylation reaction, starting materials comprising (A) a gas comprising hydrogen and carbon monoxide, (B) an alkenyl-functional organosilicon compound, and (C) a rhodium/5isphosphate ligand complex catalyst, where the 5isphosphate ligand has formula

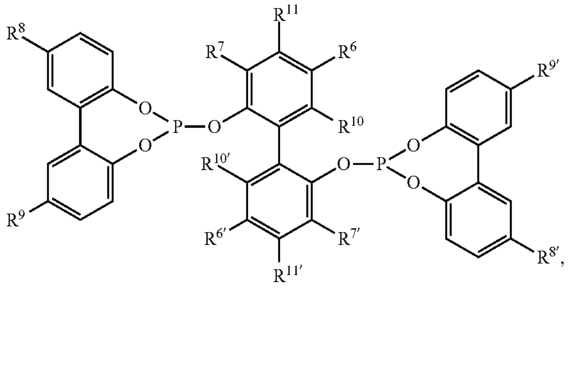

where $R^6$ and $R^{6'}$ are each independently selected from the group consisting of hydrogen, an alkyl group of 1 to 20 carbon atoms, a cyano group, a halogen group, and an alkoxy group of 1 to 20 carbon atoms;

$R^7$ and $R^{7'}$ are each independently selected from the group consisting of an alkyl group of 3 to 20 carbon atoms, and a group of formula $—SiR^{17}_3$, where each $R^{17}$ is an independently selected monovalent hydrocarbon group of 1 to 20 carbon atoms;

$R^8$, $R^{8'}$, $R^9$' and $R^{9'}$ are each independently selected from the group consisting of hydrogen, an alkyl group, a cyano group, a halogen group, and an alkoxy group, and $R^{10}$, $R^{10'}$, $R^{11}$, and $R^{11'}$ are each independently selected from the group consisting of hydrogen or and alkyl group; thereby forming a hydroformylation reaction product comprising the aldehyde-functional organosilicon compound.

9. The process of claim 8, further comprising recovering the aldehyde-functional organosilicon compound before step I).

10. The process of claim 1, where the hydrogenation catalyst is a heterogeneous hydrogenation catalyst comprising a metal selected from the group consisting of Ni, Cu, Co, Ru, Pd, Pt, and a combination of two or more thereof.

11. The process of claim 10, where the hydrogenation catalyst is selected from the group consisting of Raney nickel, Raney copper, copper catalyst on a porous supporting material, a palladium catalyst on a porous supporting material, a ruthenium catalyst on a porous supporting material, and a combination of two or more thereof; and wherein the porous supporting material is selected from the group consisting of $Al_2O_3$, $SiO_2$, SiC, and C.

12. The process of claim 1, where amount of the hydrogenation catalyst is 1 weight % to 20 weight % based on weight of the aldehyde-functional organosilicon compound.

13. The process of claim 1, where in step I) one or both of conditions (i) and (ii) is satisfied, where condition (i) is that $H_2$ pressure is 10 psig (68.9 kPa) to 800 psig (5516 kPa), and condition (ii) is that temperature is 0° C. to 200° C.

14. The process of claim 1, further comprising pretreating the hydrogenation catalyst step I).

15. The process of claim 1, further comprising: II) recovering the carbinol-functional organosilicon compound from the hydrogenation reaction product during and/or after step I).

16. The process of claim 2, where the carbinol-functional organosilicon compound comprises a carbinol-functional silane of formula: $R^{Car}_xSiR^4_{(4-x)}$, where each $R^{Car}$ is an independently selected carbinol group of 3 to 9 carbon atoms; each $R^4$ is independently selected from the group consisting of an alkyl group of 1 to 18 carbon atoms, an aryl group of 6 to 18 carbon atoms, an acyloxy group of 2 to 18 carbon atoms, and an hydrocarbonoxy-functional group of 1 to 18 carbon atoms; and subscript x is 1 to 4.

17. The process of claim 3, where the carbinol-functional organosilicon compound comprises a carbinol-functional polyorganosiloxane of unit formula: $(R^4_3SiO_{1/2})_a(R^4_2R^{Car}SiO_{1/2})_b(R^4_2SiO_{2/2})_c(R^4R^{Car}SiO_{2/2})_d(R^4SiO_{3/2})_e(R^{Car}SiO_{3/2})_f(SiO_{4/2})_g(ZO_{1/2})_h$; where each $R^{Car}$ is an independently selected carbinol group of 3 to 9 carbon atoms, and each $R^4$ is independently selected from the group consisting of an alkyl group of 1 to 18 carbon atoms, an aryl group of 6 to 18 carbon atoms, and an hydrocarbonoxy group of 1 to 18 carbon atoms; each Z is independently selected from the group consisting of a hydrogen atom and $R^5$, where each $R^5$ is independently selected from the group consisting of alkyl groups of 1 to 18 carbon atoms and aryl groups of 6 to 18 carbon atoms; subscripts a, b, c, d, e, f, and g represent numbers of each unit in the formula and have values such that subscript a≥0, subscript b≥0, subscript c≥0, subscript d≥0, subscript e≥0, subscript f≥0, subscript g≥0; and subscript h has a value such that $0 \le h/(e+f+g) \le 1.5$, $10{,}000 \ge (a+b+c+d+e+f+g) \ge 2$, and a quantity $(b+d+f) \ge 1$.

18. The process of claim 17, where the carbinol-functional polyorganosiloxane is selected from the group consisting of:

a cyclic carbinol-functional polyorganosiloxane having a unit formula selected from the group consisting of $(R^4R^{Car}SiO_{2/2})_d$, where subscript d is 3 to 12; $(R^4_2SiO_{2/2})_c(R^4R^{Car}SiO_{2/2})_d$, where c is ≥0 to 6 and d is 3 to 12;

a linear carbinol-functional polyorganosiloxane comprising unit formula: $(R^4_3SiO_{1/2})_a(R^4_2R^{Car}SiO_{1/2})_b(R^4_2SiO_{2/2})_c(R^4R^{Car}SiO_{2/2})_d$, where a quantity $(a+b)=2$, a quantity $(b+d) \ge 1$, and a quantity $(a+b+c+d) \ge 2$;

a carbinol-functional polyorganosilicate resin comprising unit formula: $(R^4_3SiO_{12})_{mm}(R^4_2R^{Car}SiO_{12})_{nn}(SiO_{4/2})_{oo}(ZO_{1/2})_h$, where subscripts mm, nn, and oo represent mole percentages of each unit in the polyorganosilicate resin; and subscripts mm, nn and oo have average values such that mm≥0, nn≥0, oo>0, and $0.5 \le (mm+nn)/oo \le 4$;

a carbinol-functional silsesquioxane resin comprising unit formula: $(R^4_3SiO_{1/2})_a(R^4_2R^{Car}SiO_{1/2})_b(R^4_2SiO_{2/2})_c(R^4R^{Car}SiO_{2/2})_d(R^4SiO_{3/2})_e(R^{Car}SiO_{3/2})(ZO_{1/2})_h$; where f>1, $2<(e+f)<10{,}000$; $0<(a+b)/(e+f)<3$; $0<(c+d)/(e+f)<3$; and $0<h/(e+f)<1.5$; and a branched carbinol-functional polyorganosiloxane comprising unit formula: $R^{Car}SiR^{12}_3$, where each $R^{12}$ is selected from $R^{13}$ and —$Osi(R^{14})_3$; where each $R^{13}$ is a monovalent hydrocarbon group; where each $R^{14}$ is selected from $R^{13}$, —$Osi(R^{15})_3$, and —$[OsiR^{13}_2]_{ii}OsiR^{13}_3$; where each $R^{15}$ is selected from $R^{13}$, —$Osi(R^{16})_3$, and —$[OsiR^{13}_2]_{ii}OsiR^{13}_3$; where each $R^{16}$ is selected from $R^{13}$ and —$[OsiR^{13}_2]_{ii}OsiR^{13}_3$; and where subscript ii has a value such that $0 \le ii \le 100$, with the proviso that at least two of $R^{12}$ are —$Osi(R^{14})_3$.

* * * * *